(12) United States Patent
Taniguchi et al.

(10) Patent No.: US 7,583,896 B2
(45) Date of Patent: Sep. 1, 2009

(54) OPTICAL-WIRELESS HYBRID TRANSMISSION SYSTEM AND OPTICAL-WIRELESS HYBRID TRANSMISSION METHOD

(75) Inventors: Tomohiro Taniguchi, Chiba (JP); Naoya Sakurai, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 672 days.

(21) Appl. No.: 10/577,636

(22) PCT Filed: Jun. 24, 2005

(86) PCT No.: PCT/JP2005/011594

§ 371 (c)(1),
(2), (4) Date: Apr. 28, 2006

(87) PCT Pub. No.: WO2006/001362

PCT Pub. Date: Jan. 5, 2006

(65) Prior Publication Data

US 2009/0016723 A1    Jan. 15, 2009

(30) Foreign Application Priority Data

Jun. 24, 2004  (JP) ............................. 2004-185956
Mar. 16, 2005  (JP) ............................. 2005-075305

(51) Int. Cl.
   *H04J 14/00*   (2006.01)
(52) U.S. Cl. .................. 398/72; 398/152; 398/115; 398/185; 398/74; 398/66
(58) Field of Classification Search ............... 398/72, 398/74, 66, 67, 115, 116, 152, 185, 46
See application file for complete search history.

(56) References Cited

U.S. PATENT DOCUMENTS 4,817,206 A    3/1989   Calvani et al.

(Continued)

FOREIGN PATENT DOCUMENTS

AU         741871        4/1999

(Continued)

OTHER PUBLICATIONS

Taniguchi et al., Hikari/Denki 2-dan Heterodyne Hoshiki ni yoru Hikari-Fiber Musen Access System no Kento, 2002 Nen The Institute of Electronics, Information and Communication Engineers, Electronics Society Taikai Koen Ronbunshu 1, C-14-15, Aug. 20, 2002, p. 296.

(Continued)

*Primary Examiner*—Ken N Vanderpuye
*Assistant Examiner*—Hibret A Woldekidan
(74) *Attorney, Agent, or Firm*—Harness, Dickey & Pierce, P.L.C.

(57) ABSTRACT

An optical transmitter of an optical-wireless hybrid transmission system according to the invention outputs a first single-mode optical signal (center frequency: $f_{C1}$) to an optical receiver, generates a polarization-coupled optical signal by orthogonal-polarization-coupling a second single-mode optical signal (center frequency: $f_{C2}$) with a third single-mode optical signal (center frequency: $f_{C3}$) so as to give the two waves orthogonal polarization directions and the same optical power, and transmits the generated polarization-coupled optical signal to a base station as an optical carrier signal. The optical receiver couples a modulated optical signal transmitted from the base station with the optical signal output from the optical transmitter, demodulates an electrical signal having intermediate frequencies $f_{IF1}$ and $f_{IF2}$ that is obtained by photodecting a resulting coupled optical signal, and generates transmit-data by filtering a resulting output signal.

19 Claims, 22 Drawing Sheets

U.S. PATENT DOCUMENTS

| | | | | |
|---|---|---|---|---|
| 6,118,565 | A | * | 9/2000 | Frigo .......................... 398/68 |
| 6,226,499 | B1 | * | 5/2001 | Nakatani et al. .............. 455/78 |
| 6,895,185 | B1 | * | 5/2005 | Chung et al. .................. 398/72 |
| 2002/0012495 | A1 | * | 1/2002 | Sasai et al. .................... 385/24 |
| 2003/0016418 | A1 | * | 1/2003 | Westbrook et al. .......... 359/145 |
| 2003/0072060 | A1 | * | 4/2003 | Sourani ...................... 359/172 |

FOREIGN PATENT DOCUMENTS

| | | |
|---|---|---|
| EP | 0910187 A2 | 4/1999 |
| JP | 62-250428 | 4/1986 |
| JP | 63-224427 | 9/1988 |
| JP | 04-048832 | 2/1992 |
| JP | 05-014264 | 1/1993 |
| JP | 11-177534 | 7/1999 |
| JP | 2000-278217 | 10/2000 |
| JP | 09-162810 | 6/2006 |

OTHER PUBLICATIONS

Taniguchi et al., "Hikari/Denki 2-dan Heterodyne ROF System ni okeru SBS Yokusei Koka no Aru Hikari PSK Hencho Hoshiki no Kento", 2003 Nen The Institute of Electronics, Information and Communication Engineers Sogo Taikai Koen Ronbunshu, Electronics 1, C-14-4, Mar. 3, 2003, p. 335.

Taniguchi et al., "60 GHz Uplink System ni okeru Loopback-gata Hikari-Heterodyne Kenpa Hoshiki", 2005 Nen The Institute of Electronics, Information and Communication Engineers Sogo Taikai Koen Ronbunshu, Electronics 1, C-14-9, Mar. 7, 2005, p. 354.

"New Photonic Downconversion Technique with Optical Frequency Shifter for 60-GHz-Band Fiber-Radio Uplink Systems" by Toshiaki Kuri et al., Proceedings of the 2002 General Assembly of the Institute of Electronics Information and Communication Engineers, C-17-13, p. 366.

* cited by examiner

[Fig. 1]
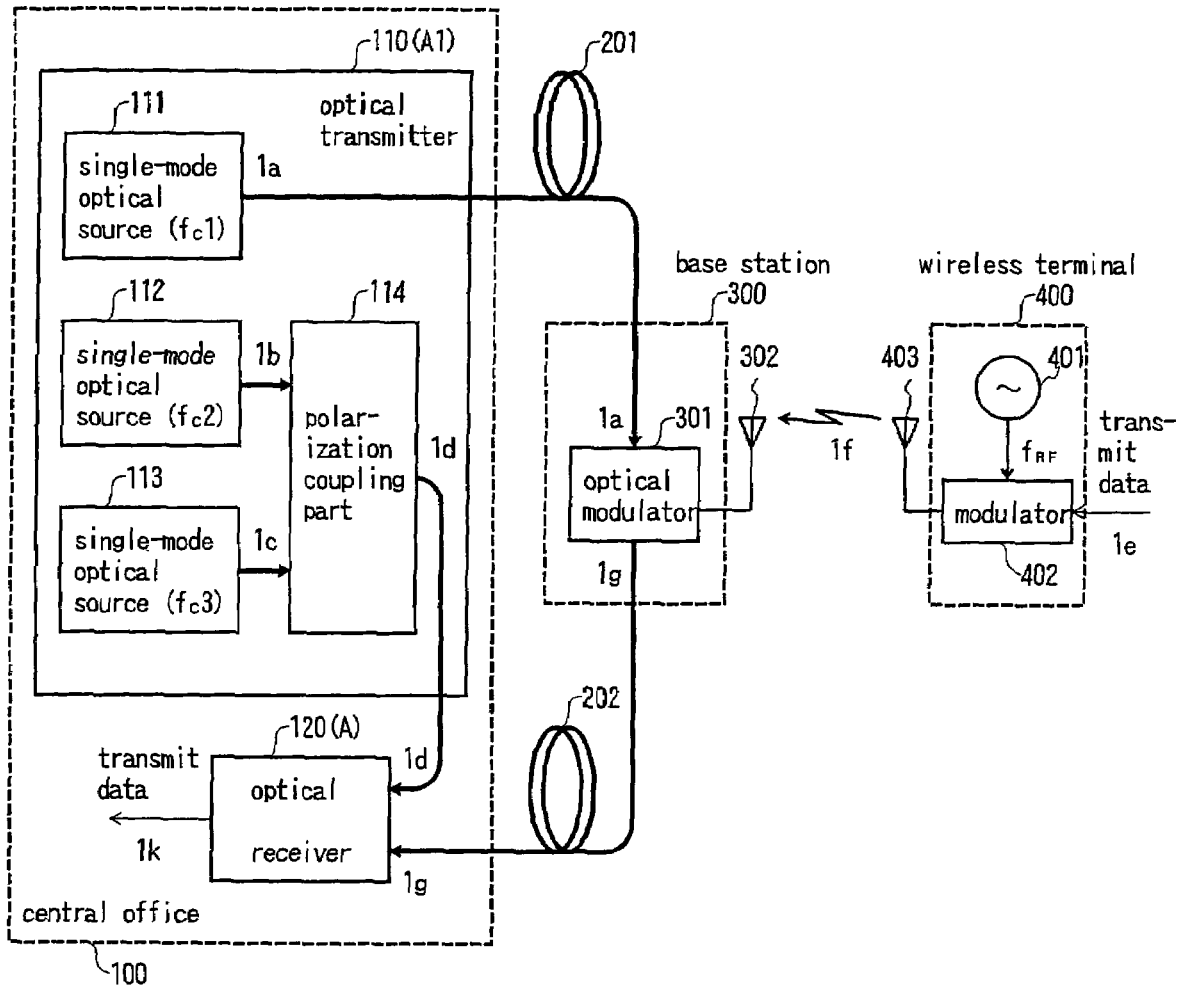
[Fig. 2]
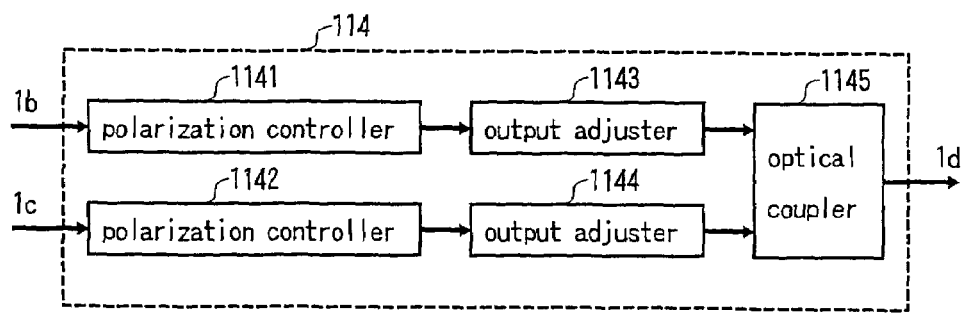

[Fig. 3]
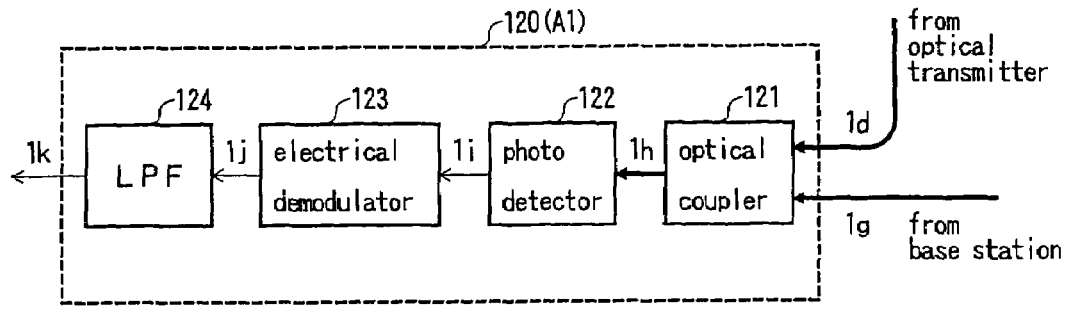
[Fig. 4]
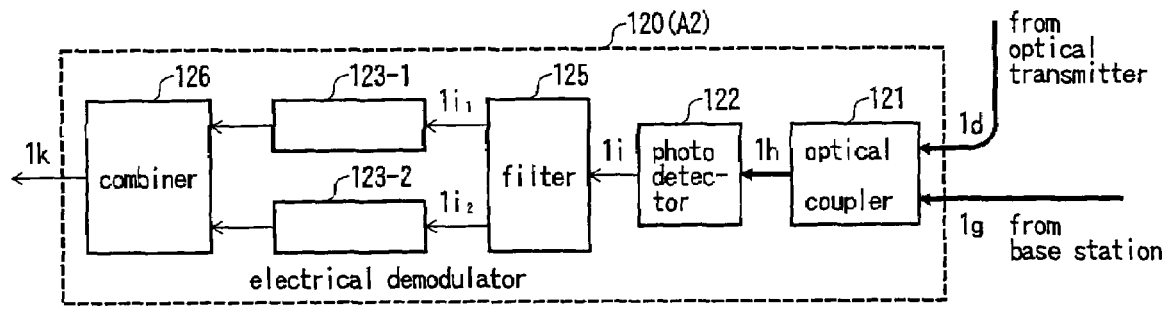
[Fig. 5]
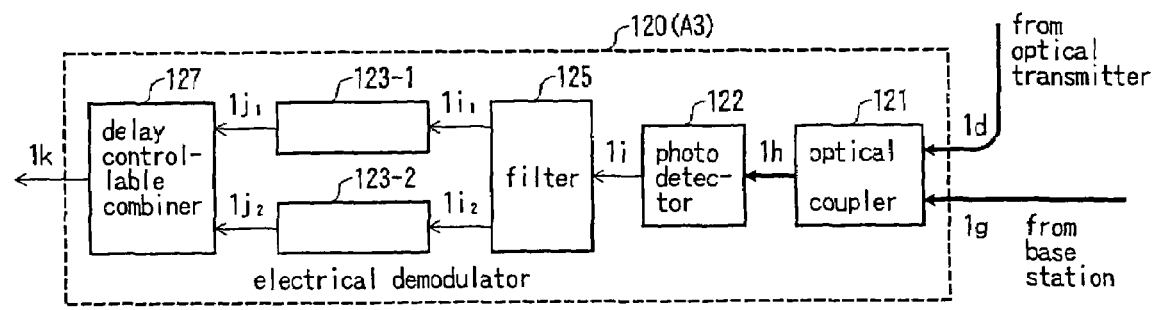

[Fig. 6]
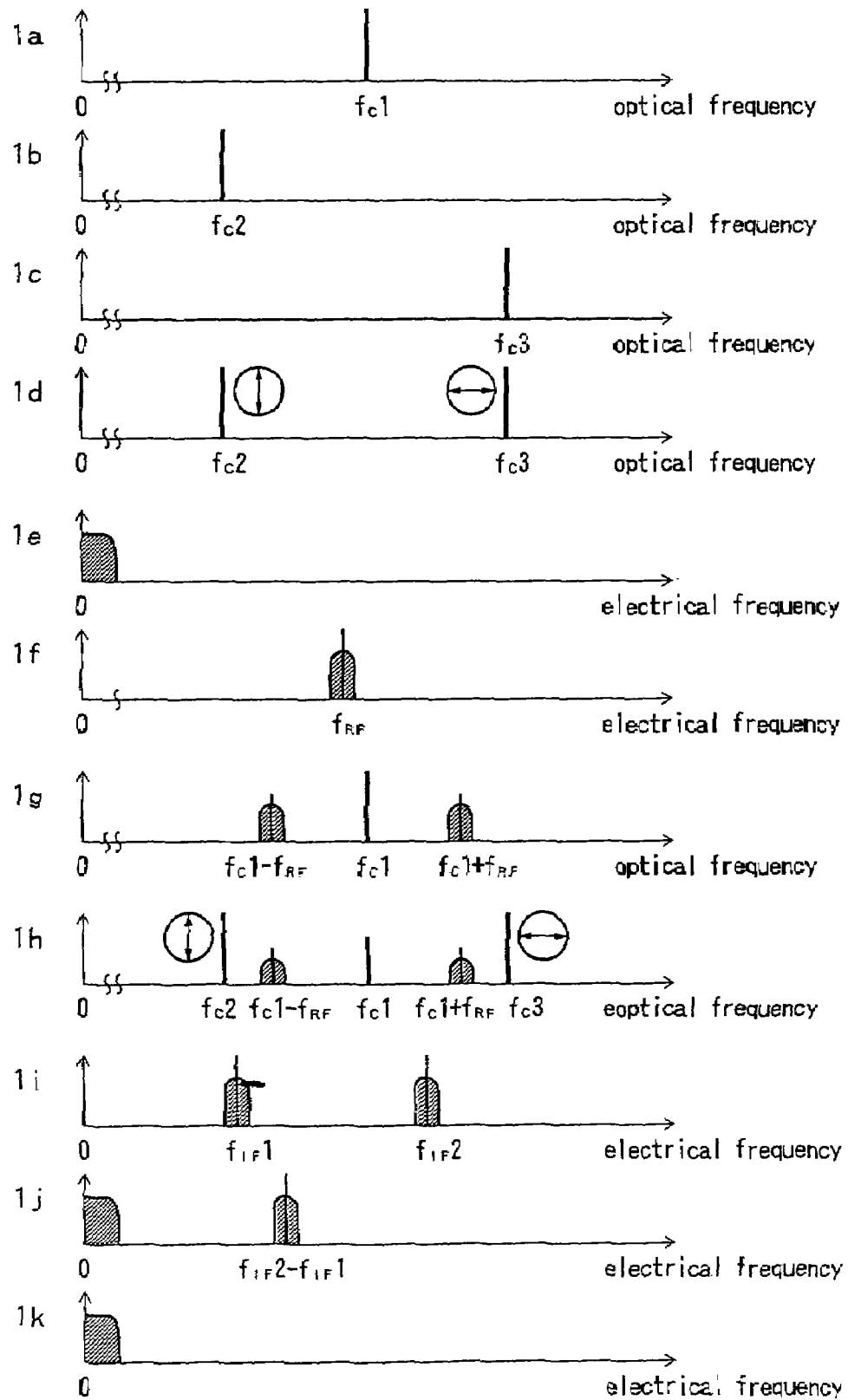

[Fig. 7]
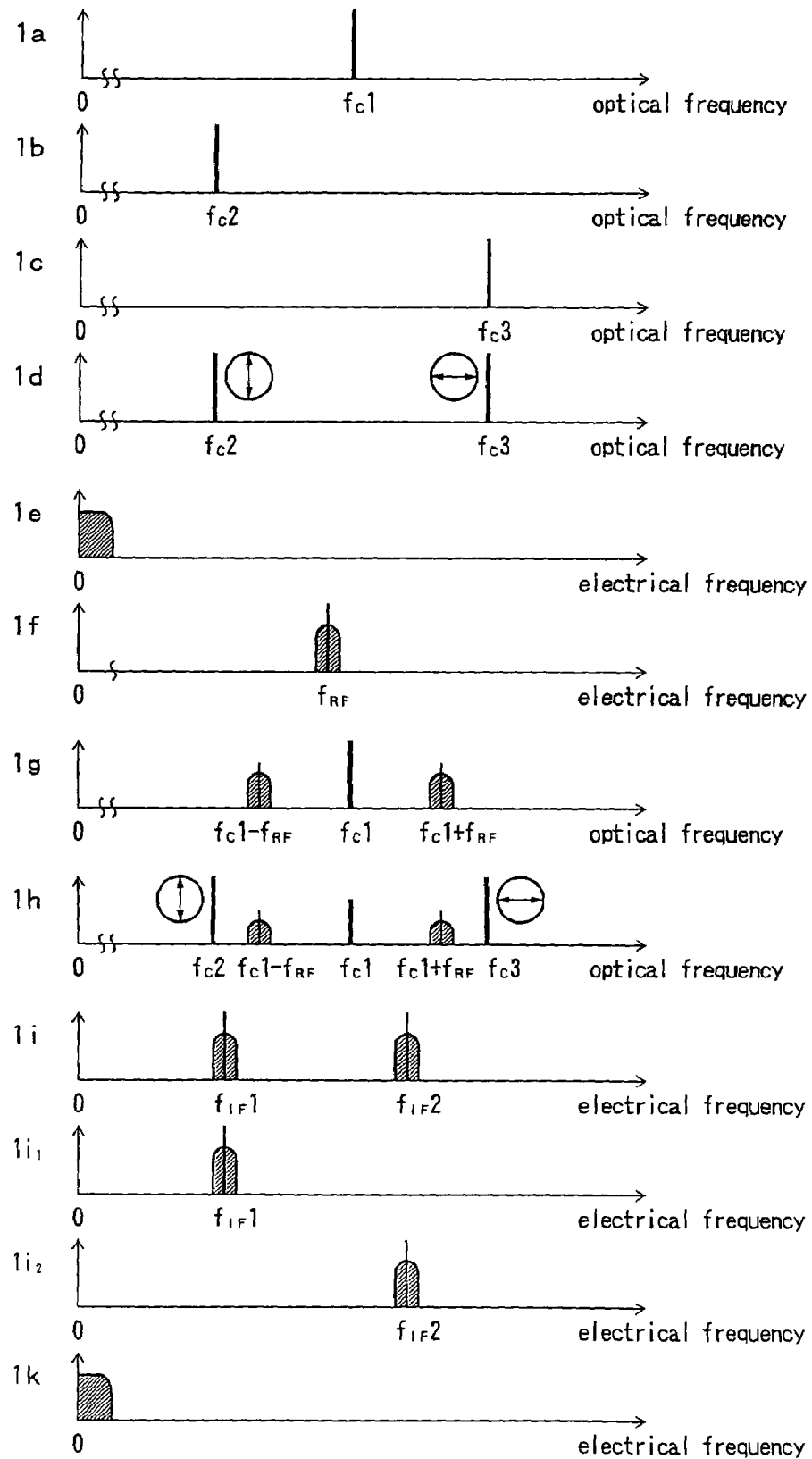

[Fig. 8]
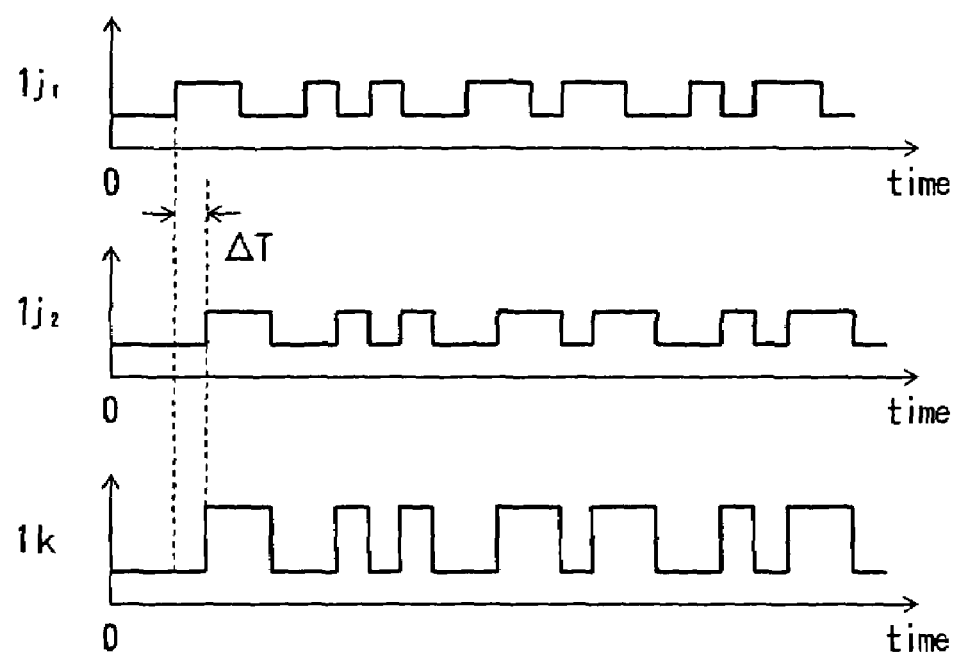

[Fig. 9]
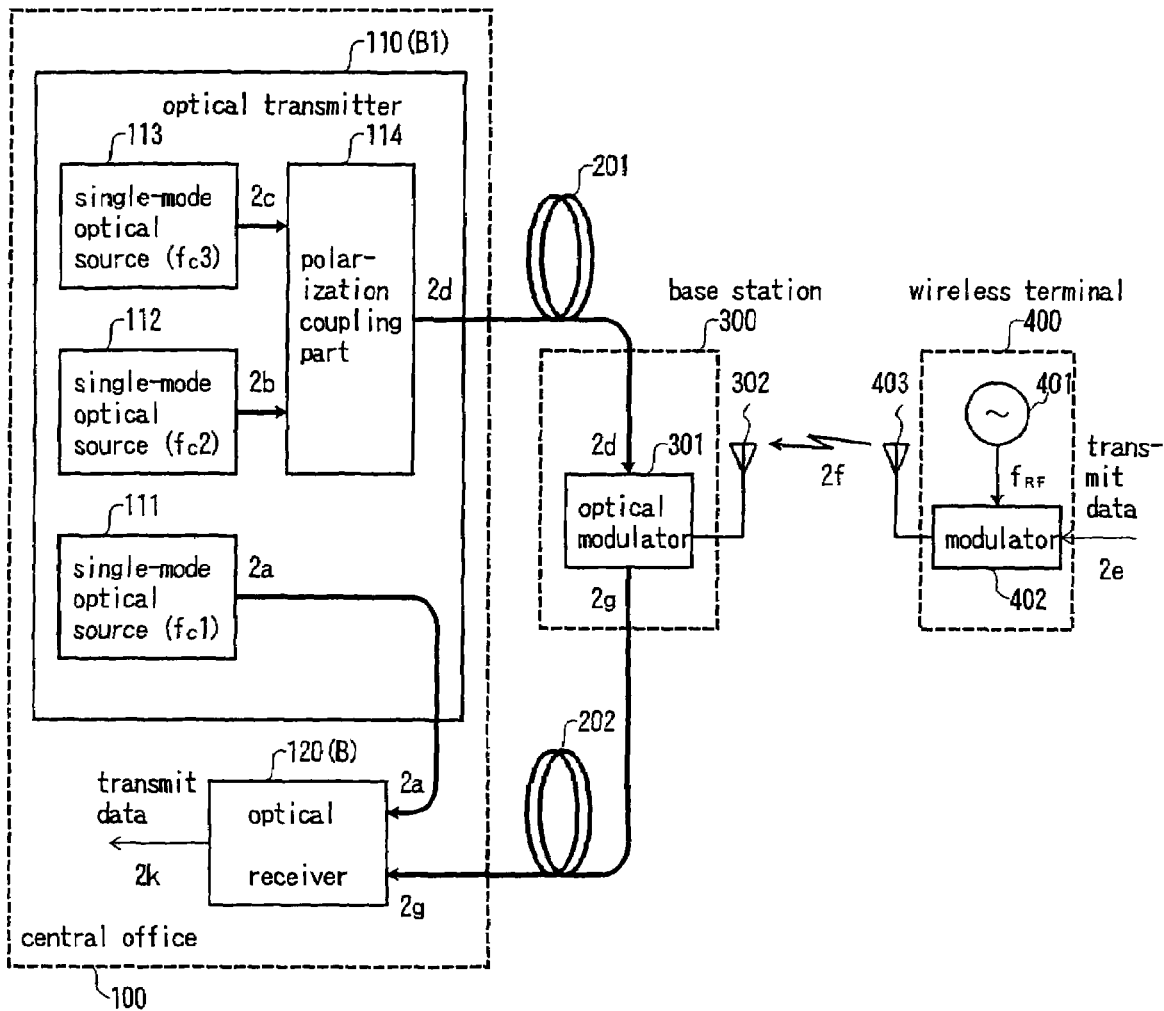
[Fig. 10]
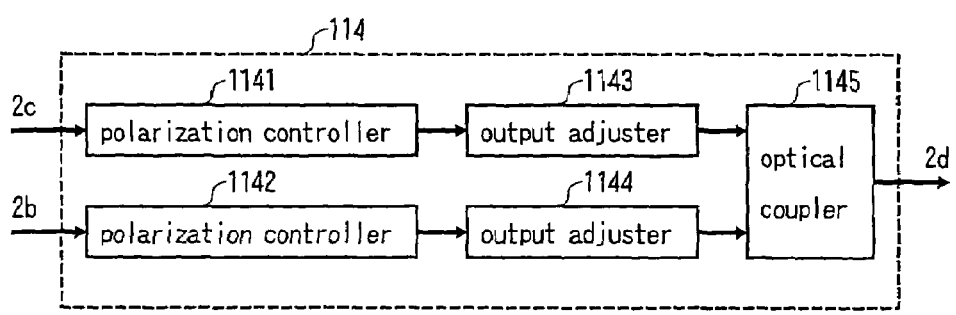

[Fig. 11]
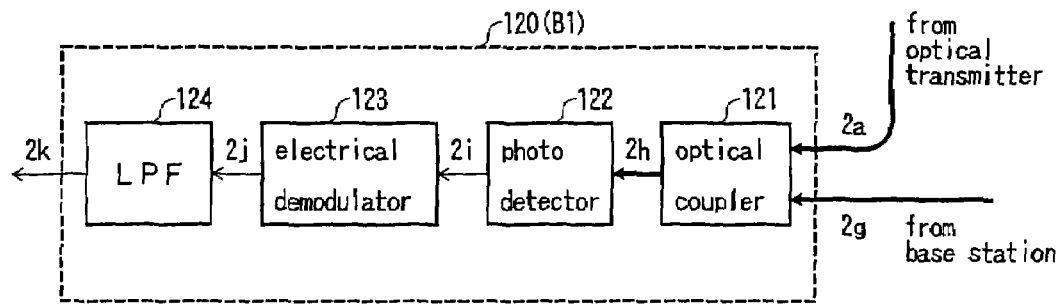
[Fig. 12]
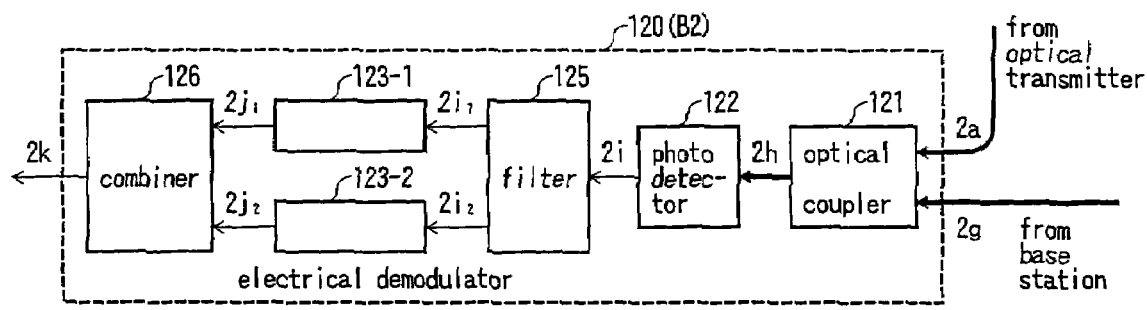
[Fig. 13]
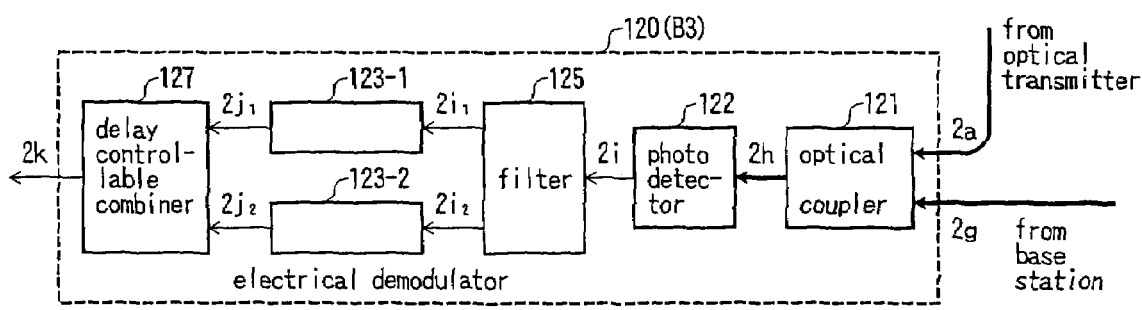

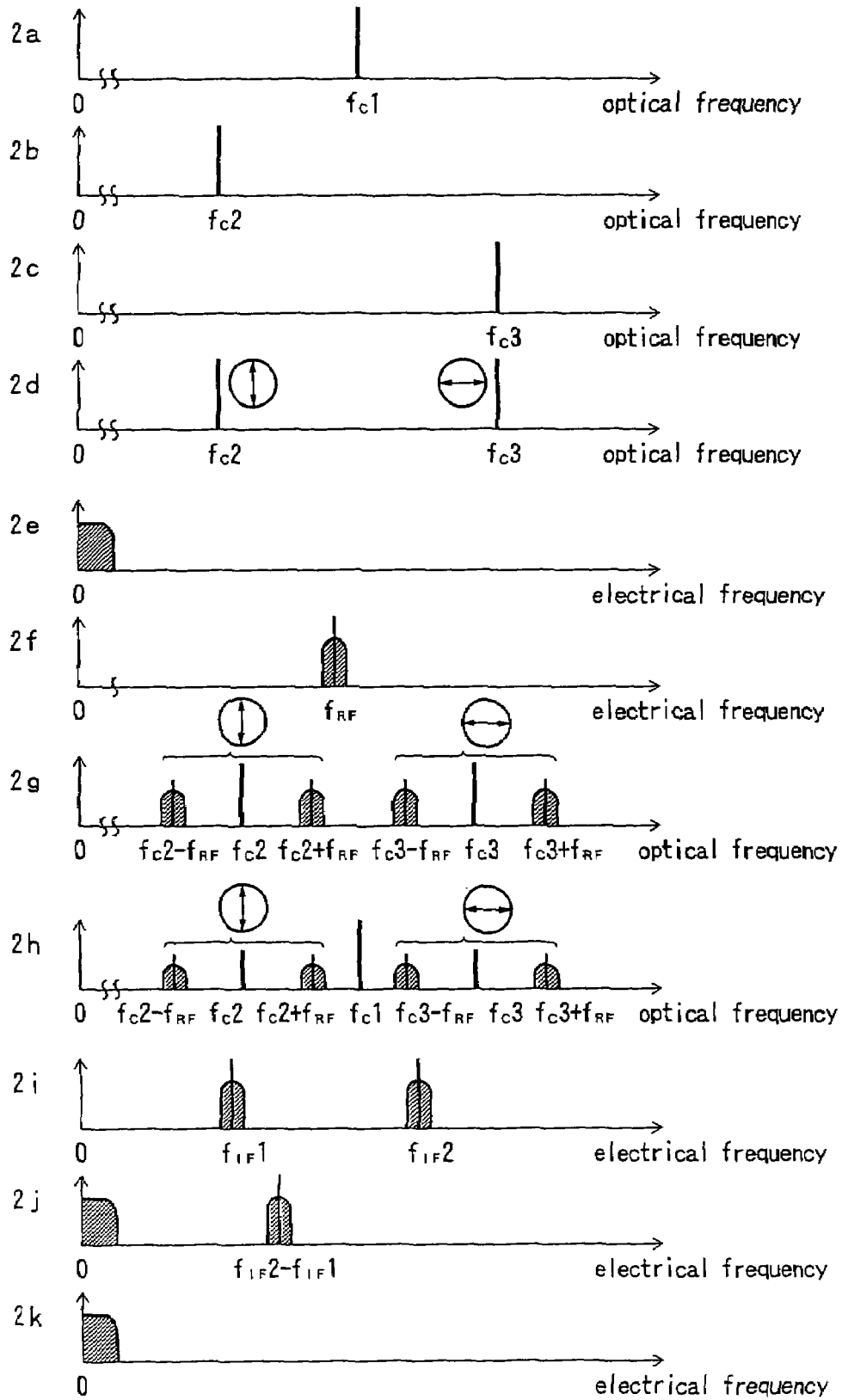

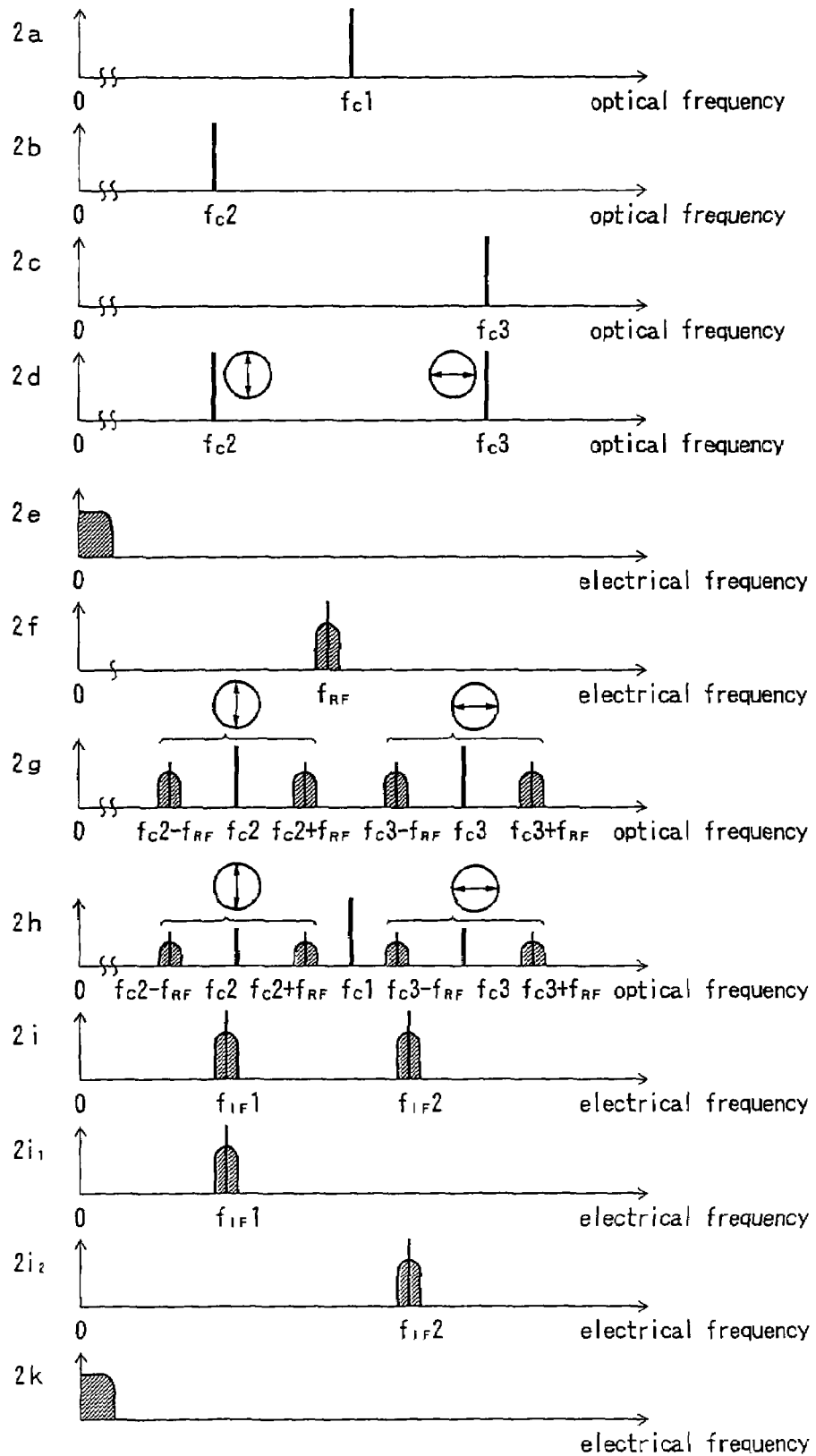
[Fig. 15]

[Fig. 16]
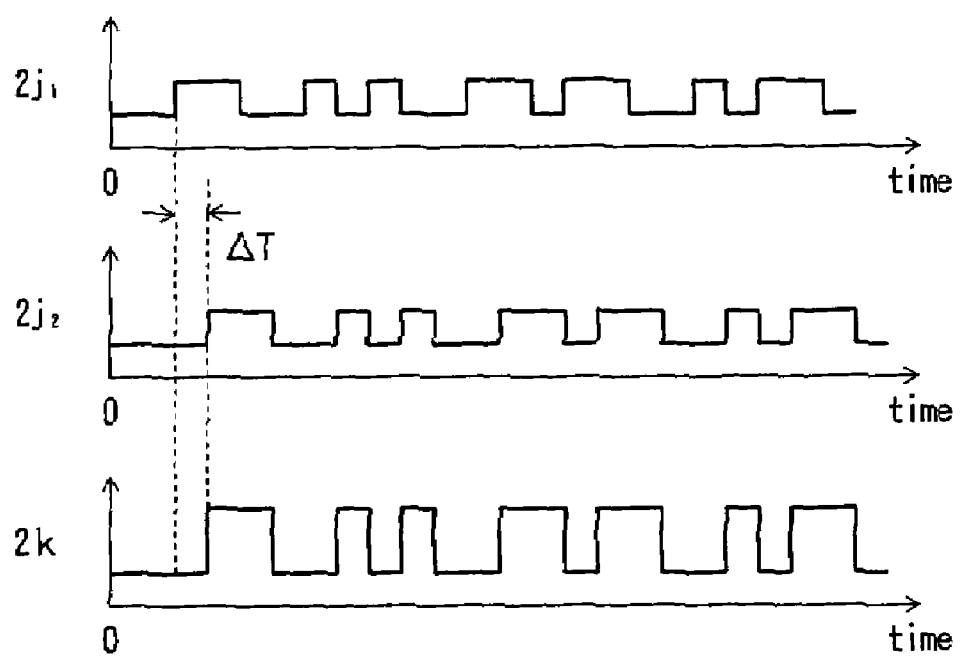

[Fig. 17]
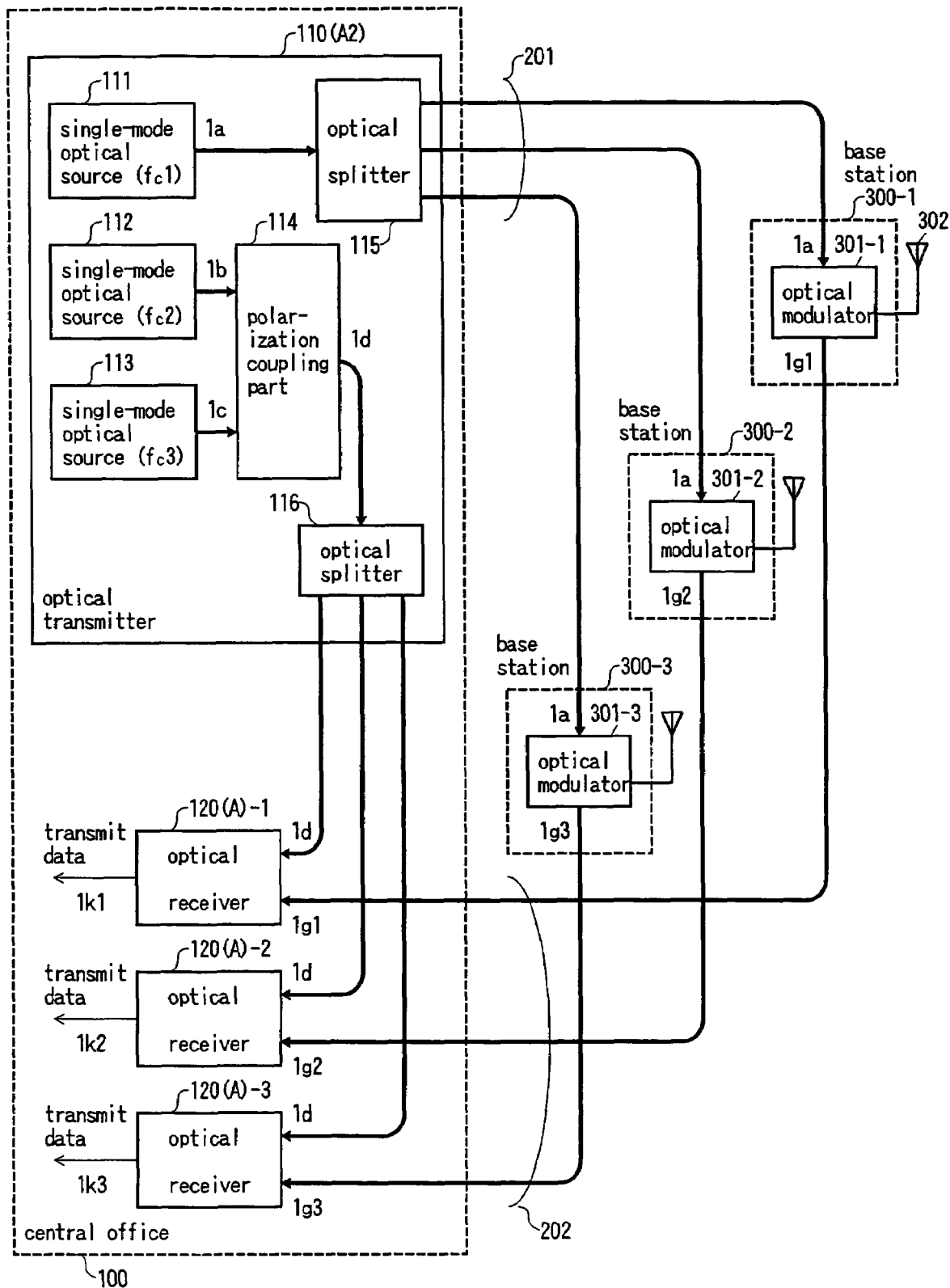

[Fig. 18]
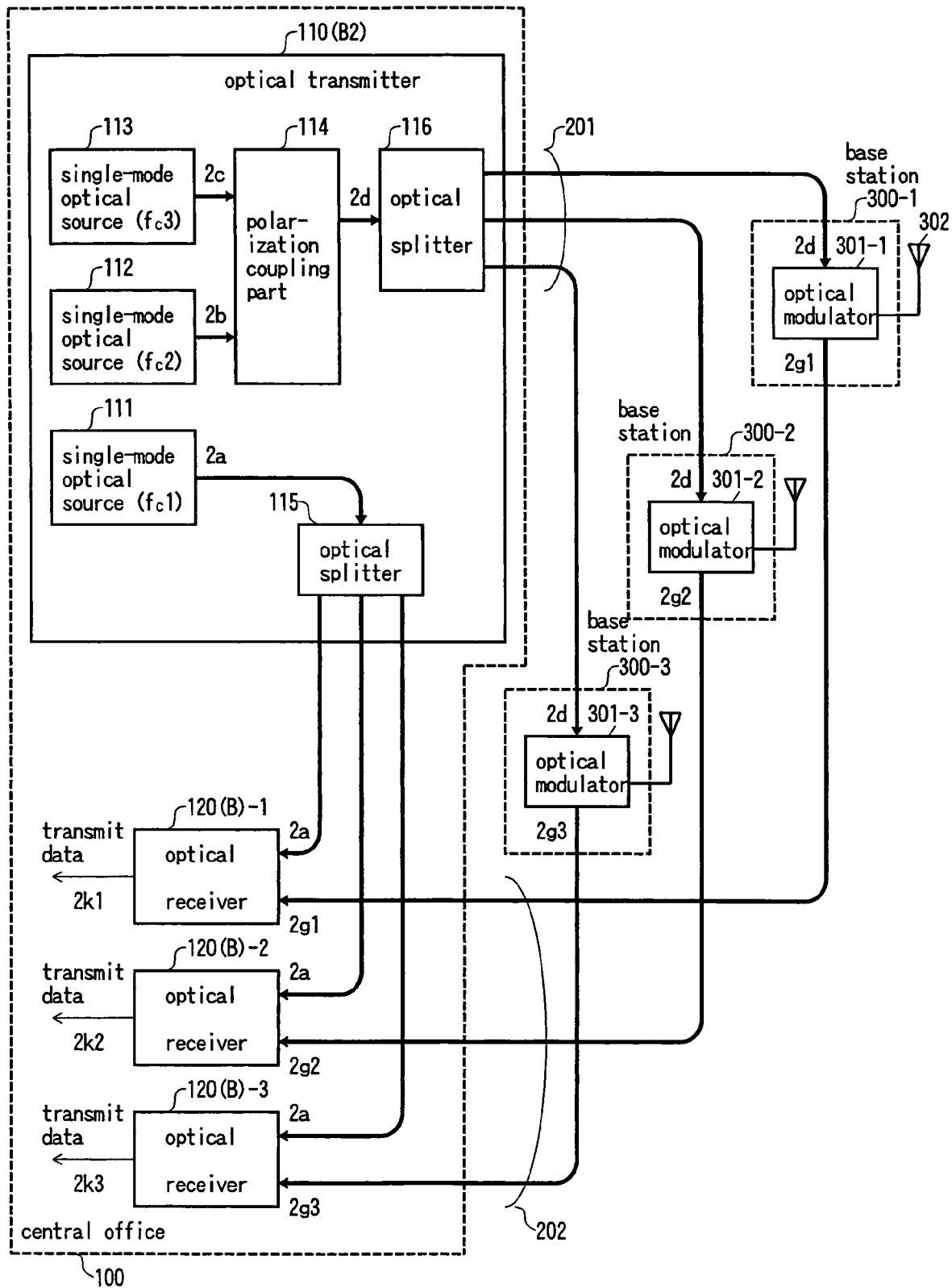

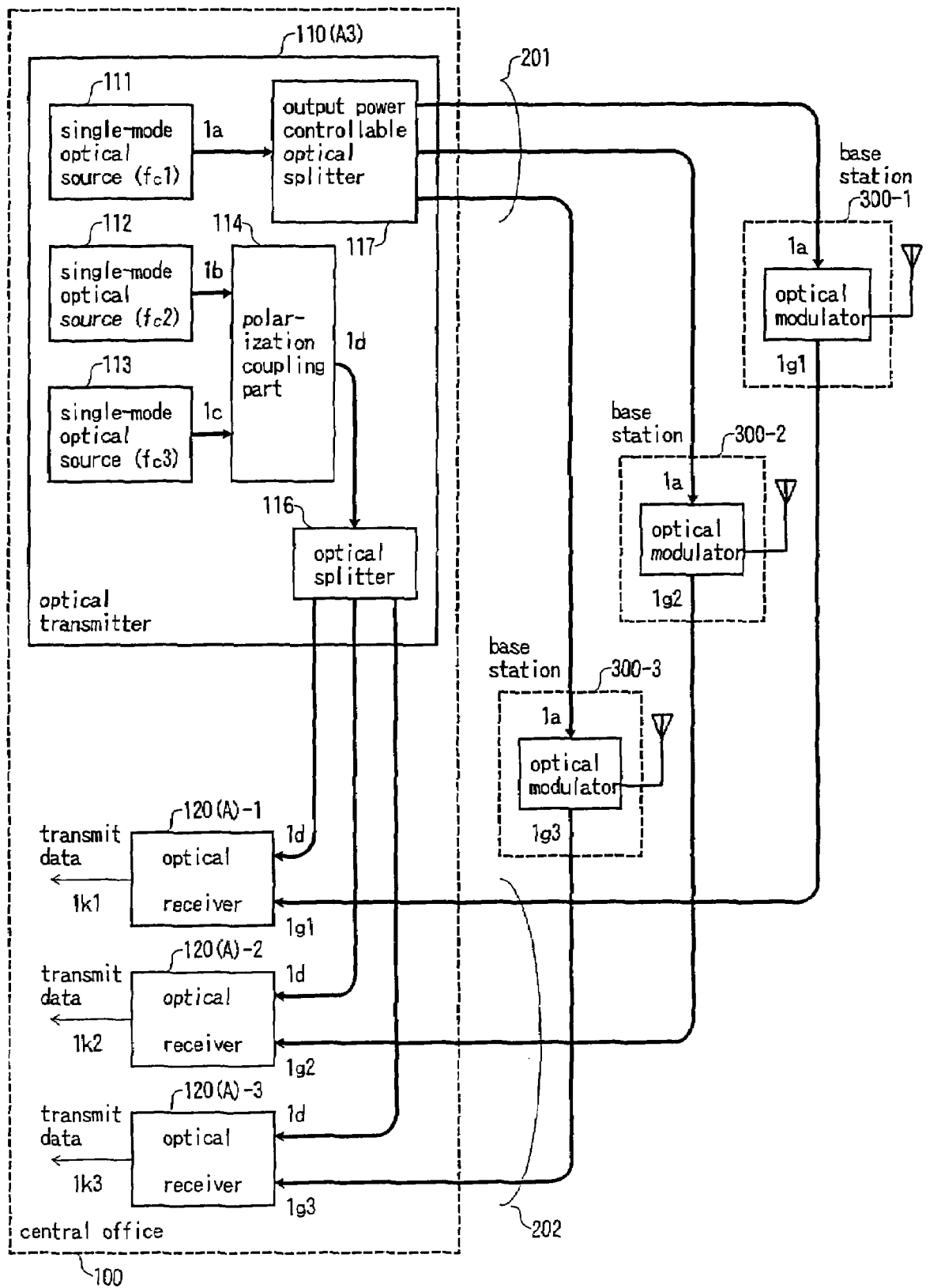
[Fig. 19]

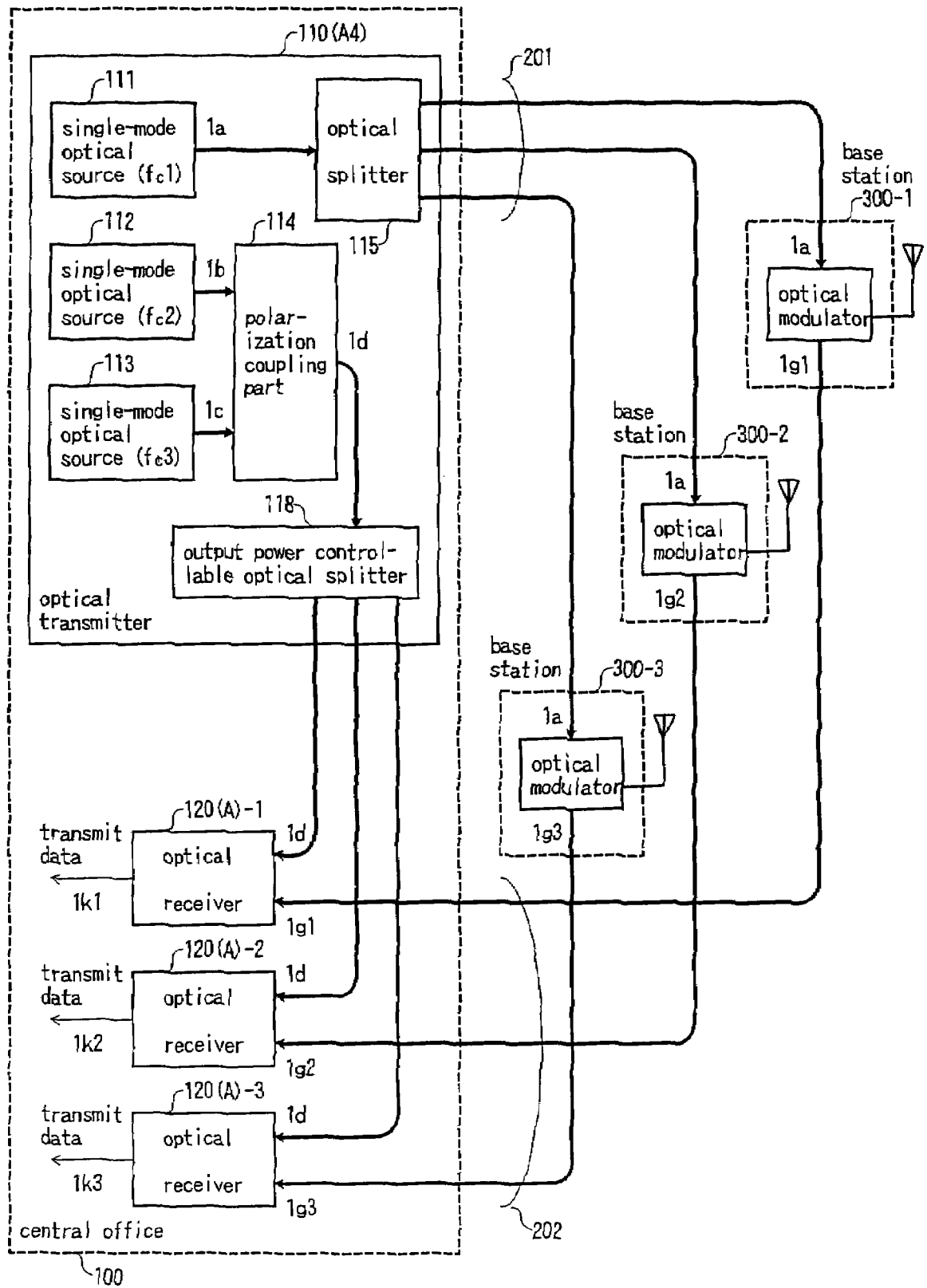
[Fig. 20]

[Fig. 21]
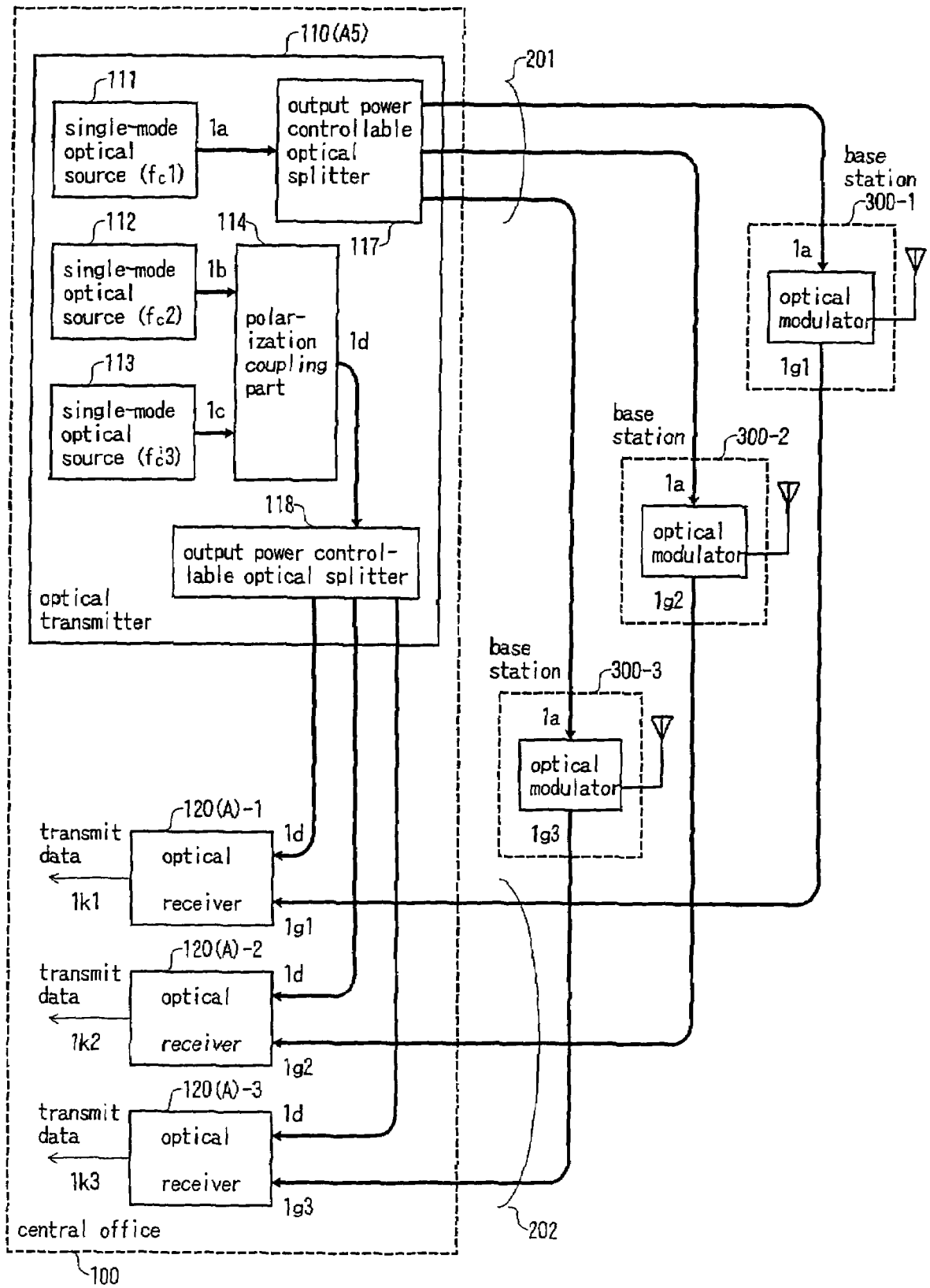

[Fig. 22]
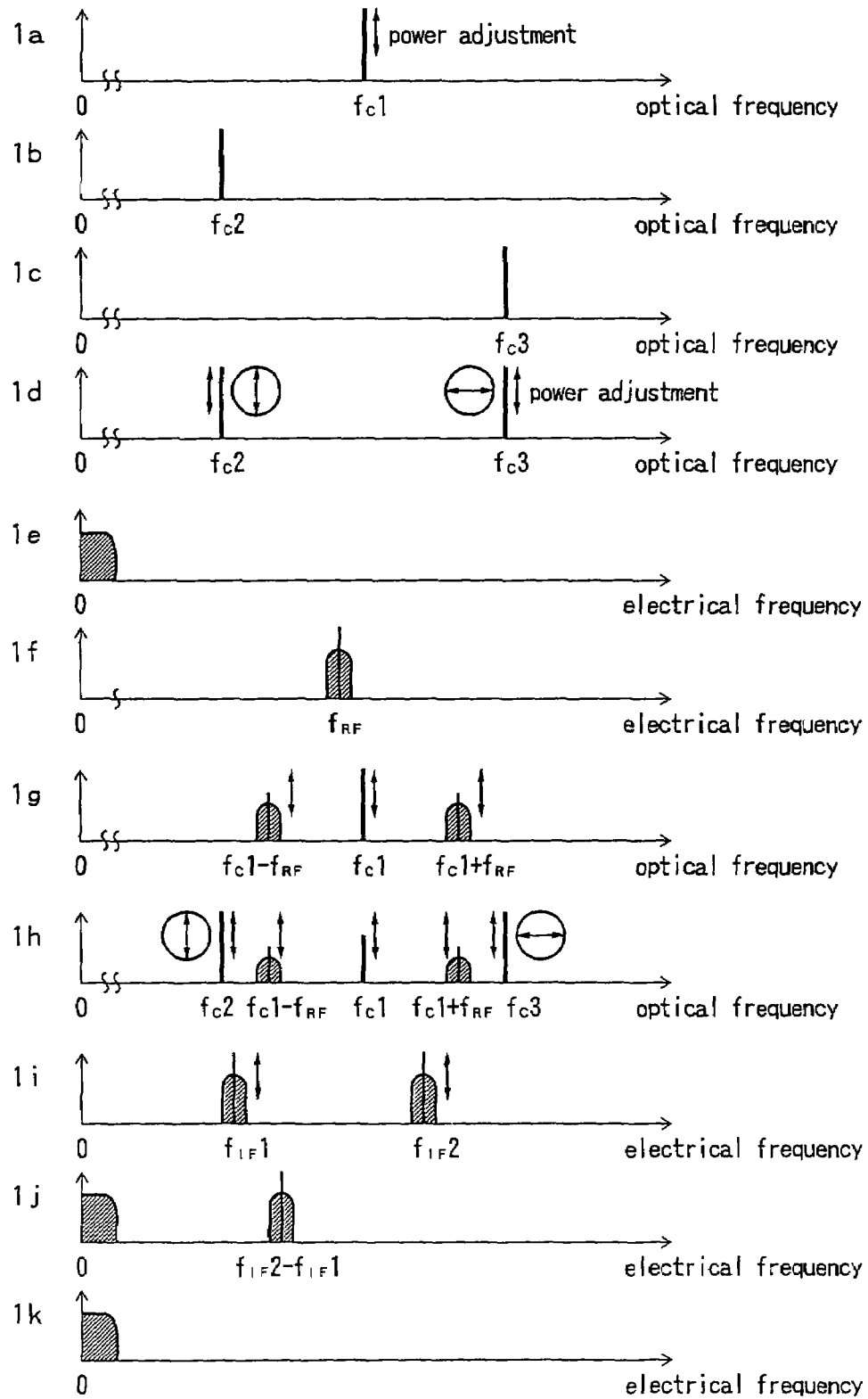

[Fig. 23]
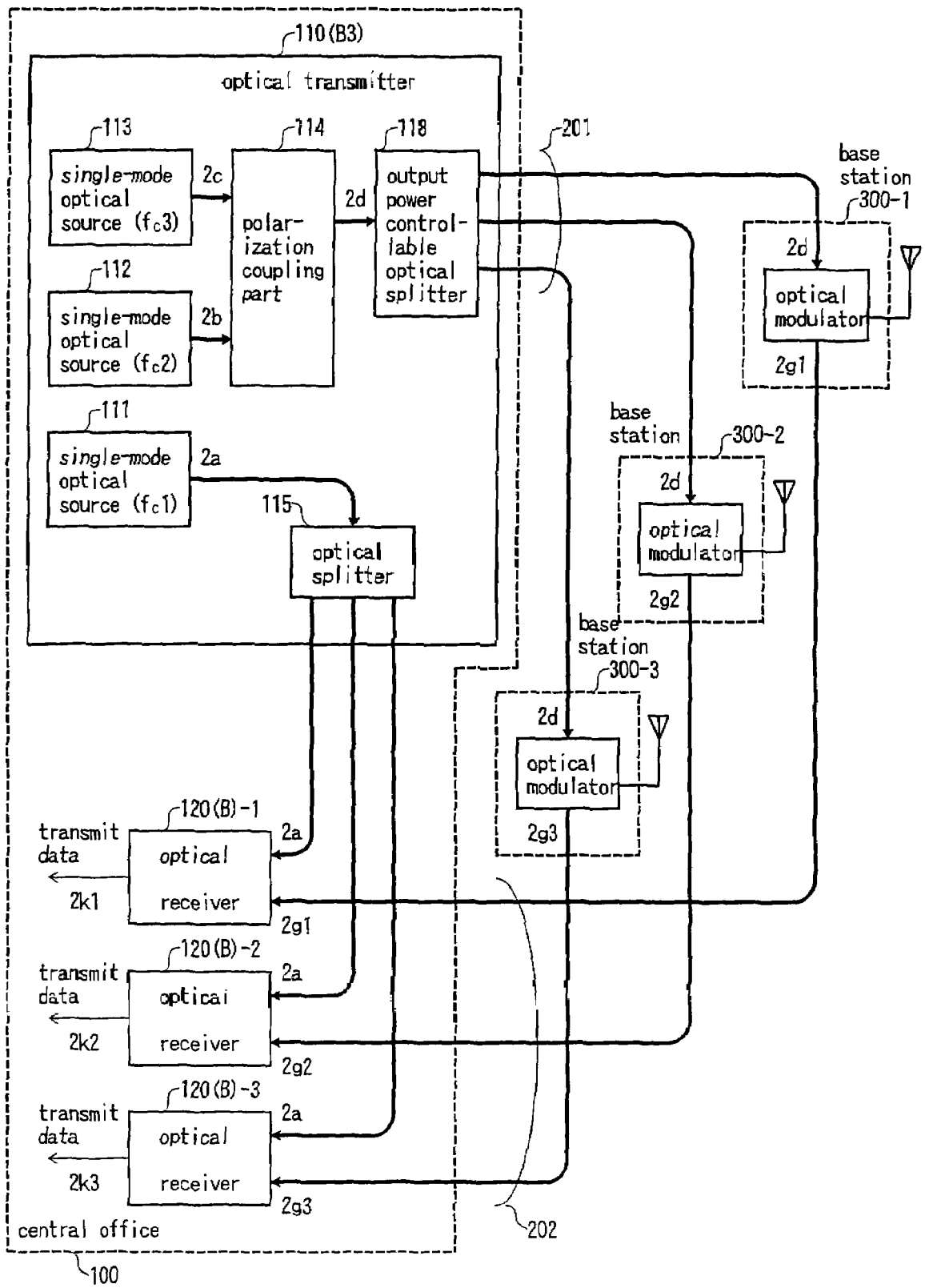

[Fig. 24]
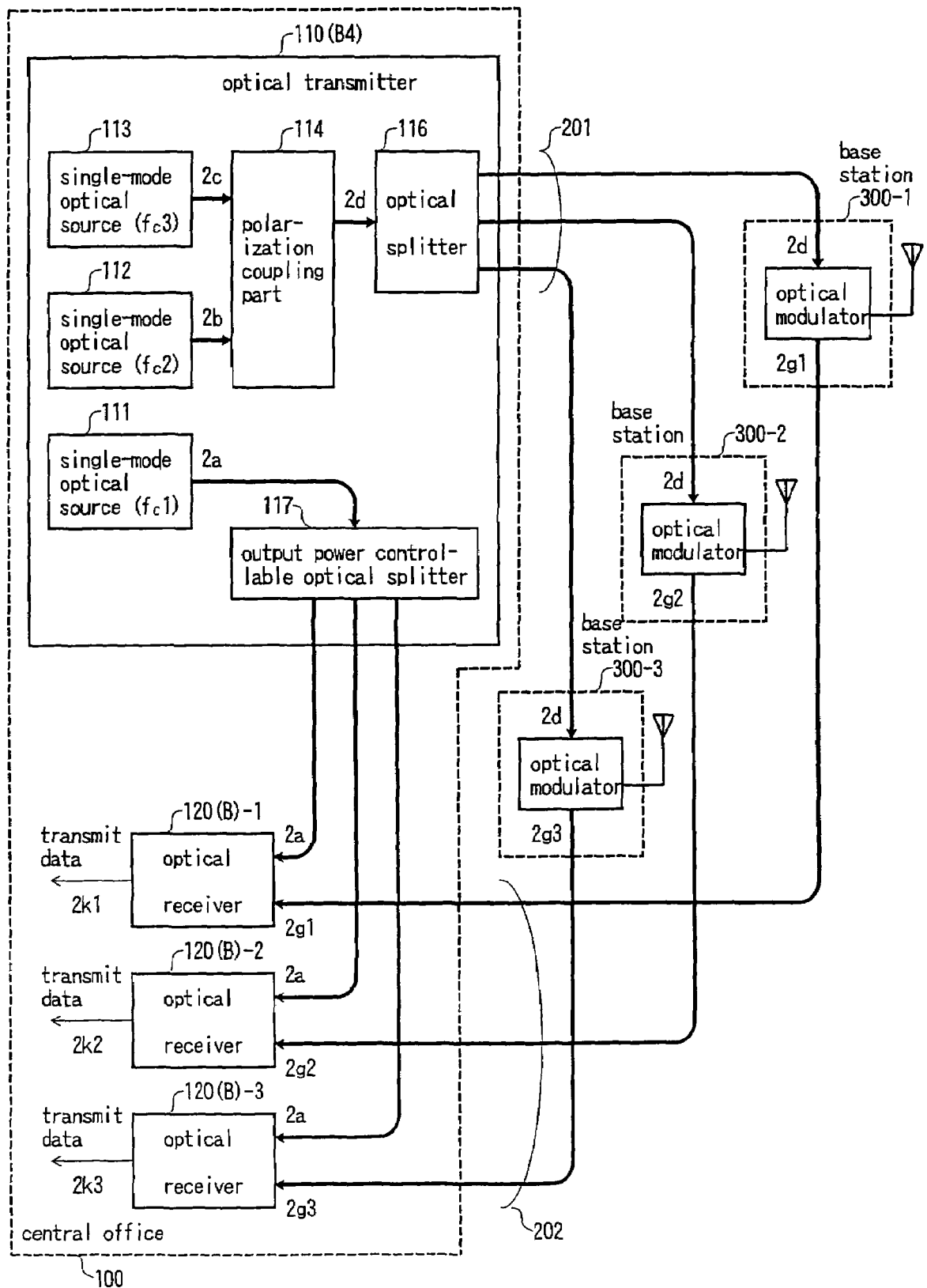

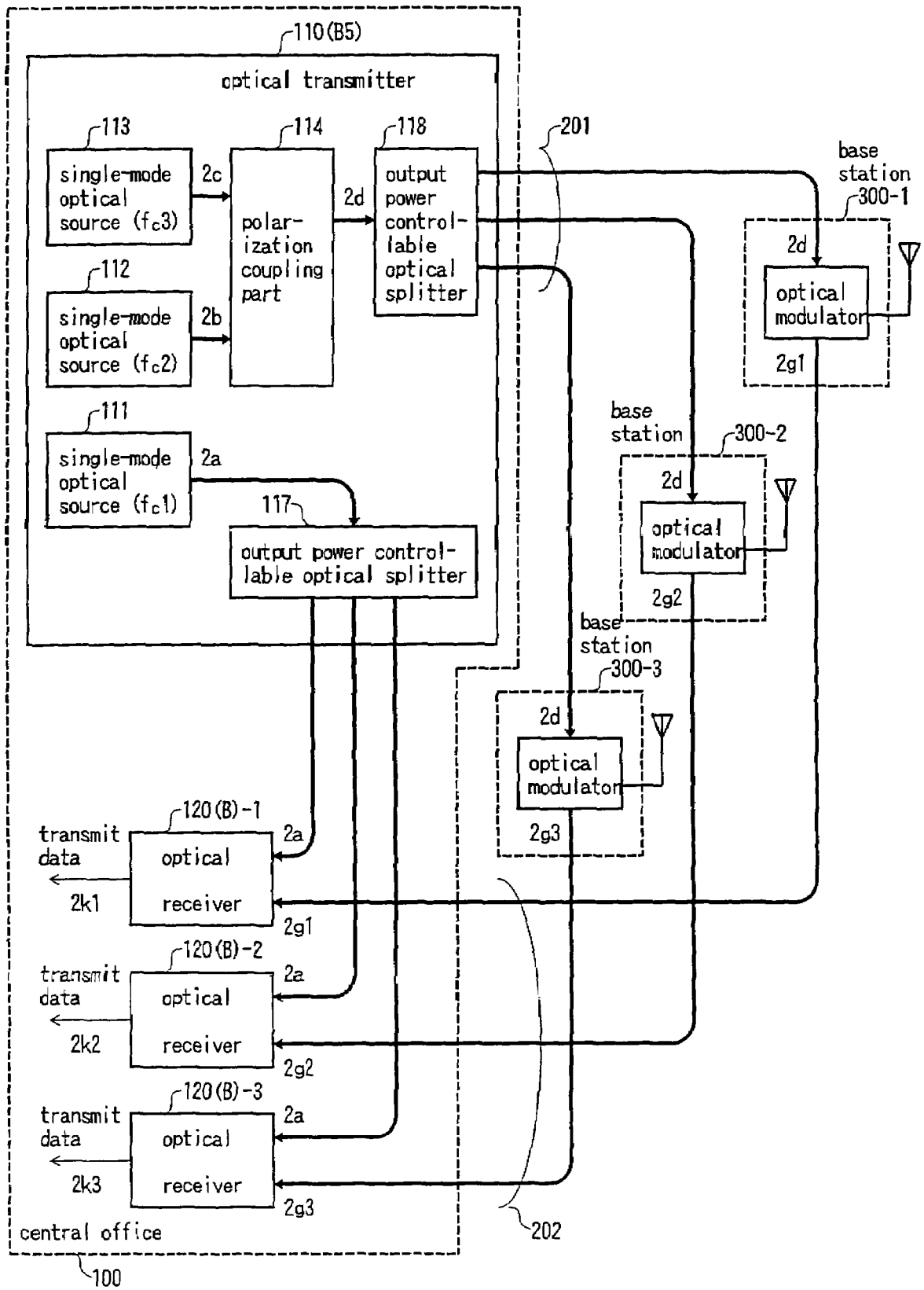
[Fig. 25]

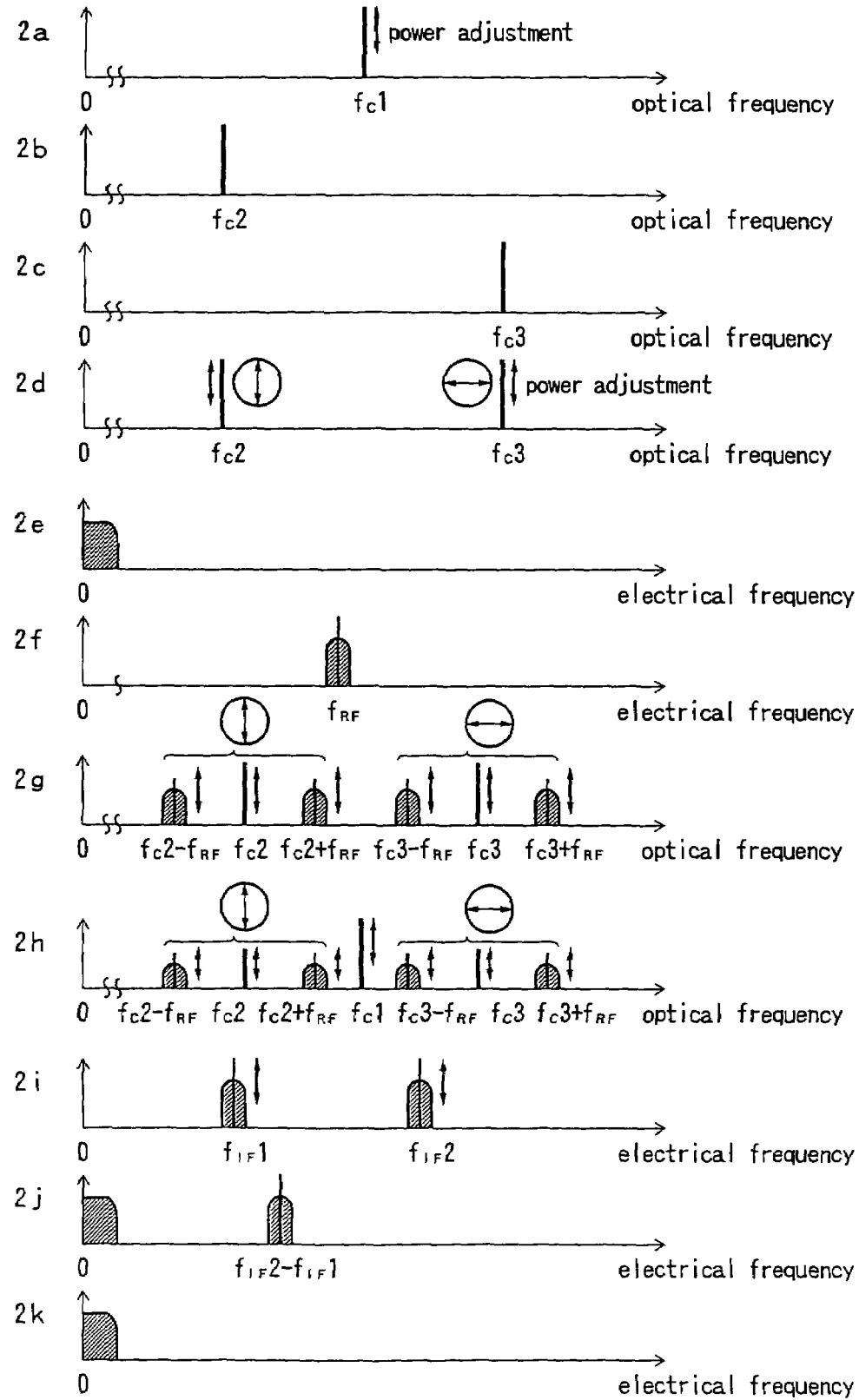
[Fig. 26]

[Fig. 27]
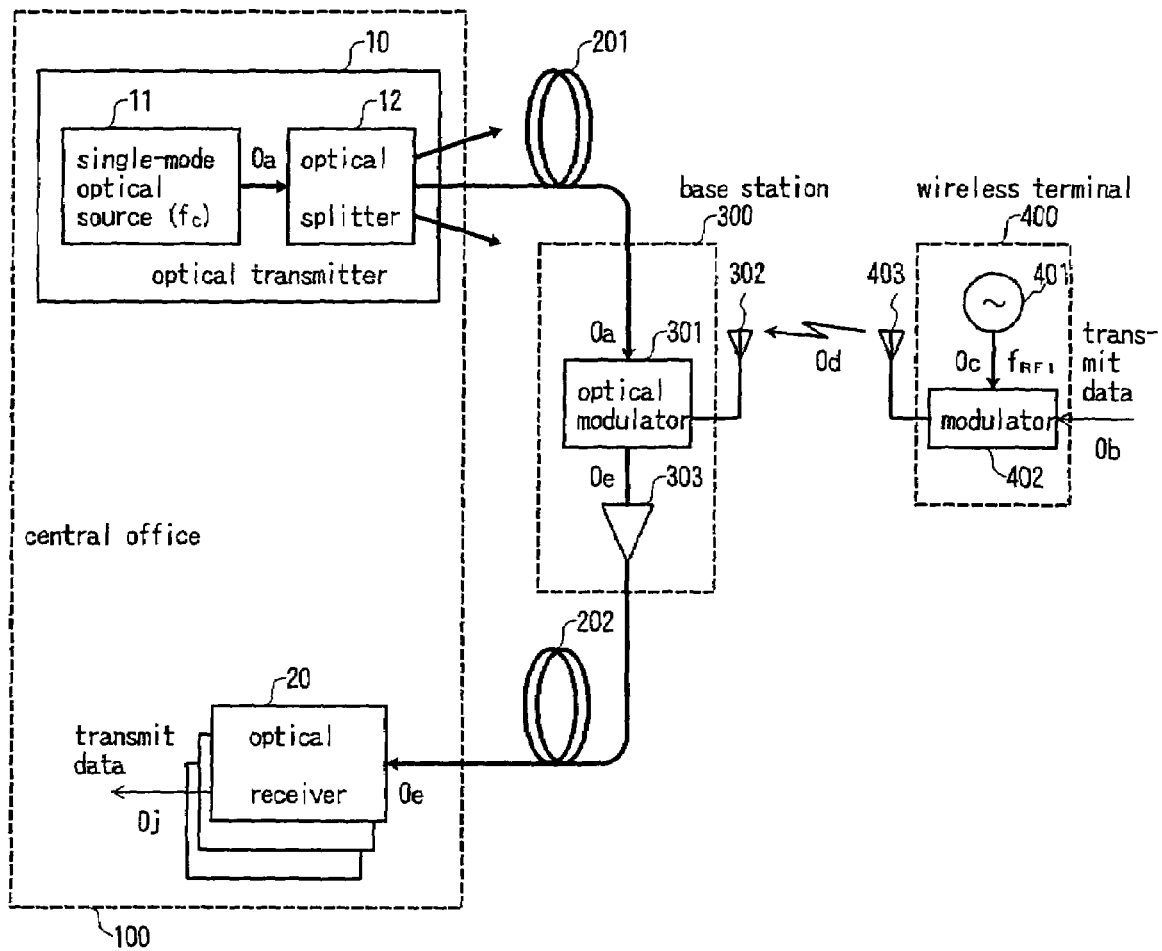
[Fig. 28]
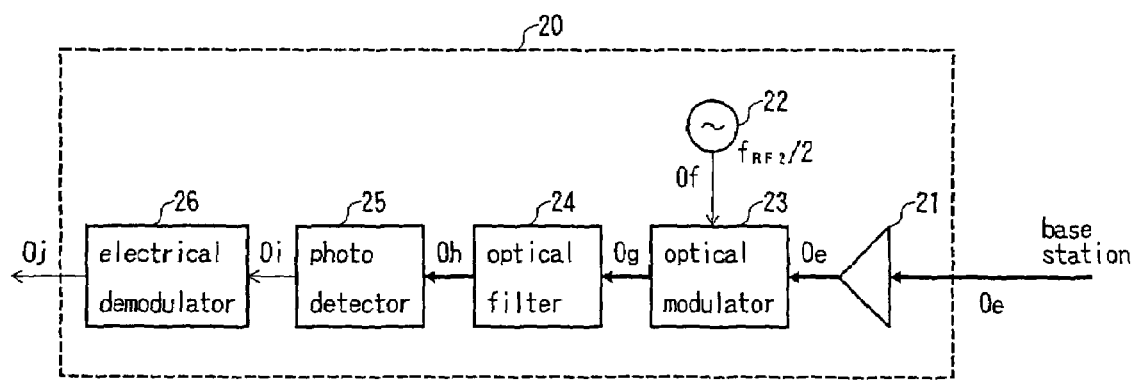

[Fig. 29]
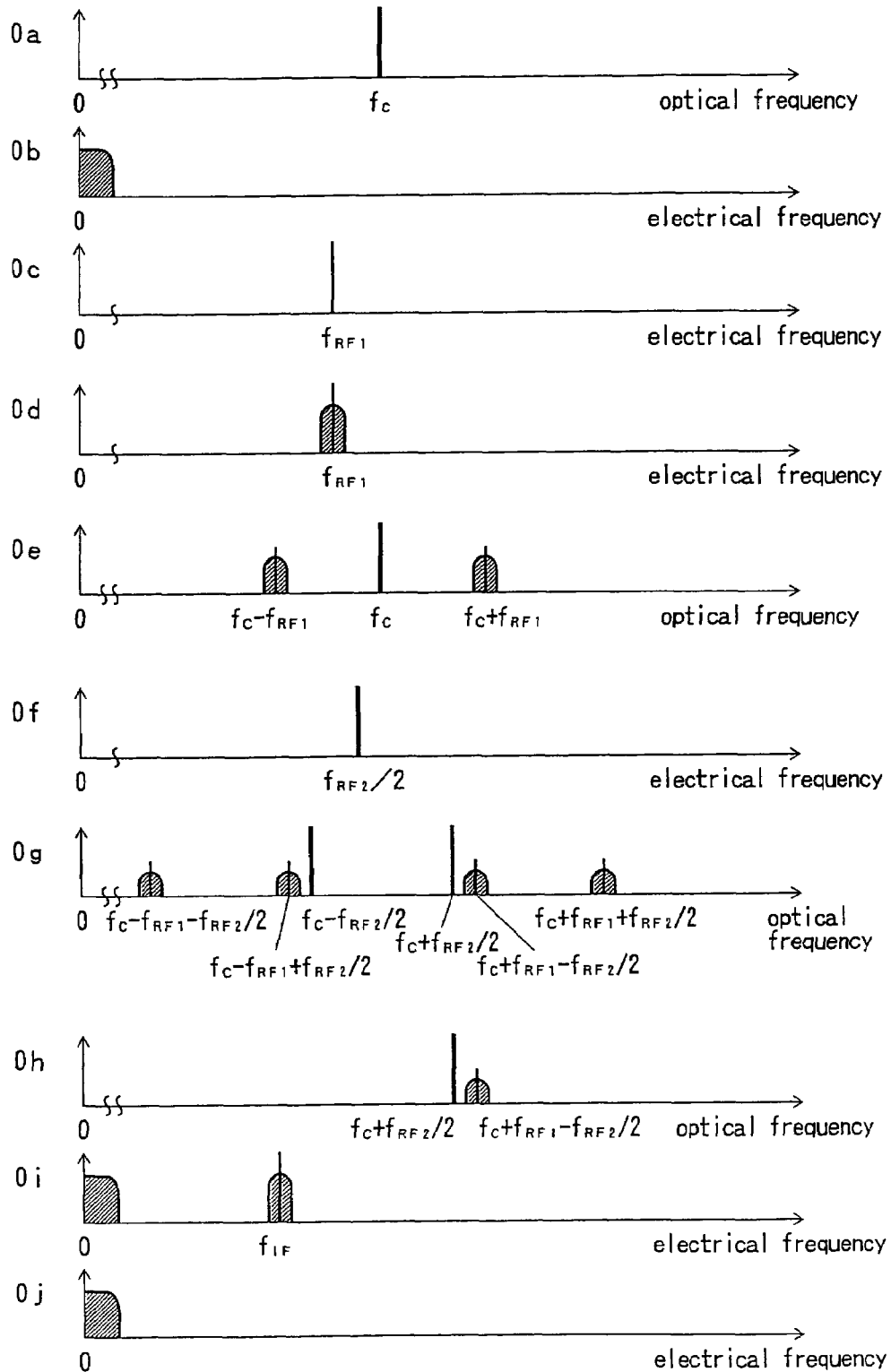

US 7,583,896 B2

OPTICAL-WIRELESS HYBRID TRANSMISSION SYSTEM AND OPTICAL-WIRELESS HYBRID TRANSMISSION METHOD

CROSS-REFERENCE TO RELATED APPLICATION

This application is based upon and claims the benefit of priority from Japanese Patent Application Nos. 2004-185956 and 2005-075305, each filed on Jun. 24, 2004 and Mar. 16, 2005, entire contents of which are incorporated herein by reference.

TECHNICAL FIELD

The present invention relates to an optical-wireless hybrid transmission system and an optical-wireless hybrid transmission method for converting a high-frequency RF signal received by a base station into an optical signal and transmitting it to a central office. In particular, the optical-wireless hybrid transmission system according to the invention is configured in such a manner that an optical carrier signal is transmitted from an optical transmitter of the central office to the base station via an optical transmission line, the base station optically modulates the optical carrier signal according to a received RF signal, and a modulated optical signal is transmitted from the base station to an optical receiver of the central office via an optical transmission line and received by the optical receiver.

BACKGROUND ART

FIG. 27 shows an exemplary configuration of a conventional optical-wireless hybrid transmission system. FIG. 28 shows an exemplary configuration of an optical receiver. FIG. 29 shows exemplary frequency spectra of respective signals in the conventional optical-wireless hybrid transmission system.

A central office 100 is equipped with an optical transmitter 10 and plural optical receivers 20. In the optical transmitter 10, an optical splitter 12 splits, into plural signals, a single-mode optical signal 0a (center frequency: $f_C$) that is output from a single-mode optical source 11. The split optical signals 0a are transmitted as optical carrier signals to plural base stations 300 via optical transmission lines 201 and input to optical modulators 301, respectively. Only one base station 300 is shown here.

On the other hand, in a wireless terminal 400, an electrical carrier signal 0c (frequency $f_{RF1}$) input from an oscillator 401 to a modulator 402 is intensity-modulated according to transmit-data 0b and a resulting RF signal 0d is transmitted from an antenna 403 to the base station 300. In the base station 300, the RF signal 0d modulated according to the transmit-data 0b is received by an antenna 302 and input to the optical modulator 301. The optical modulator 301 optical-intensity-modulates the optical carrier signal 0a supplied from the optical transmitter 10 according to the received RF signal, and a modulated optical signal 0e is amplified optically by an optical amplifier 303 and transmitted to the optical receiver 20 of the central office 100 via an optical transmission line 202. The plural optical receivers 20 are connected to the corresponding base stations 300, respectively.

In the optical receiver 20, the modulated optical signal 0e transmitted from the base station 300 is amplified optically by an optical amplifier 21 and then DSB-SC-modulated (DSB-SC: double-sideband suppressed-carrier) by using an electrical carrier signal 0f (frequency: $f_{RF2}/2$) that is input from an oscillator 22 to the optical modulator 23. Only an optical signal 0h including prescribed two waves is extracted from an output optical signal 0g of the optical modulator 23 by an optical filter 24, and then square-law-detected by a photodetector 25.

The frequency $f_{RF2}/2$ of the electrical carrier signal 0f that is output from the oscillator 22 is set at a half of a frequency that is lower than the frequency $f_{RF1}$ of the RF signal 0d by an arbitrary intermediate frequency $f_{IF}$, whereby an electrical signal 0i having the arbitrary intermediate frequency $f_{IF}$ is obtained as an output of the photodetector 25 and demodulated by an electrical demodulator 26. In this manner, receive-data 0j corresponding to the transmit-data 0b that is transmitted from the wireless terminal 400 is obtained without the need for using a receiver of an RF signal frequency band (refer to Non-patent document 1).

Non-patent document 1: Toshiaki Kuri and Ken-ichi Kitayama, "New Photonic Downconversion Technique with Optical Frequency Shifter for 60-GHz-Band Fiber-Radio Uplink Systems," Proceedings of the 2002 General Assembly of the Institute of Electronics, Information and Communication Engineers (IEICE), IEICE, Mar. 7, 2002, C-14-13.

DISCLOSURE OF THE INVENTION

Problems to be Solved by the Invention

In conventional optical-wireless hybrid transmission systems, an optical signal transmitted from the base station is DSB-SC-modulated in all the optical receivers corresponding to the respective base stations. Therefore, optical modulators having an RF signal frequency band need to be provided, making the configuration complex. In particular, where broadband signals are transmitted between the wireless terminals and the base stations, it is expected that a millimeter-wave band capable of securing a wide signal bandwidth will be employed as RF signal frequencies. However, optical modulators of a high frequency band for this purpose are expensive and hence the entire system is made expensive and complex in configuration.

Further, every optical receiver requires an optical amplifier for compensating for the loss of a conversion into an optical signal in the case where the loss of an optical fiber transmission is high, the insertion loss of the optical modulator in the base station is high, or the optical modulation index of the optical modulator is small. This makes the entire system expensive and complex in configuration.

An object of the present invention is therefore to provide an optical-wireless hybrid transmission system and an optical-wireless hybrid transmission method realizing high-sensitivity detection of an optical signal transmitted from a base station with a simple and inexpensive system configuration, that is, without complex and expensive components such as optical amplifiers and opto-electrical circuits of a high frequency band.

Means for Solving the Problems (First Invention)

According to a first invention, in an optical-wireless hybrid transmission system, a central office has an optical transmitter and an optical receiver, the optical transmitter transmits an optical carrier signal to a base station via an optical transmission line, the base station receives an RF signal (frequency: $f_{RF}$) that is modulated according to transmit-data, optically modulates the optical carrier signal according to the received RF signal, and transmits a resulting modulated optical signal to the central office via an optical transmission line, and the optical receiver receives and demodulates the modulated optical signal and reproduces the transmit-data. The optical transmitter and the optical receiver have the following configurations.

The optical transmitter includes a first single-mode optical source which outputs a first single-mode optical signal (center frequency: $f_{C1}$), a second single-mode optical source which outputs a second single-mode optical signal (center frequency: $f_{C2}$), a third single-mode optical source which outputs a third single-mode optical signal (center frequency: $f_{C3}$), and a polarization-coupling part which orthogonal-polarization-couples the second single-mode optical signal with the third single-mode optical signal while adjusting polarization directions and optical powers of the two waves so as to make the polarization directions orthogonal and the optical powers identical, and outputs a resulting polarization-coupled optical signal. The center frequencies $f_{C1}$, $f_{C2}$, and $f_{C3}$ of the first, second, and third single-mode optical signals are controlled so as to satisfy $$|f_{C1}-f_{C2}|=f_{RF}\pm f_{IF1}$$

$$|f_{C1}-f_{C3}|=f_{RF}\pm f_{IF2}$$

where $f_{RF}$ is the frequency of the RF signal and $f_{IF1}$ and $f_{IF2}$ are prescribed intermediate frequencies. The optical transmitter transmits the first single-mode optical signal to the base station as the optical carrier signal and outputs said polarization-coupled optical signal to the optical receiver.

The optical receiver includes an optical coupler which couples the modulated optical signal transmitted from the base station with said polarization-coupled optical signal that is output from the optical transmitter, a photodetector which photodetects a coupled optical signal output from the optical coupler and thereby outputs an electrical signal having the intermediate frequencies $f_{IF1}$ and $f_{IF2}$, an electrical demodulator which demodulates the electrical signal having the intermediate frequencies $f_{IF1}$ and $f_{IF2}$ and output from the photodetector, and a low-pass filter which filters an output signal of the electrical demodulator and thereby outputs the transmit-data.

According to the first invention, the optical transmitter transmits the first single-mode optical signal to the base station as the optical carrier signal and outputs, to the optical receiver, the polarization-coupled optical signal obtained by orthogonal-polarization-coupling the two waves, that is, the second single-mode optical signal and the third single-mode optical signal. At this time, the optical transmitter performs an automatic frequency control according to optical signals neither modulated nor attenuated, which can make the automatic frequency control easier than in a case that it is performed in an optical receiver according to a modulated optical signal that is attenuated due to a transmission loss as in conventional high-sensitivity optical detection.

The electric field $E_{opt-c}$ of the optical signal transmitted to the base station and the electric field $E_{opt-LO}$ of the polarization-coupled optical signal output to the optical receiver are given by the following formulae:

$$E_{opt-c}=A\cos(2\pi f_{C1}t+\phi_1(t)) \quad (1)$$

$$E_{opt-LO}=A_{LO}\cos(2\pi f_{C2}t+\phi_2(t))+A_{LO}\cos(2\pi f_{C3}t+\phi_3(t)) \quad (2)$$

where A and $A_{LO}$ are electric amplitudes and $\phi_1(t)$, $\phi_2(t)$, and $\phi_3(t)$ are phase-noise components of the output optical signals of the single-mode optical sources. The first and second terms on the right side of Formula (2) have orthogonal polarization directions and the same amplitude.

The base station optical-intensity-modulates the optical signal (Formula (1)) transmitted from the optical transmitter according to the RF signal transmitted from a wireless terminal, and transmits a resulting modulated optical signal to the optical receiver. The electric field $E_{opt-mod}$ of the modulated optical signal which has been modulated by binary amplitude shift keying and is transmitted to the optical receiver is given by the following formula:

$$E_{opt-mod} \propto (1+ma_i\cos 2\pi f_{RF}t)\cdot A\cos(2\pi f_{C1}(t+T)+\phi_1(t+T)) \quad (3)$$

where m is an optical modulation index, $a_i$ (=0 or 1) is an amplitude-modulation coefficient, and T is a time that is taken for an optical transmission between the central office and the base station.

The optical receiver couples the polarization-coupled optical signal (Formula (2)) output from the optical transmitter with the modulated optical signal (Formula (3)) transmitted from the base station, and then square-law-detects a resulting coupled optical signal with the photodetector. The electric field $E_{opt-co}$ of the coupled optical signal is given by the following formula:

$$E_{opt-co} = A_{LO}\cos(2\pi f_{C2}t + \phi_2(t)) + A_{LO}\cos(2\pi f_{C3}t + \phi_3(t)) + \\ (1/\gamma)(1 + ma_i\cos 2\pi f_{RF}t)\cdot A\cos(2\pi f_{C1}(t+2T) + \phi_1(t+2T)) \quad (4)$$

where $\gamma$ is the sum of an optical transmission loss of the base station-optical receiver link, an insertion loss of an optical modulator in the base station, and other losses ($\gamma \gg 1$).

The optical signal of the first and second terms on the right side of Formula (4) has a sufficient optical power because it is directly input from the optical transmitter to the optical receiver and hence has suffered no loss. Therefore, by square-law-detecting the optical signal of Formula (4) with the photodetector, the modulated optical signal (Formula (3)) transmitted from the base station can be received with high sensitivity as in the case of the optical heterodyne detection which is known as a high-sensitivity detection method.

The electric field $E_{IF}$ of the electrical signal including the two waves with the intermediate frequencies $f_{IF1}$ and $f_{IF2}$ and output from the photodetector is given by the following formula:

$$E_{IF} \approx Ga_i \begin{bmatrix} A\cdot A_{LO}\cdot\cos\theta\cdot\cos(2\pi f_{IF1}t+\psi_1) + \\ A\cdot A_{LO}\cdot\sin\theta\cdot\cos(2\pi f_{IF2}t+\psi_2) \end{bmatrix} \quad (5)$$

$$(\psi_1 = \pm[4\pi f_{C1}T + \phi_1(t+2T) - \phi_2(t)])$$

$$(\psi_2 = \pm[4\pi f_{C1}T + \phi_1(t+2T) - \phi_3(t)])$$

where G is a coefficient that depends on the gain of the above optical heterodyne detection, $\psi_1$ and $\psi_2$ are phase components of the respective electrical signals having the intermediate frequencies $f_{IF1}$ and $f_{IF2}$, and $\theta$ is an angle formed by the polarization direction of the modulated optical signal (Formula (3)) transmitted from the base station and the polarization direction of the optical signal represented by the first term of Formula (2) of the polarization-coupled optical signal that is output from the optical transmitter.

The optical transmitter performs a control to keep the center frequencies of the first, second, and third single-mode optical signals at set values. Therefore, in the optical receiver, a signal having stable intermediate frequencies can be obtained without the need for any of RF-band components and an automatic intermediate frequency controller that are complex in configuration.

When envelope-detecting the electrical signal including the two waves having the intermediate frequencies $f_{IF1}$ and $f_{IF2}$ and then causing a resulting detected signal to pass through the low-pass filter, the electric field $E_{BB}$ of an electrical signal obtained is given by the following formula:

$$E_{BB} \propto G^2 a_i^2 (A^2 \cdot A_{LO}^2 \cos^2\theta + A^2 \cdot A_{LO}^2 \sin^2\theta) = G^2 a_i^2 \cdot A^2 \cdot A_{LO}^2 \quad (6)$$

Since the polarization-coupled optical signal (Formula (2)) that is output from the optical transmitter has the orthogonal polarization directions and the same optical power, the output signal power of the low-pass filter is insensitive to the polarization direction of the modulated optical signal (Formula (3)) that is transmitted from the base station.

(Second Invention)

According to a second invention, in an optical-wireless hybrid transmission system a central office has an optical transmitter and an optical receiver, the optical transmitter transmits an optical carrier signal to a base station via an optical transmission line, the base station receives an RF signal (frequency: $f_{RF}$) that is modulated according to transmit-data, optically modulates the optical carrier signal according to the received RF signal, and transmits a resulting modulated optical signal to the central office via an optical transmission line, and the optical receiver receives and demodulates the modulated optical signal and reproduces the transmit-data. The optical transmitter and the optical receiver have the following configurations.

The optical transmitter includes a first single-mode optical source which outputs a first single-mode optical signal (center frequency: $f_{C1}$), a second single-mode optical source which outputs a second single-mode optical signal (center frequency: $f_{C2}$), a third single-mode optical source which outputs a third single-mode optical signal (center frequency: $f_{C3}$), and a polarization-coupling part which orthogonal-polarization-couples the second single-mode optical signal with the third single-mode optical signal while adjusting polarization directions and optical powers of the two waves so as to make the polarization directions orthogonal and the optical powers identical, and outputs a resulting polarization-coupled optical signal. The center frequencies $f_{C1}$, $f_{C2}$, and $f_{C3}$ of the first, second, and third single-mode optical signals are controlled so as to satisfy $$|f_{C1} - f_{C2}| = f_{RF} \pm f_{IF1}$$

$$|f_{C1} - f_{C3}| = f_{RF} \pm f_{IF2}$$

where $f_{RF}$ is the frequency of the RF signal and $f_{IF1}$ and $f_{IF2}$ are prescribed intermediate frequencies. The optical transmitter transmits the polarization-coupled optical signal to the base station as the optical carrier signal and outputs the first single-mode optical signal to the optical receiver.

The optical receiver includes an optical coupler which couples the modulated optical signal transmitted from the base station with the first single-mode optical signal that is output from the optical transmitter, a photodetector which photodetects a coupled optical signal output from the optical coupler and thereby outputs an electrical signal having the intermediate frequencies $f_{IF1}$ and $f_{IF2}$, an electrical demodulator which demodulates the electrical signal having the intermediate frequencies $f_{IF1}$ and $f_{IF2}$ and output from the photodetector, and a low-pass filter which filters an output signal of the electrical demodulator and thereby outputs the transmit-data.

According to the second invention, the optical transmitter transmits the polarization-coupled optical signal obtained by orthogonal-polarization-coupling the two waves, that is, the second single-mode optical signal and the third single-mode optical signal, to the base station as the optical carrier signal and outputs the first single-mode optical signal to the optical receiver.

The electric field $E_{opt-c}$ of the polarization-coupled optical signal transmitted to the base station and the electric field $E_{opt-LO}$ of the optical signal output to the optical receiver are given by the following formulae:

$$E_{opt-c} = A\cos(2\pi f_{C2} t + \phi_2(t)) + A\cos(2\pi f_{C3} t + \phi_3(t)) \quad (7)$$

$$E_{opt-LO} = A_{LO}\cos(2\pi f_{C1} t + \phi_1(t)) \quad (8)$$

where $A$ and $A_{LO}$ are electric amplitudes and $\phi_1(t)$, $\phi_2(t)$, and $\phi_3(t)$ are phase-noise components of the output optical signals of the single-mode optical sources. The first and second terms on the right side of Formula (7) have orthogonal polarization directions and the same amplitude.

The base station optical-intensity-modulates the optical signal (Formula (7)) transmitted from the optical transmitter according to the RF signal transmitted from a wireless terminal, and transmits a resulting modulated optical signal to the optical receiver. The electric field $E_{opt-mod}$ of the modulated optical signal which has been modulated by binary amplitude shift keying and is transmitted to the optical receiver is given by the following formula:

$$E_{opt-mod} \propto (1 + ma_i \cos 2\pi f_{RF} t) \cdot \begin{bmatrix} A\cos(2\pi f_{C2}(t+T) + \phi_2(t+T)) + \\ A\cos(2\pi f_{C3}(t+T) + \phi_3(t+T)) \end{bmatrix} \quad (9)$$

where $m$ is an optical modulation index, $a_i$ (=0 or 1) is an amplitude-modulation coefficient, and $T$ is a time taken for an optical transmission between the central office and the base station.

The optical receiver couples the optical signal (Formula (8)) that is output from the optical transmitter with the modulated optical signal (Formula (9)) transmitted from the base station, and then square-law-detects a resulting coupled optical signal with the photodetector. The electric field $E_{opt-co}$ of the coupled optical signal is given by the following formula:

$$E_{opt-co} = A_{LO}\cos(2\pi f_{C1} t + \phi_1(t)) + \\ (1/\gamma)(1 + ma_i \cos 2\pi f_{RF} t) \cdot \begin{bmatrix} A\cos(2\pi f_{C2}(t+2T) + \phi_2(t+2T)) + \\ A\cos(2\pi f_{C3}(t+2T) + \phi_3(t+2T)) \end{bmatrix} \quad (10)$$

where $\gamma$ is the sum of an optical transmission loss of the base station-optical receiver link, an insertion loss of an optical modulator in the base station, and other losses ($\gamma \gg 1$).

The optical signal of the first term on the right side of Formula (10) has a sufficient optical power because it is directly input from the optical transmitter to the optical receiver and hence has suffered no loss. Therefore, by square-law-detecting the optical signal of Formula (10) with the photodetector, the modulated optical signal (Formula (9)) transmitted from the base station can be received with high sensitivity as in the case of the optical heterodyne detection which is known as a high-sensitivity detection method.

The electric field $E_{IF}$ of the electrical signal including the two waves having the intermediate frequencies $f_{IF1}$ and $f_{IF2}$ and output from the photodetector is given by the following formula:

$$E_{IF} \approx Ga_i \begin{bmatrix} A \cdot A_{LO} \cdot \cos\theta \cdot \cos(2\pi f_{IF1}t + \phi_1) + \\ A \cdot A_{LO} \cdot \sin\theta \cdot \cos(2\pi f_{IF2}t + \phi_2) \end{bmatrix} \quad (11)$$

$$(\phi_1 = \pm[4\pi f_{C2}T + \phi_2(t+2T) - \phi_1(t)])$$

$$(\phi_2 = \pm[4\pi f_{C3}T + \phi_3(t+2T) - \phi_1(t)])$$

where G is a coefficient that depends on the gain of the above optical heterodyne detection, $\psi_1$ and $\psi_2$ are phase components of the respective electrical signals having the intermediate frequencies $f_{IF1}$ and $f_{IF2}$, and $\theta$ is an angle formed by the polarization direction of the optical signal represented by the first term of Formula (9) of the modulated optical signal transmitted from the base station and the polarization direction of the optical signal (Formula (8)) that is output from the optical transmitter.

The optical transmitter performs a control to keep the center frequencies of the first, second, and third single-mode optical signals at set values. Therefore, in the optical receiver, a signal having stable intermediate frequencies can be obtained without the need for using any of RF-band components and an automatic intermediate frequency controller that are complex in configuration.

When envelope-detecting the electrical signal including the two waves having the intermediate frequencies $f_{IF1}$ and $f_{IF2}$ and then causing a resulting detected signal to pass through the low-pass filter, the electric field $E_{BB}$ of an electrical signal obtained is given by the following formula:

$$E_{BB} \propto G^2 a_i^2 (A^2 \cdot A_{LO}^2 \cos^2\theta + A^2 \cdot A_{LO}^2 \cdot \sin^2\theta) = G^2 a_i^2 \cdot A^2 \cdot A_{LO}^2 \quad (12)$$

Since the polarization-coupled optical signal (Formula (7)) output from the optical transmitter has the orthogonal polarization directions and the same optical power, the output signal power of the low-pass filter is insensitive to the polarization direction of the modulated optical signal (Formula (9)) that is transmitted from the base station.

(Third Invention)

A third invention relates to another configuration of the optical receiver in the optical-wireless hybrid transmission system according to the first or second invention.

The optical receiver includes, in place of the electrical demodulator and the low-pass filter of the optical receiver according to the first or second invention, a filter which separates from each other an electrical signal having the intermediate frequency $f_{IF1}$ and an electrical signal having the intermediate frequency $f_{IF2}$ output from the photodetector, a first electrical demodulator and a second electrical demodulator which demodulate the electrical signal having the intermediate frequency $f_{IF1}$ and the electrical signal having the intermediate frequency $f_{IF2}$, respectively, that are output from the filter, and a combiner which combines an output signal of the first electrical demodulator with an output signal of the second electrical demodulator and thereby outputs the transmit-data.

In the optical receiver according to the third invention, the electrical signals having the intermediate frequencies $f_{IF1}$ and $f_{IF2}$ (Formula (5) or (11)) are separated from each other by the filter, whereby the following two electrical signals $E_{IF1}$ and $E_{IF2}$ having the intermediate frequencies $f_{IF1}$ and $f_{IF2}$ are obtained:

$$E_{IF1} \approx Ga_i A \cdot A_{LO} \cdot \cos\theta \cdot \cos(2\pi f_{IF1}t + \phi_1) \quad (13)$$

$$E_{IF2} \approx Ga_i A \cdot A_{LO} \cdot \sin\theta \cdot \cos(2\pi f_{IF2}t + \phi_2) \quad (14)$$

These electrical signals having the intermediate frequencies $f_{IF1}$ and $f_{IF2}$ are envelope-detected individually and resulting electrical signals are combined with each other by the combiner. The electric field $E_{BB}$ of an electrical signal obtained by the combiner is given by the following formula.

$$E_{BB} \propto G^2 a_i^2 (A^2 \cdot A_{LO}^2 \cdot \cos^2\theta + A^2 \cdot A_{LO}^2 \cdot \sin^2\theta) = G^2 a_i^2 \cdot A^2 \cdot A_{LO}^2 \quad (15)$$

In the first invention, the polarization-coupled optical signal (Formula (2)) output from the optical transmitter to the optical receiver has the orthogonal polarization directions and the same optical power. In the second invention, the optical signal (Formula (7)) transmitted from the optical transmitter to the base station has the orthogonal polarization directions and the same optical power. Therefore, the output of the combiner of the optical receiver according to the invention is insensitive to the polarization direction of the modulated optical signal (Formula (3) or (9)) that is transmitted from the base station.

According to the third invention as described above, the optical receiver is able to perform high-sensitivity optical detection with a simple configuration including one photodetector and two electrical demodulators of an intermediate frequency band, without the need for any of RF-band components, an automatic intermediate frequency controller, and a polarization-diversity circuit.

(Fourth Invention)

A fourth invention relates to another configuration of the optical receiver in the optical-wireless hybrid transmission system according to the first or second invention.

The optical receiver includes, in place of the electrical demodulator and the low-pass filter of the optical receiver according to the first or second invention, a filter which separates from each other an electrical signal having the intermediate frequency $f_{IF1}$ and an electrical signal having the intermediate frequency $f_{IF2}$ output from the photodetector, a first electrical demodulator and a second electrical demodulator which demodulate the electrical signal having the intermediate frequency $f_{IF1}$ and the electrical signal having the intermediate frequency $f_{IF2}$, respectively, that are output from the filter, and a delay-controllable combiner which combines an output signal of the first electrical demodulator with an output signal of the second electrical demodulator while equalizing their phases and thereby outputs the transmit-data.

In the optical receiver according to the fourth invention, not only can a constant output reception signal be obtained which is insensitive to the polarization direction of the modulated optical signal transmitted from the base station as in the case of the optical receiver according to the third invention, but also the following function is realized. Combining the output signal of the first electrical demodulator with the output signal of the second electrical demodulator while equalizing their phases makes it possible to compensate for a time difference occurring between the output signal of the first electrical demodulator and the output signal of the second electrical demodulator due to dispersion in the optical transmission lines.

As described above, the fourth invention not only enables high-sensitivity optical detection as in the third invention but also can realize optical detection without being influenced by dispersion in the optical transmission lines by compensating for a time difference occurring between the output signal of the first electrical demodulator and the output electrical signal of the second electrical demodulator due to the dispersion. Where as in the case of the first invention the one-wave optical signal (Formula (1)) is transmitted from the optical transmitter to the base station and the modulated optical signal (Formula (3)) is transmitted from the base station to the optical receiver, influences of dispersion in the optical transmission lines appear in the modulated optical signal having the double sideband components. Where as in the second invention the two-wave polarization-coupled optical signal (Formula (7)) is transmitted from the optical transmitter to the base station and the modulated optical signal (Formula (9)) is transmitted from the base station to the optical receiver, influences of dispersion in the optical transmission lines appear in both optical signals.

(Fifth Invention)

According to a fifth invention, the optical-wireless hybrid transmission system according to the first invention further includes plural base stations, and plural optical receivers in the central office. The optical receivers receive modulated optical signals transmitted from the plural base stations, respectively. The optical transmitter includes a first optical splitter which splits the first single-mode optical signal into plural optical signals and transmits the split optical signals to the plural base stations as optical carrier signals, respectively, and a second optical splitter which splits the polarization-coupled optical signal into plural optical signals and outputs the split optical signals to the plural optical receivers, respectively.

According to the fifth invention, none of the optical receivers need to use any of RF-band components, an automatic intermediate frequency controller, and a polarization-diversity circuit, whereby the configuration of the entire system can be simplified to a large extent.

(Sixth Invention)

According to a sixth invention, the optical-wireless hybrid transmission system according to the second invention further includes plural base stations, and plural optical receivers in the central office. The optical receivers receive modulated optical signals transmitted from the plural base stations, respectively. The optical transmitter further includes a first optical splitter which splits the polarization-coupled optical signal into plural optical signals and transmits the split optical signals to the plural base stations as optical carrier signals, respectively, and a second optical splitter which splits the first single-mode optical signal into plural optical signals and outputs the split optical signals to the plural optical receivers, respectively.

According to the sixth invention, none of the optical receivers need to use any of RF-band components, an automatic intermediate frequency controller, and a polarization-diversity circuit, whereby the configuration of the entire system can be simplified to a large extent.

(Seventh Invention)

According to a seventh invention, the optical-wireless hybrid transmission system according to the fifth invention further includes an output-power-controllable optical splitter in place of the first optical splitter of the optical transmitter, being capable of individually setting optical powers of the optical carrier signals to be transmitted to the plural base stations, respectively.

In the seventh invention, the optical transmitter transmits the first single-mode optical signals (optical carrier signals) to the plural base stations at prescribed optical powers, respectively, and outputs the polarization-coupled optical signals each including the two waves, that is, the second single-mode optical signal and the third single-mode optical signal, to the plural optical receivers.

The electric field $E_{opt\text{-}c}(i)$ of the optical signal transmitted to each base station and the electric field $E_{opt\text{-}LO}(i)$ of the polarization-coupled optical signal output to each optical receiver are given by the following formulae:

$$E_{opt\text{-}c}(i)=A_C(i)\cos(2\pi f_{C1}t+\phi_1(t)) \tag{16}$$

$$E_{opt\text{-}LO}(i)=A_{LO}\cos(2\pi f_{C2}t+\phi_2(t))+A_{LO}\cos(2\pi f_{C3}t+\phi_3(t)) \tag{17}$$

where i is an identification number indicating each base station-optical receiver link, $A_C(i)$ and $A_{LO}$ are electric amplitudes, and $\phi_1(t)$, $\phi_2(t)$, and $\phi_3(t)$ are phase-noise components of the output optical signals of the single-mode optical sources. The first and second terms on the right side of Formula (17) have orthogonal polarization directions and the same amplitude.

Each of the base stations optical-intensity-modulates the optical signal (Formula (16)) transmitted from the optical transmitter according to the RF signal transmitted from a wireless terminal, and transmits a resulting modulated optical signal to the optical receiver. The electric field $E_{opt\text{-}mod}(i)$ of the modulated optical signal which has been modulated by binary amplitude shift keying and is transmitted to the optical receiver is given by the following formula:

$$E_{opt\text{-}mod}(i) \propto (1+m(i)a_i \cos 2\pi f_{RF}t)\cdot A_C(i)\cos(2\pi f_{C1}(t+T)+\phi_1(t+T)) \tag{18}$$

where m(i) is an optical modulation index which depends on the signal power of the RF signal input to an optical modulator as well as on the wireless transmission length between the base station and the wireless terminal of each link. And T is a time taken for an optical transmission between the central office and the base station, and $a_i$ (=0 or 1) is an amplitude-modulation coefficient.

Each of the optical receivers couples the polarization-coupled optical signal (Formula (17)) output from the optical transmitter with the modulated optical signal (Formula (18)) transmitted from the base station, and then square-law-detects a resulting coupled optical signal with the photodetector. The electric field $E_{opt\text{-}co}(i)$ of the coupled optical signal is given by the following formula:

$$E_{opt\text{-}co}(i) = \tag{19}$$
$$A_{LO}\cos(2\pi f_{C2}t + \phi_2(t)) + A_{LO}\cos(2\pi f_{C3}t + \phi_3(t)) + (1/\gamma(i))$$
$$(1 + m(i)a_i\cos2\pi f_{RF}t)\cdot A_C(i)\cos(2\pi f_{C1}(t+2T) + \phi_1(t+2T))$$

where $\gamma(i)$ is the sum of an optical transmission loss of each base station-optical receiver link, an insertion loss of the optical modulator in the base station, and other losses ($\gamma \gg 1$).

The optical signal of the first and second terms on the right side of Formula (19) has a sufficient optical power because it is directly input from the optical transmitter to the optical receiver and hence has suffered no loss. Therefore, by square-law-detecting the optical signal of Formula (19) with the photodetector, the modulated optical signal (Formula (18)) transmitted from the base station can be received with high sensitivity as in the case of the optical heterodyne detection which is known as a high-sensitivity detection method.

The electric field $E_{IF}(i)$ of the electrical signal including the two waves having the intermediate frequencies $f_{IF1}$ and $f_{IF2}$ and output from the photodetector is given by the following formula:

$$E_{IF}(i) \propto (m(i)/\gamma(i)) \cdot a_i \begin{bmatrix} A_{LO} \cdot A_C(i) \cdot \cos\theta \cdot \cos(2\pi f_{IF1} t + \phi_1) + \\ A_{LO} \cdot A_C(i) \cdot \sin\theta \cdot \cos(2\pi f_{IF2} t + \phi_2) \end{bmatrix} = \quad (20)$$

$$(1/k(i)) \cdot a_i \begin{bmatrix} A_{LO} \cdot A_C(i) \cdot \cos\theta \cdot \cos(2\pi f_{IF1} t + \phi_1) + \\ A_{LO} \cdot A_C(i) \cdot \sin\theta \cdot \cos(2\pi f_{IF2} t + \phi_2) \end{bmatrix}$$

$$(\phi_1 = \pm[4\pi f_{C1} T + \phi_1(t+2T) - \phi_2(t)])$$

$$(\phi_2 = \pm[4\pi f_{C1} T + \phi_1(t+2T) - \phi_3(t)])$$

where $\psi_1$ and $\psi_2$ are phase components of the respective electrical signals having the intermediate frequencies $f_{IF1}$ and $f_{IF2}$, and $\theta$ is an angle formed by the polarization direction of the modulated optical signal (Formula (18)) transmitted from the base station and the polarization direction of the optical signal represented by the first term of Formula (17) of the polarization-coupled optical signal that is output from the optical transmitter. And k(i) is a coefficient that depends on the optical fiber transmission length and the wireless transmission length of each link and represents an amplitude component of the modulated optical signal. The coefficient k(i) satisfies the following formula:

$$k(i) = \gamma(i)/m(i) \quad (21)$$

The optical transmitter performs a control to keep the center frequencies of the first, second, and third single-mode optical signals at set values. Therefore, in each optical receiver, an electrical signal having stable intermediate frequencies $f_{IF1}$ and $f_{IF2}$ can be obtained without the need for using any of RF-band components and an automatic intermediate frequency controller that are complex in configuration.

Further, since the output-power-controllable optical splitter of the optical transmitter controls the optical powers of the optical signals that are transmitted to the respective base stations, it is possible to control the signal power of the electrical signal having the intermediate frequencies $f_{IF1}$ and $f_{IF2}$ obtained as the output of the photodetector of each optical receiver.

When envelope-detecting the electrical signal including the two waves having the intermediate frequencies $f_{IF1}$ and $f_{IF2}$ and then causing a resulting detected signal to pass through the low-pass filter, the electric field $E_{BB}(i)$ of an electrical signal obtained is given by the following formula:

$$E_{BB}(i) \propto (1/k(i))^2 a_i^2 (A_{LO}^2 A_C(i)^2 \cos^2\theta + A_{LO}^2 A_C(i)^2 \sin^2\theta) = \quad (22)$$

$$(1/k(i))^2 a_i^2 A_{LO}^2 A_C(i)^2$$

Since the polarization-coupled optical signal (Formula (17)) output from the optical transmitter has the orthogonal polarization directions and the same optical power, in each optical receiver the output signal power of the low-pass filter is insensitive to the polarization direction of the modulated optical signal (Formula (18)) that is transmitted from the base station. The same is true of an electrical signal that is obtained by the combiner or the delay-controllable combiner in the case where the seventh invention employs the optical receiver according to the third or fourth invention.

(Eighth Invention)

According to an eighth invention, the optical-wireless hybrid transmission system according to the fifth invention further includes an output-power-controllable optical splitter in place of the second optical splitter of the optical transmitter, being capable of individually setting optical powers of the polarization-coupled optical signals to be output to the plural optical receivers, respectively.

In the eighth invention, the first single-mode optical signals (optical carrier signals) are transmitted to the plural base stations and the polarization-coupled optical signals each including the two waves, that is, the second single-mode optical signal and the third single-mode optical signal, are output to the plural optical receivers at prescribed optical powers, respectively.

The electric field $E_{opt-c}(i)$ of the optical signal transmitted to each base station and the electric field $E_{opt-LO}(i)$ of the polarization-coupled optical signal output to each optical receiver are given by the following formulae:

$$E_{opt-c}(i) = A_C \cos(2\pi f_{c1} t + \phi_1(t)) \quad (23)$$

$$E_{opt-LO}(i) = A_{LO}(i)\cos(2\pi f_{c2} t + \phi_2(t)) + A_{LO}(i)(\cos 2\pi f_{c3} t + \phi_3(t)) \quad (24)$$

where i is an identification number indicating each base station-optical receiver link, $A_C$ and $A_{LO}(i)$ are electric amplitudes, and $\phi_1(t)$, $\phi_2(t)$, and $\phi_3(t)$ are phase-noise components of the output optical signals of the single-mode optical sources. The first and second terms on the right side of Formula (24) have orthogonal polarization directions and the same amplitude.

Each of the base stations optical-intensity-modulates the optical signal (Formula (23)) transmitted from the optical transmitter according to the RF signal transmitted from a wireless terminal, and transmits a resulting modulated optical signal to the optical receiver. The electric field $E_{opt-mod}(i)$ of the modulated optical signal which has been modulated by binary amplitude shift keying and is transmitted to the optical receiver is given by the following formula:

$$E_{opt-mod}(i) \propto (1+m(i) a_i \cos 2\pi f_{RF} t) \cdot A_C \cos(2\pi f_{c1}(t+T) + \phi_1(t+T)) \quad (25)$$

where m(i) is an optical modulation index which depends on the signal power of the RF signal that is input to an optical modulator as well as on the wireless transmission length between the base station and the wireless terminal of each link. And T is a time taken for an optical transmission between the central office and the base station, and $a_i$ (=0 or 1) is an amplitude-modulation coefficient.

Each of the optical receivers couples the polarization-coupled optical signal (Formula (24)) that is output from the optical transmitter with the modulated optical signal (Formula (25)) transmitted from the base station, and then square-law-detects a resulting coupled optical signal with the photodetector. The electric field $E_{opt-co}(i)$ of the coupled optical signal is given by the following formula:

$$E_{opt-co}(i) = A_{LO}(i)\cos(2\pi f_{c2} t + \phi_2(t)) + A_{LO}(i)\cos(2\pi f_{c3} t + \phi_3(t)) + \quad (26)$$

$$(1/\gamma(i))(1 + m(i) a_i \cos 2\pi f_{RF} t) \cdot A_C \cos(2\pi f_{c1}(t+2T) + \phi_1(t+2T))$$

where $\gamma(i)$ is the sum of an optical transmission loss of each base station-optical receiver link, an insertion loss of the optical modulator in the base station, and other losses ($\gamma(i) \gg 1$).

The optical signal of the first and second terms on the right side of Formula (26) has a sufficient optical power because it is directly input from the optical transmitter to the optical receiver and hence has suffered no loss. Therefore, by square-law-detecting the optical signal of Formula (26) with the photodetector, the modulated optical signal (Formula (25)) transmitted from the base station can be received with high sensitivity as in the case of the optical heterodyne detection which is known as a high-sensitivity detection method.

The electric field $E_{IF}(i)$ of the electrical signal having the intermediate frequencies $f_{IF1}$ and $f_{IF2}$ and output from the photodetector is given by the following formula:

$$E_{IF}(i) \propto (m(i)/\gamma(i)) \cdot a_i [A_{LO}(i) \cdot A_C \cdot \cos\theta \cdot \cos(2\pi f_{IF1}t + \phi_1) + \quad (27)$$
$$A_{LO}(i) \cdot A_C \cdot \sin\theta \cdot \cos(2\pi f_{IF2}t + \phi_2)] =$$
$$(1/k(i)) \cdot a_i [A_{LO}(i) \cdot A_C \cdot \cos\theta \cdot \cos(2\pi f_{IF1}t + \phi_1) +$$
$$A_{LO}(i) \cdot A_C \cdot \sin\theta \cdot \cos(2\pi f_{IF2}t + \phi_2)]$$
$$(\phi_1 = \pm[4\pi f_{c1}T + \phi_1(t+2T) - \phi_2(t)])$$
$$(\phi_2 = \pm[4\pi f_{c1}T + \phi_1(t+2T) - \phi_3(t)])$$

where $\psi_1$ and $\psi_2$ are phase components of the respective electrical signals having the intermediate frequencies $f_{IF1}$ and $f_{IF2}$, and $\theta$ is an angle formed by the polarization direction of the modulated optical signal (Formula (25)) transmitted from the base station and the polarization direction of the optical signal represented by the first term of Formula (24) of the polarization-coupled optical signal that is output from the optical transmitter. And k(i) is a coefficient that depends on the optical fiber transmission length and the wireless transmission length of each link and represents an amplitude component of the modulated optical signal. The coefficient k(i) satisfies the following formula:

$$k(i) = \gamma(i)/m(i) \quad (28)$$

The optical transmitter performs a control to keep the center frequencies of the first, second, and third single-mode optical signals at set values. Therefore, in each optical receiver, an electrical signal having stable intermediate frequencies $f_{IF1}$ and $f_{IF2}$ can be obtained without the need for using any of RF-band components and an automatic intermediate frequency controller that are complex in configuration.

Further, since the output-power-controllable optical splitter of the optical transmitter controls the optical powers of the polarization-coupled optical signals that are transmitted to the respective optical receivers, it is possible to control the signal power of the electrical signal having the intermediate frequencies $f_{IF1}$ and $f_{IF2}$ obtained as the output of the photodetector of each optical receiver.

When envelope-detecting the electrical signal including the two waves having the intermediate frequencies $f_{IF1}$ and $f_{IF2}$ and then causing a resulting detected signal to pass through the low-pass filter, the electric field $E_{BB}(i)$ of an electrical signal obtained is given by the following formula:

$$E_{BB}(i) \propto (1/k(i))^2 a_i^2 (A_{LO}(i)^2 A_C^2 \cos^2\theta + A_{LO}(i)^2 A_C^2 \sin^2\theta) = \quad (29)$$
$$(1/k(i))^2 a_i^2 A_{LO}(i)^2 A_C^2$$

Since the polarization-coupled optical signal (Formula (24)) that is output from the optical transmitter has the orthogonal polarization directions and the same optical power, in each optical receiver the output signal power of the low-pass filter is insensitive to the polarization direction of the modulated optical signal (Formula (25)) that is transmitted from the base station. The same is true of an electrical signal that is obtained by the combiner or the delay-controllable combiner in the case where the eighth invention employs the optical receiver according to the third or fourth invention.

(Ninth Invention)

According to a ninth invention, the optical-wireless hybrid transmission system according to the fifth invention further includes an output-power-controllable optical splitter in place of the first optical splitter of the optical transmitter, being capable of individually setting optical powers of the optical carrier signals to be transmitted to the plural base stations, respectively as well as an output-power-controllable optical splitter used in place of the second optical splitter, being capable of individually setting optical powers of the polarization-coupled optical signals to be output to the plural optical receivers, respectively.

In the ninth invention, the first single-mode optical signals are transmitted to the plural base stations at prescribed optical powers, respectively, and the polarization-coupled optical signals each including the two waves, that is, the second single-mode optical signal and the third single-mode optical signal, are output to the plural optical receivers at prescribed optical powers, respectively.

The electric field $E_{opt-c}(i)$ of the optical signal transmitted to each base station and the electric field $E_{opt-LO}(i)$ of the polarization-coupled optical signal output to each optical receiver are given by the following formulae:

$$E_{opt-c}(i) = A_C(i)\cos(2\pi f_{c1}t + \phi_1(t)) \quad (30)$$

$$E_{opt-LO}(i) = A_{LO}(i)\cos(2\pi f_{c2}t + \phi_2(t)) + A_{LO}(i)(\cos 2\pi f_{c3}t + \phi_3(t)) \quad (31)$$

Each of the base stations optical-intensity-modulates the optical signal (Formula (30)) transmitted from the optical transmitter according to the RF signal transmitted from a wireless terminal, and transmits a resulting modulated optical signal to the optical receiver. The electric field $E_{opt-mod}(i)$ of the modulated optical signal which has been modulated by binary amplitude shift keying and is transmitted to the optical receiver is given by the following formula:

$$E_{opt-mod}(i) \propto (1+m(i)a_i \quad \cos \quad 2\pi f_{RF}t) \cdot A_C(i)\cos(2\pi f_{c1}(t+T) + \phi_1(t+T)) \quad (32)$$

where m(i) is an optical modulation index which depends on the signal power of the RF signal input to an optical modulator as well as on the wireless transmission length between the base station and the wireless terminal of each link. And T is a time taken for an optical transmission between the central office and the base station, and $a_i$ (=0 or 1) is an amplitude-modulation coefficient.

Each of the optical receivers couples the polarization-coupled optical signal (Formula (31)) output from the optical transmitter with the modulated optical signal (Formula (32)) transmitted from the base station, and then square-law-detects a resulting coupled optical signal with the photodetector. The electric field $E_{opt-co}(i)$ of the coupled optical signal is given by the following formula:

$$E_{opt\text{-}co}(i) = \qquad (33)$$

$$A_{LO}(i)\cos(2\pi f_{c2}t + \phi_2(t)) + A_{LO}(i)\cos(2\pi f_{c3}t + \phi_3(t)) + (1/\gamma(i))$$

$$(1 + m(i)a_i\cos 2\pi f_{RF}t) \cdot A_C(i)\cos(2\pi f_{c1}(t + 2T) + \phi_1(t + 2T))$$

where $\gamma(i)$ is the sum of an optical transmission loss of each base station-optical receiver link, an insertion loss of the optical modulator in the base station, and other losses ($\gamma(i) \gg 1$).

The optical signal of the first and second terms on the right side of Formula (33) has a sufficient optical power because it is directly input from the optical transmitter to the optical receiver and hence has suffered no loss. Therefore, by square-law-detecting the optical signal of Formula (33) with the photodetector, the modulated optical signal (Formula (32)) transmitted from the base station can be received with high sensitivity as in the case of the optical heterodyne detection which is known as a high-sensitivity detection method.

The electric field $E_{IF}(i)$ of the electrical signal having the intermediate frequencies $f_{IF1}$ and $f_{IF2}$ and output from the photodetector is given by the following formula:

$$E_{IF}(i) \propto (m(i)/\gamma(i)) \cdot a_i[A_{LO}(i) \cdot A_C(i) \cdot \cos\theta \cdot \cos(2\pi f_{IF1}t + \psi_1) + \qquad (34)$$

$$A_{LO}(i) \cdot A_C(i) \cdot \sin\theta \cdot \cos(2\pi f_{IF2}t + \psi_2)] =$$

$$(1/k(i)) \cdot a_i[A_{LO}(i) \cdot A_C(i) \cdot \cos\theta \cdot \cos(2\pi f_{IF1}t + \psi_1) +$$

$$A_{LO}(i) \cdot A_C(i) \cdot \sin\theta \cdot \cos(2\pi f_{IF2}t + \psi_2)]$$

$$(\psi_1 = \pm[4\pi f_{c1}T + \phi_1(t + 2T) - \phi_2(t)])$$

$$(\psi_2 = \pm[4\pi f_{c1}T + \phi_1(t + 2T) - \phi_3(t)])$$

where $\psi_1$ and $\psi_2$ are phase components of the respective electrical signals having the intermediate frequencies $f_{IF1}$ and $f_{IF2}$, and $\theta$ is an angle formed by the polarization direction of the modulated optical signal (Formula (32)) transmitted from the base station and the polarization direction of the optical signal represented by the first term of Formula (31) of the polarization-coupled optical signal that is output from the optical transmitter. And k(i) is a coefficient that depends on the optical fiber transmission length and the wireless transmission length of each link and represents an amplitude component of the modulated optical signal. The coefficient k(i) satisfies the following formula:

$$k(i) = \gamma(i)/m(i) \qquad (35)$$

The optical transmitter performs a control to keep the frequencies of the first, second, and third single-mode optical signals at set values. Therefore, in each optical receiver, an electrical signal having stable intermediate frequencies $f_{IF1}$ and $f_{IF2}$ can be obtained without the need for using any of RF-band components and an automatic intermediate frequency controller that are complex in configuration.

Further, since the output-power-controllable optical splitters of the optical transmitter control the optical powers of the optical signals that are transmitted to the respective base stations and the optical powers of the polarization-coupled optical signals that are output to the respective optical receivers, it is possible to control the signal power of the electrical signal having the intermediate frequencies $f_{IF1}$ and $f_{IF2}$ obtained as the output of the photodetector of each optical receiver.

When envelope-detecting the electrical signal including the two waves having the intermediate frequencies $f_{IF1}$ and $f_{IF2}$ and then causing a resulting detected signal to pass through the low-pass filter, the electric field $E_{BB}(i)$ of an electrical signal obtained is given by the following formula:

$$E_{BB}(i) \propto (1/k(i))^2 a_i^2(A_{LO}(i)^2 A_C(i)^2\cos^2\theta + A_{LO}(i)^2 A_C(i)^2\sin^2\theta) = \qquad (36)$$

$$(1/k(i))^2 a_i^2 A_{LO}(i)^2 A_C(i)^2$$

Since the polarization-coupled optical signal (Formula (31)) that is output from the optical transmitter has the orthogonal polarization directions and the same optical power, in each optical receiver the output signal power of the low-pass filter is insensitive to the polarization direction of the modulated optical signal that is transmitted from the base station. The same is true of an electrical signal that is obtained by the combiner or the delay-controllable combiner in the case where the ninth invention employs the optical receiver according to the third or fourth invention.

(10th Invention)

According to a 10th invention, the optical-wireless hybrid transmission system according to the sixth invention further includes an output-power-controllable optical splitter in place of the first optical splitter of the optical transmitter, being capable of individually setting optical powers of the optical carrier signals (polarization-coupled optical signals) to be transmitted to the plural base stations, respectively.

In the 10th invention, the optical transmitter transmits the polarization-coupled optical signals each including the two waves, that is, the second single-mode optical signal and the third single-mode optical signal, to the plural base stations at prescribed optical powers, respectively, and outputs the first single-mode optical signals to the plural optical receivers.

The electric field $E_{opt\text{-}c}(i)$ of the polarization-coupled optical signal transmitted to each base station and the electric field $E_{opt\text{-}LO}(i)$ of the optical signal output to each optical receiver are given by the following formulae:

$$E_{opt\text{-}c}(i) = A_C(i)\cos(2\pi f_{C2}t + \phi_2(t)) + A_C(i)\cos(2\pi f_{C3}t + \phi_3(t)) \qquad (37)$$

$$E_{opt\text{-}LO}(i) = A_{LO}\cos(2\pi f_{C1}t + \phi_1(t)) \qquad (38)$$

where i is an identification number indicating each base station-optical receiver link, $A_C(i)$ and $A_{LO}$ are electric amplitudes, and $\phi_1(t)$, $\phi_2(t)$, and $\phi_3(t)$ are phase-noise components of the output optical signals of the single-mode optical sources. The first and second terms on the right side of Formula (37) have orthogonal polarization directions and the same amplitude.

Each of the base stations optical-intensity-modulates the polarization-coupled optical signal (Formula (37)) transmitted from the optical transmitter according to the RF signal transmitted from a wireless terminal, and transmits a resulting modulated optical signal to the optical receiver. The electric field $E_{opt\text{-}mod}(i)$ of the modulated optical signal which has been modulated by binary amplitude shift keying and is transmitted to the optical receiver is given by the following formula:

$$E_{opt\text{-}mod}(i) \propto \qquad (39)$$

$$(1 + m(i)a_i\cos 2\pi f_{RF}t) \cdot [A_C(i)\cos(2\pi f_{C2}(t + T) + \phi_2(t + T)) +$$

$$A_C(i)\cos(2\pi f_{C3}(t + T) + \phi_3(t + T))]$$

where m(i) is an optical modulation index which depends on the signal power of the RF signal that is input to an optical modulator as well as on the wireless transmission length between the base station and the wireless terminal of each link. And T is a time taken for an optical transmission between the central office and the base station, and $a_i$ (=0 or 1) is an amplitude-modulation coefficient.

Each of the optical receivers couples the optical signal (Formula (38)) that is output from the optical transmitter with the modulated optical signal (Formula (39)) transmitted from the base station, and then square-law-detects a resulting coupled optical signal with the photodetector. The electric field $E_{opt\text{-}co}$ of the coupled optical signal is given by the following formula:

$$E_{opt\text{-}co}(i) = A_{L0}\cos(2\pi f_a t + \phi_1(t)) + \quad (40)$$
$$(1/\gamma(i))(1 + m(i)a_i\cos 2\pi f_{RF}t) \cdot [A_C(i)\cos(2\pi f_{C2}(t+2T) +$$
$$\phi_2(t+2T)) + A_C(i)\cos(2\pi f_{C3}(t+2T) + \phi_3(t+2T))]$$

where $\gamma(i)$ is the sum of an optical transmission loss of each base station-optical receiver link, an insertion loss of the optical modulator in the base station, and other losses ($\gamma(i) \gg 1$).

The optical signal of the first term on the right side of Formula (40) has a sufficient optical power because it is directly input from the optical transmitter to the optical receiver and hence has suffered no loss. Therefore, by square-law-detecting the optical signal of Formula (40) with the photodetector, the modulated optical signal (Formula (39)) transmitted from the base station can be received with high sensitivity as in the case of the optical heterodyne detection which is known as a high-sensitivity detection method.

The electric field $E_{IF}(i)$ of the electrical signal including the two waves having the intermediate frequencies $f_{IF1}$ and $f_{IF2}$ and output from the photodetector is given by the following formula:

$$E_{IF}(i) \propto (m(i)/\gamma(i)) \cdot a_i[A_C(i) \cdot A_{L0} \cdot \cos\theta \cdot \cos(2\pi f_{IF1}t + \phi_1) + \quad (41)$$
$$A_C(i) \cdot A_{L0} \cdot \sin\theta \cdot \cos(2\pi f_{IF2}t + \phi_2)] =$$
$$(1/k(i)) \cdot a_i[A_C(i) \cdot A_{L0} \cdot \cos\theta \cdot \cos(2\pi f_{IF1}t + \phi_1) +$$
$$A_C(i) \cdot A_{L0} \cdot \sin\theta \cdot \cos(2\pi f_{IF2}t + \phi_2)]$$
$$(\phi_1 = \pm[4\pi f_{C2}T + \phi_2(t+2T) - \phi_1(t)])$$
$$(\phi_2 = \pm[4\pi f_{C3}T + \phi_3(t+2T) - \phi_1(t)])$$

where $\psi_1$ and $\psi_2$ are phase components of the respective electrical signals having the intermediate frequencies $f_{IF1}$ and $f_{IF2}$, and $\theta$ is an angle formed by the polarization direction of the $f_{c2}$ element of the modulated optical signal (Formula (39)) transmitted from the base station and the polarization direction of the optical signal Formula (38) that is transmitted from the optical transmitter. And k(i) is a coefficient that depends on the optical fiber transmission length and the wireless transmission length of each link and represents an amplitude component of the modulated optical signal. The coefficient k(i) satisfies the following formula:

$$k(i) = \gamma(i)/m(i) \quad (42)$$

The optical transmitter performs a control to keep the center frequencies of the first, second, and third single-mode optical signals at set values. Therefore, in each optical receiver, an electrical signal having stable intermediate frequencies $f_{IF1}$ and $f_{IF2}$ can be obtained without the need for using any of RF-band components and an automatic intermediate frequency controller that are complex in configuration.

Further, since the output-power-controllable optical splitter of the optical transmitter controls the optical powers of the polarization coupled optical signals that are transmitted to the respective base stations, it is possible to control the signal power of the electrical signal having the intermediate frequencies $f_{IF1}$ and $f_{IF2}$ obtained as the output of the photodetector of each optical receiver.

When envelope-detecting the electrical signal including the two waves having the intermediate frequencies $f_{IF1}$ and $f_{IF2}$ and then causing a resulting detected signal to pass through the low-pass filter, the electric field $E_{BB}(i)$ of an electrical signal obtained is given by the following formula:

$$E_{BB}(i) \propto (1/k(i))^2 a_i^2 (A_C(i)^2 \cdot A_{LO}^2 \cdot \cos^2\theta + A_C(i)^2 \cdot A_{LO}^2 \cdot \sin^2\theta) = \quad (43)$$
$$(1/k(i))^2 a_i^2 A_C(i)^2 A_{LO}^2$$

Since the polarization-coupled optical signal (Formula (37)) that is output from the optical transmitter has the orthogonal polarization directions and the same optical power, the output signal power of the low-pass filter is insensitive to the polarization direction of the modulated optical signal (Formula (39)) that is transmitted from the base station. The same is true of an electrical signal that is obtained by the combiner or the delay-controllable combiner in the case where the 10th invention employs the optical receiver according to the third or fourth invention.

(11th Invention)

According to an 11th invention, the optical-wireless hybrid transmission system according to the sixth invention further includes an output-power-controllable optical splitter in place of the second optical splitter of the optical transmitter, being capable of individually setting optical powers of the first single-mode optical signals to be output to the plural optical receivers, respectively.

In the 11th invention, the optical transmitter transmits, to the plural base stations, the polarization-coupled optical signals each including the two waves, that is, the second single-mode optical signal and the third single-mode optical signal, and outputs the first single-mode optical signals to the plural optical receivers at prescribed optical powers, respectively.

The electric field $E_{opt\text{-}c}(i)$ of the polarization-coupled optical signal transmitted to each base station and the electric field $E_{opt\text{-}LO}(i)$ of the optical signal output to each optical receiver are given by the following formulae:

$$E_{opt\text{-}c}(i) = A_C \cos(2\pi f_{C2}t + \phi_2(t)) + A_C \cos(2\pi f_{C3}t + \phi_3(t)) \quad (44)$$

$$E_{opt\text{-}LO}(i) = A_{LO}(i)\cos(2\pi f_{C1}t + \phi_1(t)) \quad (45)$$

where i is an identification number indicating each base station-optical receiver link, $A_C$ and $A_{LO}(i)$ are electric amplitudes, and $\phi_1(t)$, $\phi_2(t)$, and $\phi_3(t)$ are phase-noise components of the output optical signals of the single-mode optical sources. The first and second terms on the right side of Formula (44) have orthogonal polarization directions and the same amplitude.

Each of the base stations optical-intensity-modulates the polarization-coupled optical signal (Formula (44)) transmitted from the optical transmitter according to the RF signal transmitted from a wireless terminal, and transmits a resulting modulated optical signal to the optical receiver. The electric field $E_{opt\text{-}mod}(i)$ of the modulated optical signal which has been modulated by binary amplitude shift keying and is transmitted to the optical receiver is given by the following formula:

$$E_{opt\text{-}mod}(i) \propto \qquad (46)$$
$$(1 + m(i)a_i\cos 2\pi f_{RF}t) \cdot [A_C\cos(2\pi f_{C2}(t+T) + \phi_2(t+T)) +$$
$$A_C\cos(2\pi f_{C3}(t+T) + \phi_3(t+T))]$$

where $m(i)$ is an optical modulation index which depends on the signal power of the RF signal that is input to an optical modulator as well as on the wireless transmission length between the base station and the wireless terminal of each link. And T is a time taken for an optical transmission between the central office and the base station, and $a_i$ (=0 or 1) is an amplitude-modulation coefficient.

Each of the optical receivers couples the optical signal (Formula (45)) that is output from the optical transmitter with the modulated optical signal (Formula (46)) transmitted from the base station, and then square-law-detects a resulting coupled optical signal with the photodetector. The electric field $E_{opt\text{-}co}$ of the coupled optical signal is given by the following formula:

$$E_{opt\text{-}co} = A_{L0}(i)\cos(2\pi f_{C1}t + \phi_1(t)) + \qquad (47)$$
$$(1/\gamma(i))(1 + m(i)a_i\cos 2\pi f_{RF}t) \cdot [A_C\cos(2\pi f_{C2}(t+2T) +$$
$$\phi_2(t+2T)) + A_C\cos(2\pi f_{C3}(t+2T) + \phi_3(t+2T))]$$

where $\gamma(i)$ is the sum of an optical transmission loss of each base station-optical receiver link, an insertion loss of the optical modulator in the base station, and other losses ($\gamma(i) \gg 1$).

The optical signal of the first term on the right side of Formula (47) has a sufficient optical power because it is directly input from the optical transmitter to the optical receiver and hence has suffered no loss. Therefore, by square-law-detecting the optical signal of Formula (47) with the photodetector, the modulated optical signal (Formula (46)) transmitted from the base station can be received with high sensitivity as in the case of the optical heterodyne detection which is known as a high-sensitivity detection method.

The electric field $E_{IF}(i)$ of the electrical signal including the two waves having the intermediate frequencies $f_{IF1}$ and $f_{IF2}$ and output from the photodetector is given by the following formula:

$$E_{IF}(i) \propto (m(i)/\gamma(i)) \cdot a_i[A_c \cdot A_{L0}(i) \cdot \cos\theta \cdot \cos(2\pi f_{IF1}t + \phi_1) + \qquad (48)$$
$$A_C \cdot A_{L0}(i) \cdot \sin\theta \cdot \cos(2\pi f_{IF2}t + \phi_2)] =$$
$$(1/k(i)) \cdot a_i[A_C \cdot A_{L0}(i) \cdot \cos\theta \cdot \cos(2\pi f_{IF1}t + \phi_1) +$$
$$A_C \cdot A_{L0}(i) \cdot \sin\theta \cdot \cos(2\pi f_{IF2}t + \phi_2)]$$
$$(\phi_1 = \pm[4\pi f_{C2}T + \phi_2(t+2T) - \phi_1(t)])$$
$$(\phi_2 = \pm[4\pi f_{C3}T + \phi_3(t+2T) - \phi_1(t)])$$

where $\psi_1$ and $\psi_2$ are phase components of the respective electrical signals having the intermediate frequencies $f_{IF1}$ and $f_{IF2}$, and $\theta$ is an angle formed by the polarization direction of the $f_{C2}$ element of the modulated optical signal (Formula (46)) transmitted from the base station and the polarization direction of the optical signal (Formula 45) that is output from the optical transmitter. And $k(i)$ is a coefficient that depends on the optical fiber transmission length and the wireless transmission length of each link and represents an amplitude component of the modulated optical signal. The coefficient $k(i)$ satisfies the following formula:

$$k(i) = \gamma(k)/m(i) \qquad (49)$$

The optical transmitter performs a control to keep the center frequencies of the first, second, and third single-mode optical signals at set values. Therefore, in each optical receiver, an electrical signal having stable intermediate frequencies $f_{IF1}$ and $f_{IF2}$ can be obtained without the need for using any of RF-band components and an automatic intermediate frequency controller that are complex in configuration.

Further, since the output-power-controllable optical splitter of the optical transmitter controls the optical powers of the optical signals that are output to the respective optical receivers, it is possible to control the signal power of the electrical signal having the intermediate frequencies $f_{IF1}$ and $f_{IF2}$ obtained as the output of the photodetector of each optical receiver.

When envelope-detecting the electrical signal including the two waves having the intermediate frequencies $f_{IF1}$ and $f_{IF2}$ and then causing a resulting detected signal to pass through the low-pass filter, the electric field $E_{BB}(i)$ of an electrical signal obtained is given by the following formula:

$$E_{BB}(i) \propto (1/k(i))^2 a_i^2 (A_C^2 \cdot A_{L0}(i)^2 \cdot \cos^2\theta + A_C^2 \cdot A_{L0}(i)^2 \cdot \sin^2\theta) = \qquad (50)$$
$$(1/k(i))^2 a_i^2 A_C^2 A_{L0}(i)^2$$

Since the polarization-coupled optical signal (Formula (44)) that is transmitted from the optical transmitter has the orthogonal polarization directions and the same optical power, the output signal power of the low-pass filter is insensitive to the polarization direction of the modulated optical signal (Formula (46)) that is transmitted from the base station. The same is true of an electrical signal that is obtained by the combiner or the delay-controllable combiner in the case where the 11th invention employs the optical receiver according to the third or fourth invention.

(12th Invention)

According to a 12th invention, the optical-wireless hybrid transmission system according to the sixth invention further includes an output-power-controllable optical splitter in place of the first optical splitter of the optical transmitter, being capable of individually setting optical powers of the optical carrier signals (polarization-coupled optical signals) to be transmitted to the plural base stations, respectively as well as an output-power-controllable optical splitter in place of the second optical splitter, being capable of individually setting optical powers of the first single-mode optical signals to be output to the plural optical receivers, respectively.

In the 12th invention, the optical transmitter transmits the polarization-coupled optical signals each including the two waves, that is, the second single-mode optical signal and the third single-mode optical signal, to the plural base stations at prescribed optical powers, respectively, and outputs the first single-mode optical signals to the plural optical receivers at prescribed optical powers, respectively.

The electric field $E_{opt-c}(i)$ of the polarization-coupled optical signal transmitted to each base station and the electric field $E_{opt-LO}(i)$ of the optical signal output to each optical receiver are given by the following formulae:

$$E_{opt-c}(i)=A_C(i)\cos(2\pi f_{C2}t+\phi_2(t))+A_C(i)\cos(2\pi f_{C3}t+\phi_3(t)) \quad (51)$$

$$E_{opt-LO}(i)=A_{LO}(i)\cos(2\pi f_{C1}t+\phi_1(t)) \quad (52)$$

Each of the base stations optical-intensity-modulates the optical signal (Formula (51)) transmitted from the optical transmitter according to the RF signal transmitted from a wireless terminal, and transmits a resulting modulated optical signal to the optical receiver. The electric field $E_{opt-mod}(i)$ of the modulated optical signal which has been modulated by binary amplitude shift keying and is transmitted to the optical receiver is given by the following formula:

$$E_{opt-mod}(i) \propto \quad (53)$$
$$(1+m(i)a_i\cos 2\pi f_{RF}t)\cdot[A_C(i)\cos(2\pi f_{c2}(t+T)+\phi_2(t+T))+$$
$$A_C(i)\cos(2\pi f_{c3}(t+T)+\phi_3(t+T))]$$

where m(i) is an optical modulation index which depends on the signal power of the RF signal that is input to an optical modulator as well as on the wireless transmission length between the base station and the wireless terminal of each link. And T is a time taken for an optical transmission between the central office and the base station, and $a_i$ (=0 or 1) is an amplitude-modulation coefficient.

Each of the optical receivers couples the optical signal (Formula (52)) that is output from the optical transmitter with the modulated optical signal (Formula (53)) transmitted from the base station, and then square-law-detects a resulting coupled optical signal with the photodetector. The electric field $E_{opt-co}(i)$ of the coupled optical signal is given by the following formula:

$$E_{opt-co}(i) = A_{L0}(i)\cos(2\pi f_{C1}t+\phi_1(t))+ \quad (54)$$
$$(1/\gamma(i))(1+m(i)a_i\cos 2\pi f_{RF}t)\cdot[A_C(i)\cos(2\pi f_{c2}(t+2T)+$$
$$\phi_2(t+2T))+A_C(i)\cos(2\pi f_{c3}(t+2T)+\phi_3(t+2T))]$$

where $\gamma(i)$ is the sum of an optical transmission loss of each base station-optical receiver link, an insertion loss of the optical modulator in the base station, and other losses ($\gamma(i)\gg 1$).

The optical signal of the first term on the right side of Formula (54) has a sufficient optical power because it is directly input from the optical transmitter to the optical receiver and hence has suffered no loss. Therefore, by square-law-detecting the optical signal of Formula (54) with the photodetector, the modulated optical signal (Formula (53)) transmitted from the base station can be received with high sensitivity as in the case of the optical heterodyne detection which is known as a high-sensitivity detection method.

The electric field $E_{IF}(i)$ of the electrical signal having the intermediate frequencies $f_{IF1}$ and $f_{IF2}$ that is output from the photodetector is given by the following formula:

$$E_{IF}(i) \propto (m(i)/\gamma(i))\cdot a_i[A_{LO}(i)\cdot A_C(i)\cdot\cos\theta\cdot\cos(2\pi f_{IF1}t+\psi_1)+ \quad (55)$$
$$A_{LO}(i)\cdot A_C(i)\cdot\sin\theta\cdot\cos(2\pi f_{IF2}t+\psi_2)] =$$
$$(1/k(i))\cdot a_i[A_{LO}(i)\cdot A_C(i)\cdot\cos\theta\cdot\cos(2\pi f_{IF1}t+\psi_1)+$$
$$A_{LO}(i)\cdot A_C(i)\cdot\sin\theta\cdot\cos(2\pi f_{IF2}t+\psi_2)]$$
$$(\psi_1 = \pm[4\pi f_{c2}T+\phi_2(t+2T)-\phi_1(t)])$$
$$(\psi_2 = \pm[4\pi f_{c3}T+\phi_3(t+2T)-\phi_1(t)])$$

where $\psi_1$ and $\psi_2$ are phase components of the respective electrical signals having the intermediate frequencies $f_{IF1}$ and $f_{IF2}$, and $\theta$ is an angle formed by the polarization direction of the $f_{C2}$ element of the modulated optical signal (Formula (53)) transmitted from the base station and the polarization direction of the optical signal (Formula (52) that is transmitter. And k(i) is a coefficient that depends on the optical fiber transmission length and the wireless transmission length of each link and represents an amplitude component of the modulated optical signal. The coefficient k(i) satisfies the following formula:

$$k(i)=\gamma(i)/m(i) \quad (56)$$

The optical transmitter performs a control to keep the frequencies of the first, second, and third single-mode optical signals at set values. Therefore, in each optical receiver, an electrical signal having stable intermediate frequencies $f_{IF1}$ and $f_{IF2}$ can be obtained without the need for using any of RF-band components and an automatic intermediate frequency controller that are complex in configuration.

Further, since the output-power-controllable optical splitters of the optical transmitter control the optical powers of the polarization-coupled optical signals that are transmitted to the respective base stations and the optical powers of the optical signals that are output to the respective optical receivers, it is possible to control the signal power of the electrical signal having the intermediate frequencies $f_{IF1}$ and $f_{IF2}$ obtained as the output of the photodetector of each optical receiver.

When envelope-detecting electrical signal including the two waves having the intermediate frequencies $f_{IF1}$ and $f_{IF2}$ and then causing a resulting detected signal to pass through the low-pass filter, the electric field $E_{BB}(i)$ of an electrical signal obtained is given by the following formula:

$$E_{BB}(i) \propto (1/k(i))^2 a_i^2(A_{LO}(i)^2 A_C(i)^2 \cos^2\theta + A_{LO}(i)^2 A_C(i)^2 \sin^2\theta) = \quad (57)$$
$$(1/k(i))^2 a_i^2 A_{LO}(i)^2 A_C(i)^2$$

Since the polarization-coupled optical signal (Formula (51)) that is transmitted from the optical transmitter has the orthogonal polarization directions and the same optical power, in each optical receiver the output signal power of the low-pass filter is insensitive to the polarization direction of the modulated optical signal (Formula (53)) that is transmitted from the base station. The same is true of an electrical signal that is obtained by the combiner or the delay-controllable combiner in the case where the 12th invention employs the optical receiver according to the third or fourth invention.

(13th Invention)

According to a 13th invention, in the optical-wireless hybrid transmission system according to any one of the seventh to 12th inventions, the output-power-controllable optical splitter/splitters of the optical transmitter sets/set the optical powers of the split optical signals so that an signal power of the electrical signal having the intermediate frequencies $f_{IF1}$ and $f_{IF2}$ and output from the photodetector of the optical receiver is made constant irrespective of an optical power of the optical signal received from the base station.

In the seventh to 12th inventions, the electric fields $E_{IF}(i)$ of the electrical signals including the two waves having the intermediate frequencies $f_{IF1}$ and $f_{IF2}$ and output from the photodetectors are represented by Formulae (20), (27), (34), (41), (48,) and (55) and their signal powers $P_{IF}(i)$ are given by the following formulae:

$$P_{IF}(i) \propto (1/k(i))^2 a_i^2 A_{LO}^2 A_C(i)^2 \quad (58)$$

$$P_{IF}(i) \propto (1/k(i))^2 a_i^2 A_{LO}(i)^2 A_C^2 \quad (59)$$

$$P_{IF}(i) \propto (1/k(i))^2 a_i^2 A_{LO}(i)^2 A_C(i)^2 \quad (60)$$

$$P_{IF}(i) \propto (1/k(i))^2 a_i^2 A_C(i)^2 A_{LO}^2 \quad (61)$$

$$P_{IF}(i) \propto (1/k(i))^2 a_i^2 A_C^2 A_{LO}(i)^2 \quad (62)$$

$$P_{IF}(i) \propto (1/k(i))^2 a_i^2 A_C(i)^2 A_{LO}(i)^2 \quad (63)$$

Therefore, the signal power of the electrical signal having the intermediate frequencies $f_{IF1}$ and $f_{IF2}$ that is output from the photodetector of each optical receiver can be kept constant irrespective of the optical fiber transmission length and the wireless transmission length by controlling the optical power of the optical carrier signal to be transmitted to each base station and/or the optical signal to be output to each optical receiver so that $A_C(i)/k(i)$, $A_{LO}(i)/k(i)$, or $A_{LO}(i)A_C(i)/k(i)$ is made constant. With this measure, an intermediate frequency electrical signal that is constant in power is output, which makes it unnecessary to adjust the gain of an amplifier at an intermediate frequency. As a result, a wide dynamic range can be secured without being restricted by the performance of such an intermediate frequency gain adjustment.

(14th Invention)

According to a 14th invention, in the optical-wireless hybrid transmission system according to any one of the seventh to 12th inventions, the output-power-controllable optical splitter/splitters of the optical transmitter sets/set the optical powers of the optical carrier signals to be transmitted to the respective base stations and/or the optical signals to be output to the respective optical receivers so that signal powers of the electrical signals having the intermediate frequencies $f_{IF1}$ and $f_{IF2}$ and output from the photodetectors of the optical receivers are made uniform for all the optical receivers.

For example, in the configuration as in the eighth invention in which the split first single-mode optical signals are transmitted to the plural base stations and the polarization-coupled optical signals are output to the plural optical receivers at prescribed optical powers, respectively, a condition for receiving the transmission signal from each base station with high quality is defined as the following inequality corresponding to Formula (59):

$$A_{LO}(i)A_C/k(i) \geq A_{th} \quad (64)$$

Let N represent the number of links and assume that the maximum value of the modulated optical signal amplitude coefficient $k(i)$ is $k_{max}$:

$$1 \leq i \leq N, k(i) \leq k_{max} \quad (65)$$

In the first to sixth inventions, the optical signal powers distributed to the respective optical receivers by the optical transmitter are the same. Therefore, for Inequality (64) to be satisfied for every link, it is necessary to distribute, to all the links, an optical signal power that is sufficiently high to provide a good reception characteristic even in the case where the power of the optical signal transmitted from the base station is minimal.

$$A_{LO}(i)A_C/k_{max} \geq A_{th} \quad (66)$$

Therefore, the total $P_{all}$ of the optical signal powers supplied from the optical transmitter to all the optical receivers is given by $$P_{all} = \sum R\{A_{L0}(i)\}^2 [i = 1 \sim N] \geq (RA_{th}^2/A_c^2) \cdot k_{max}^2 N \quad (67)$$

where R is a proportionality constant.

On the other hand, in this invention, the total $P_{all}'$ of the optical signal powers supplied to all the optical receivers is given by $$P_{all}' = \sum R\{A_{L0}(i)\}^2 [i = 1 \sim N] \geq (RA_{th}^2/A_c^2) \cdot \sum \{k(i)\}^2 [i = 1 \sim N] \quad (68)$$

From Inequalities (65), the relationship $$\Sigma\{k(i)\}^2 [i=1 \sim N] \leq k_{max}^2 N \quad (69)$$

holds apparently. Therefore, the following inequality holds:

$$P_{all}' \leq P_{all} \quad (70)$$

That is, according to this invention, the same number of links can be accommodated with a lower optical signal power than in the first to sixth inventions. This effect can be expressed by the following formula as a share-effect coefficient $\alpha$:

$$\alpha = P_{all}/P_{all}' \quad (71)$$
$$= (k_{max}^2 N)/(\Sigma\{k(i)\}^2 [i = 1 \sim N]) \geq 1$$

It is therefore concluded that this method makes it possible to accommodate base station-optical receiver links that are $\alpha$ times larger in number than in the first to sixth inventions.

To show a specific effect, $\alpha$ will be calculated for an example in which the modulated optical signal loss coefficient $k(i)$ in each base station-optical receiver link is represented by the following formula:

$$\{k(i)\}^2 = ik_0^2 (k_{max}^2 = Nk_0^2) \quad (72)$$

For example, Formula (72) holds in the case where the central office and the N base stations are located at equal intervals from each other and all the base stations have the same wireless transmission length.

Applying these conditions to Formula (71), we obtain $$\alpha = (k_{max}^2 N)/\left(\sum \{k(i)\}^2 [i = 1 \sim N]\right) \quad (73)$$
$$= (Nk_0^2 \cdot N)/\left(\sum ik_0^2 [i = 1 \sim N]\right)$$
$$= (N^2)/(N(N+1)/2) = 2/(1 + (1/N)) < 2$$

This result shows that the gain with respect to the first to sixth inventions varies depending on the value of N and amounts to about 3 dB. That is, this invention makes it possible to accommodate base station-optical receiver links that are a little less than 2 times larger in number than in the conventional techniques.

As described above, according to this invention, as the number of links to which optical signals can be distributed increases, a more remarkable share effect can be obtained and the cost of the entire system can thereby be reduced.

The same effect is also obtained in the case of adjusting the optical powers of the optical signals to be transmitted to the base stations and/or the optical signals to be output to the optical receivers in any of the seventh, ninth, and $10^{th}$, $12^{th}$ inventions.

(15th Invention)

According to a 15th invention, in the optical-wireless hybrid transmission system according to any one of the seventh to 12th inventions, the output-power-controllable optical splitter/splitters of the optical transmitter sets/set the optical powers of the optical carrier signals to be transmitted to the respective base stations and/or the optical signals to be output to the respective optical receivers so that signal-to-noise ratios of the electrical signals having the intermediate frequencies $f_{IF1}$ and $f_{IF2}$ and output from the photodetectors of the optical receivers are made uniform for all the optical receivers.

For example, in the configuration in which as in the eighth invention the split first single-mode optical signals are transmitted to the plural base stations and the polarization-coupled optical signals are output to the plural optical receivers at prescribed optical powers, respectively, the signal-to-noise ratio SNR of the electrical signal that is output from the photodetector of each optical receiver can be represented by the following formula:

$$SNR = (S^2 \cdot P_{LO}(i) \cdot P_c \cdot a_i / k(i)^2) / (2eSP_{LO}(i)R_L B + 2kTFB) \quad (74)$$
$$= \{(S^2 \cdot P_{LO}(i)) / (N_{shot}P_{LO}(i) + N_{thermal})\}P_s(i)$$
$$= G(P_{LO}(i)) \cdot P_s(i)$$
$$(P_s(i) = P_c \cdot a_i / k(i)^2, N_{shot} = 2eSR_L B, N_{thermal} = 2kTFB)$$

where S is the sensitivity of the photodetector, $P_{LO}(i)$ is the optical signal power to be output to the each optical receiver, $P_s(i)$ is the optical power of an SSB component of each link, $R_L$ is the load resistance, e is the magnitude of the electronic charge, k is Boltzmann's constant, T is the temperature, F is the noise figure of the optical receiver, B is the signal bandwidth, and G(x) is the following function:

$$G(x)=S^2 x/(N_{shot}x+N_{thermal}) \quad (75)$$

A condition for receiving a transmission signal from the base station with high quality in each link is defined by the following inequality:

$$G(P_{LO}(i)) \geqq SNR_{th}/P_s(i) \quad (76)$$

where $SNR_{th}$ is a required signal-to-noise ratio.

In the first to sixth inventions, the optical signal intensities that are distributed to the respective optical receivers by the optical transmitter are the same. Therefore, for Inequality (76) to be satisfied for every link, it is necessary to distribute, to all the links, an optical signal power that is sufficiently high to provide a good reception characteristic even in the case where the power of the optical signal transmitted from the base station is minimal.

Let $P_{s-min}$ represent the optical power of an SSB component of a link that suffers a largest loss ($k(i)=k_{max}$); then, the total $P_{all}$ of the optical signal powers supplied from the optical transmitter to all the optical receivers is given by $$P_{all} = \Sigma G^{-1}(SNR_{th}/P_{s-min})[i=1\sim N] \quad (77)$$
$$= G^{-1}(SNR_{th}/P_{s-min}) \cdot N$$

On the other hand, in this invention, the total $P_{all}'$ of the optical signal powers supplied to all the optical receivers is given by $$P_{all}'=\Sigma G^{-1}(SNR_{th}/P_s(i))[i=1\sim N] \quad (78)$$

Since $$dG(x)/dx = (d/dx)(S^2 x/(N_{shot}x + N_{thermal})) \quad (79)$$
$$= S^2 N_{thermal}/(N_{shot}x + N_{thermal})^2 > 0$$

$G(P_{LO}(i))$ increases monotonously with respect to $P_{LO}(i)$. Therefore, the following inequality holds:

$$G^{-1}(SNR_{th}/P_s(i)) \leqq G^{-1}(SNR_{th}/P_{s-min}), \quad (80)$$

Therefore, the relationship $$P_{all}' \leqq P_{all} \quad (81)$$

holds apparently. As in the case of the 14th invention, the same number of links can be accommodated with a lower optical signal power than in the first to sixth inventions and hence the cost of the entire system can be reduced.

The same effect is also obtained in the case of adjusting the optical powers of the optical signals to be transmitted to the base stations and/or the optical signals to be output to the optical receivers in any of the seventh, ninth, and 10th to 12th inventions.

(16th Invention)

A 16th invention is directed to an optical-wireless hybrid transmission method in which a central office has an optical transmitter and an optical receiver, the optical transmitter transmits an optical carrier signal to a base station via an optical transmission line, the base station receives an RF signal (frequency: $f_{RF}$) that is modulated according to transmit-data, optically modulates the optical carrier signal according to the received RF signal, and transmits a resulting modulated optical signal to the central office via an optical transmission line, and the optical receiver receives and demodulates the modulated optical signal and reproduces the transmit-data. The 16th invention is characterized in the optical transmitter and the optical receiver.

The optical transmitter transmits a first single-mode optical signal (center frequency: $f_{C1}$) to the base station as the optical carrier signal, outputs, to the optical receiver, a polarization-coupled optical signal obtained by orthogonal-polarization-coupling a second single-mode optical signal (center frequency: $f_{C2}$) with a third single-mode optical signal (center frequency: $f_{C3}$) so as to give the two waves orthogonal polarization directions and the same optical power, and controls the center frequencies $f_{C1}$, $f_{C2}$, and $f_{C3}$ of the first, second, and third single-mode optical signals so that they satisfy $$|f_{C1}-f_{C2}|=f_{RF}\pm f_{IF1}$$

$$|f_{C1}-f_{C3}|=f_{RF}\pm f_{IF2}$$

where $f_{RF}$ is the frequency of the RF signal and $f_{IF1}$ and $f_{IF2}$ are prescribed intermediate frequencies.

The optical receiver couples the modulated optical signal transmitted from the base station with the polarization-coupled optical signal that is output from the optical transmitter, demodulates an electrical signal having the intermediate frequencies $f_{IF1}$ and $f_{IF2}$ that is obtained by photodetecting a resulting coupled optical signal, and generates the transmit-data by filtering a resulting output signal.

(17th Invention)

A 17th invention is directed to an optical-wireless hybrid transmission method in which a central office has an optical transmitter and an optical receiver, the optical transmitter transmits an optical carrier signal to a base station via an optical transmission line, the base station receives an RF signal (frequency: $f_{RF}$) that is modulated according to transmit-data, optically modulates the optical carrier signal according to the received RF signal, and transmits a resulting modulated optical signal to the central office via an optical transmission line, and the optical receiver receives and demodulates the modulated optical signal and reproduces the transmit-data. The 17th invention is characterized in the optical transmitter and the optical receiver.

The optical transmitter outputs a first single-mode optical signal (center frequency: $f_{C1}$) to the optical receiver, generates a polarization-coupled optical signal by orthogonal-polarization-coupling a second single-mode optical signal (center frequency: $f_{C2}$) with a third single-mode optical signal (center frequency: $f_{C3}$) so as to give the two waves orthogonal polarization directions and the same optical power, transmits the generated polarization-coupled optical signal to the base station as the optical carrier signal, and controls the center frequencies $f_{C1}$, $f_{C2}$, and $f_{C3}$ of the first, second, and third single-mode optical signals so that they satisfy $$|f_{C1}-f_{C2}|=f_{RF}\pm f_{IF1}$$

$$|f_{C1}-f_{C3}|=f_{RF}\pm f_{IF2}$$

where $f_{RF}$ is the frequency of the RF signal and $f_{IF1}$ and $f_{IF2}$ are prescribed intermediate frequencies.

The optical receiver couples the modulated optical signal transmitted from the base station with the optical signal output from the optical transmitter, demodulates an electrical signal having the intermediate frequencies $f_{IF1}$ and $f_{IF2}$ that is obtained by photodetecting a resulting coupled optical signal, and generates the transmit-data by filtering a resulting output signal.

(18th Invention)

According to an 18th invention, in the 16 or 17th invention, the optical receiver separates electrical signals having the intermediate frequencies $f_{IF1}$ and $f_{IF2}$ from each other, individually demodulates the electrical signal having the intermediate frequency $f_{IF1}$ and the electrical signal having the intermediate frequency $f_{IF2}$, and generates the transmit-data by combining resulting output signals with each other.

(19th Invention)

According to a 19th invention, in the 16 or 17th invention, the optical receiver separates electrical signals having the intermediate frequencies $f_{IF1}$ and $f_{IF2}$ from each other, individually demodulates the electrical signal having the intermediate frequency $f_{IF1}$ and the electrical signal having the intermediate frequency $f_{IF2}$, and generates the transmit-data by combining resulting output signals with each other after equalizing their phases.

ADVANTAGE OF THE INVENTION

The optical-wireless hybrid transmission system according to the invention is configured such that the base station transmits a modulated optical signal that is modulated according to an RF signal and the optical receiver of the central office receives it. Therein, without provision an optical modulator, optical amplifier, automatic intermediate frequency controller, polarization-fluctuation compensation circuit, or the like of an RF band in the optical receiver, a modulated signal having stable intermediate frequencies is obtainable by a single photodetector. As such, the optical-wireless hybrid transmission system inexpensive and simple in configuration can receive with high sensitivity a modulated optical signal transmitted from the base station, achieving expansion of a wireless area and reduction of the system cost.

Further, the optical-wireless hybrid transmission system according to the invention can suppress an output variation of the optical receiver and thereby increase the dynamic range by controlling the optical powers of optical signals that are supplied from the optical transmitter of the central office to the base station and the optical receiver. Still further, it can prevent a surplus or shortage of optical power from occurring in part of the links by controlling the optical powers allocated to base station-optical receiver links. This allows a single optical transmitter to accommodate more base station-optical receiver links.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 shows an optical-wireless hybrid transmission system according to a first embodiment of the present invention.

FIG. 2 shows an exemplary configuration of a polarization coupling part.

FIG. 3 shows a first exemplary configuration of an optical receiver 120(A).

FIG. 4 shows a second exemplary configuration of the optical receiver 120(A).

FIG. 5 shows a third exemplary configuration of the optical receiver 120(A).

FIG. 6 shows exemplary frequency spectra of respective signals in the first embodiment and the first exemplary configuration of the optical receiver 120(A).

FIG. 7 shows exemplary frequency spectra of respective signals in the first embodiment and the second or third exemplary configuration of the optical receiver 120(A).

FIG. 8 is a time chart of individual signals in the first embodiment and the third exemplary configuration of the optical receiver 120(A).

FIG. 9 shows an optical-wireless hybrid transmission system according to a second embodiment of the invention.

FIG. 10 shows an exemplary configuration of a polarization coupling part.

FIG. 11 shows a first exemplary configuration of an optical receiver 120(B).

FIG. 12 shows a second exemplary configuration of the optical receiver 120(B).

FIG. 13 shows a third exemplary configuration of the optical receiver 120(B).

FIG. 14 shows exemplary frequency spectra of respective signals in the second embodiment and the first exemplary configuration of the optical receiver 120(B).

FIG. 15 shows exemplary frequency spectra of respective signals in the second embodiment and the second or third exemplary configuration of the optical receiver 120(B).

FIG. 16 is a time chart of individual signals in the second embodiment and the third exemplary configuration of the optical receiver 120(B).

FIG. 17 shows an optical-wireless hybrid transmission system according to a third embodiment of the invention.

FIG. 18 shows an optical-wireless hybrid transmission system according to a fourth embodiment of the invention.

FIG. 19 shows an optical-wireless hybrid transmission system according to a fifth embodiment of the invention.

FIG. 20 shows an optical-wireless hybrid transmission system according to a sixth embodiment of the invention.

FIG. 21 shows an optical-wireless hybrid transmission system according to a seventh embodiment of the invention.

FIG. 22 shows exemplary frequency spectra of respective signals in the fifth to seventh embodiments.

FIG. 23 shows an optical-wireless hybrid transmission system according to an eighth embodiment of the invention.

FIG. 24 shows an optical-wireless hybrid transmission system according to a ninth embodiment of the invention.

FIG. 25 shows an optical-wireless hybrid transmission system according to a 10th embodiment of the invention.

FIG. 26 shows exemplary frequency spectra of respective signals in the eighth to 10th embodiments.

FIG. 27 shows an exemplary configuration of a conventional optical-wireless hybrid transmission system.

FIG. 28 shows an exemplary configuration of an optical receiver.

FIG. 29 shows exemplary frequency spectra of respective signals in the conventional optical-wireless hybrid transmission system.

BEST MODE FOR CARRYING OUT THE INVENTION

First Embodiment

FIG. 1 shows an optical-wireless hybrid transmission system according to a first embodiment of the present invention. In this embodiment, a description will be made of an exemplary configuration in which one base station 300 is connected to a central office 100 and one wireless terminal 400 is connected to the base station 300.

As shown in the figure, the central office 100 is equipped with an optical transmitter 110(A1) and an optical receiver 120(A). The optical transmitter 110(A1) is equipped with single-mode optical sources 111, 112, and 113 which output respective single-mode optical signals 1a, 1b, and 1c (center frequencies: $f_{C1}$, $f_{C2}$, and $f_{C3}$) and a polarization coupling part 114 which receives the single-mode optical signals 1b and 1c and outputs a polarization-coupled optical signal 1d obtained by orthogonal-polarization-coupling the optical signals 1b and 1c so as to give them orthogonal polarization directions and the same optical power. The single-mode optical signal 1a is transmitted as an optical carrier signal to the base station 300 via an optical transmission line 201 and input to an optical modulator 301 of the base station 300.

On the other hand, in the wireless terminal 400, an electrical carrier signal (frequency: $f_{RF}$) that is input from an oscillator 401 to a modulator 402 is amplitude-modulated according to transmit-data 1e and then transmitted to the base station 300 from an antenna 403 as an RF signal 1f of a millimeter-wave band, for example. In the base station 300, the RF signal 1f which is modulated according to the transmit-data 1e is received by an antenna 302 and input to the optical modulator 301. The optical modulator 301 optical-intensity-modulates the optical signal 1a transmitted from the optical transmitter 110(A1) according to the received RF signal and transmits a modulated optical signal 1g to the optical receiver 120(A) of the central office 100 via an optical transmission line 202.

The optical receiver 120(A) receives the modulated optical signal 1g transmitted from the optical modulator 301 of the base station 300 and the polarization-coupled optical signal 1d that is output from the polarization coupling part 114 of the optical transmitter 110(A1) of the central office 100, and reproduces transmit-data 1k corresponding to the transmit-data 1e that is transmitted from the wireless terminal 400 via the base station 300.

FIG. 2 shows an exemplary configuration of the polarization coupling part 114. As shown in the figure, the single-mode optical signals 1b and 1c are adjusted by polarization controllers 1141 and 1142 so that their polarization directions become perpendicular to each other, then adjusted by output adjusters 1143 and 1144 so that their optical powers become identical, and finally orthogonal-polarization-coupled with each other by a polarization-maintain optical coupler 1145 into the polarization-coupled optical signal 1d which is output. This configuration is just an example; for example, another configuration is possible in which the single-mode optical sources 112 and 113 have the functions of the polarization controllers 1141 and 1142 and the output adjusters 1143 and 1144 and the polarization coupling part 114 is formed by only the polarization-maintain optical coupler 1145.

FIG. 3 shows a first exemplary configuration of the optical receiver 120(A). FIG. 6 shows exemplary frequency spectra of respective signals in the first embodiment and the first exemplary configuration of the optical receiver 120(A). As shown in FIG. 3, an optical receiver 120(A1) is composed of an optical coupler 121, a photodetector 122, an electrical demodulator 123, and a low-pass filter (LPF) 124. The optical coupler 121 couples the modulated optical signal 1g transmitted from the base station 300 with the polarization-coupled optical signal 1d that is output from the optical transmitter 110(A1). A coupled optical signal 1h (Formula (4)) is converted into an electrical signal by the photodetector 122.

In the optical transmitter 110(A1), the center frequencies $f_{C1}$, $f_{C2}$, and $f_{C3}$ of the single-mode optical signals 1a, 1b, and 1c are controlled so as to satisfy the following formulae:

$$|f_{C1}-f_{C2}|=f_{RF}\pm f_{IF1}$$

$$|f_{C1}-f_{C3}|=f_{RF}\pm f_{IF2}$$

where $f_{RF}$ is the frequency of the RF signal 1f and $f_{IF1}$ and $f_{IF2}$ are prescribed intermediate frequencies. With this measure, in the optical receiver 120(A1), an electrical signal 1i (Formula (5)) including two stable waves having the intermediate frequencies $f_{IF1}$ and $f_{IF2}$ can be obtained directly as an output of the photodetector 122 without using millimeter-wave band components or an automatic intermediate frequency controller. Further, a gain of optical heterodyne detection can be obtained by inputting the polarization-coupled optical signal 1d having a sufficiently high optical power from the optical transmitter 110(A1) to the optical receiver 120(A1). The electrical signal 1i that is output from the photodetector 122 is demodulated by the electrical demodulator 123, and the transmit-data 1k (Formula (6)) can be obtained by causing a demodulated signal 1j to pass through the low-pass filter 124.

Since the components of the polarization-coupled optical signal 1d that is output from the optical transmitter 110(A1) have the orthogonal polarization directions and the same optical power, the data signal $1k$ that is output from the low-pass filter 124 has a constant value independently of the polarization direction of the modulated optical signal $1g$ that is transmitted from the base station 300.

FIG. 4 shows a second exemplary configuration of the optical receiver 120(A). FIG. 7 shows exemplary frequency spectra of respective signals in the first embodiment and the second exemplary configuration of the optical receiver 120(A).

As shown in FIG. 4, an optical receiver 120(A2) is composed of an optical coupler 121, a photodetector 122, a filter 125, electrical demodulators 123-1 and 123-2, and a combiner 126. The optical coupler 121 couples the modulated optical signal $1g$ transmitted from the base station 300 with the polarization-coupled optical signal $1d$ that is output from the optical transmitter 110(A1). A coupled optical signal $1h$ (Formula (4)) is converted into an electrical signal by the photodetector 122. Because of the above-described frequency relationships, an electrical signal $1i$ (Formula (5)) including two stable waves having the intermediate frequencies $f_{IF1}$ and $f_{IF2}$ can be obtained directly as an output of the photodetector 122.

The filter 125 receives the electrical signal $1i$ (Formula (5)) having the intermediate frequencies $f_{IF1}$ and $f_{IF2}$ and separates it into an electrical signal $1i_1$ (Formula (13)) having the intermediate frequency $f_{IF1}$ and an electrical signal $1i_2$ (Formula (14)) having the intermediate frequency $f_{IF2}$. The electrical signals $1i_1$ and $1i_2$ are demodulated by the respective electrical demodulators 123-1 and 123-2. The transmit-data $1k$ (Formula (15)) can be obtained by combining demodulated signals with the combiner 126.

Since the components of the polarization-coupled optical signal $1d$ that is output from the optical transmitter 110(A1) have the orthogonal polarization directions and the same optical power, the data signal $1k$ that is output from the combiner 126 has a constant value independently of the polarization direction of the modulated optical signal $1g$ that is transmitted from the base station 300.

FIG. 5 shows a third exemplary configuration of the optical receiver 120(A). FIG. 7 shows exemplary frequency spectra of respective signals in the first embodiment and the third exemplary configuration of the optical receiver 120(A), and FIG. 8 is an exemplary time chart of individual signals in the first embodiment and the third exemplary configuration of the optical receiver 120(A).

As shown in FIG. 5, an optical receiver 120(A3) is composed of an optical coupler 121, a photodetector 122, a filter 125, electrical demodulators 123-1 and 123-2, and a delay-controllable combiner 127. The optical receiver 120(A3) is the same in configuration as the optical receiver 120(A2) in that the electrical signal $1i_1$ (Formula (13)) having the intermediate frequency $f_{IF1}$ and the electrical signal $1i_2$ (Formula (14)) having the intermediate frequency $f_{IF2}$ are produced by the optical coupler 121, the photodetector 122, and the filter 125 and demodulated by the respective electrical demodulators 123-1 and 123-2.

This configuration assumes a case that, as shown in FIG. 8, a time difference $\Delta T$ occurs between an output signal $1j_1$ of a first electrical demodulator and an output signal $1j_2$ of a second electrical demodulator due to dispersion in the optical transmission lines 201 and 202. In this case, the time difference $\Delta T$ is compensated for by combining the output signals $1j_1$ and $1j_2$ with each other after equalizing their phases with the delay-controllable combiner 127, whereby the transmit-data $1k$ is obtained without being influenced by the dispersion in the optical transmission lines.

Second Embodiment

FIG. 9 shows an optical-wireless hybrid transmission system according to a second embodiment of the invention. In this embodiment, a description will be made of an exemplary configuration in which one base station 300 is connected to a central office 100 and one wireless terminal 400 is connected to the base station 300.

As shown in the figure, the central office 100 is equipped with an optical transmitter 110(B1) and an optical receiver 120(B). The optical transmitter 110(B1) is equipped with single-mode optical sources 111, 112, and 113 which output respective single-mode optical signals $2a$, $2b$, and $2c$ (center frequencies: $f_{C1}$, $f_{C2}$, and $f_{C3}$) and a polarization coupling part 114 which receives the single-mode optical signals $1b$ and $1c$ and outputs a polarization-coupled optical signal $2d$ obtained by orthogonal-polarization-coupling the optical signals $2b$ and $2c$ so as to give them orthogonal polarization directions and the same optical power. The polarization-coupled optical signal $2d$ is transmitted as an optical carrier signal to the base station 300 via an optical transmission line 201 and input to an optical modulator 301 of the base station 300.

On the other hand, in the wireless terminal 400, an electrical carrier signal (frequency: $f_{RF}$) that is input from an oscillator 401 to a modulator 402 is amplitude-modulated according to transmit-data $2e$ and then transmitted to the base station 300 from an antenna 403 as an RF signal $2f$ of a millimeter-wave band, for example. In the base station 300, the RF signal $2f$ which is modulated according to the transmit-data $2e$ is received by an antenna 302 and input to the optical modulator 301. The optical modulator 301 optical-intensity-modulates the polarization-coupled optical signal $2d$ transmitted from the optical transmitter 110(B1) according to the received RF signal and transmits a modulated optical signal $2g$ to the optical receiver 120(B) of the central office 100 via an optical transmission line 202.

The optical receiver 120(B) receives the modulated optical signal $2g$ transmitted from the optical modulator 301 of the base station 300 and the optical signal $2a$ having the optical frequency $f_{C1}$ that is output from the single-mode optical source 111 of the optical transmitter 110(B1) of the central office 100, and reproduces transmit-data $2k$ corresponding to the transmit-data $2e$ that is transmitted from the wireless terminal 400 via the base station 300.

FIG. 10 shows an exemplary configuration of the polarization coupling part 114. As shown in the figure, the single-mode optical signals $2b$ and $2c$ are adjusted by polarization controllers 1141 and 1142 so that their polarization directions become perpendicular to each other, then adjusted by output adjusters 1143 and 1144 so that their optical powers become identical, and finally orthogonal-polarization-coupled with each other by a polarization-maintain optical coupler 1145 into the polarization-coupled optical signal $2d$ which is output. This configuration is just an example; for example, another configuration is possible in which the single-mode optical sources 112 and 113 have the functions of the polarization controllers 1141 and 1142 and the output adjusters 1143 and 1144 and the polarization coupling part 114 is formed by only the polarization-maintain optical coupler 1145.

FIG. 11 shows a first exemplary configuration of the optical receiver 120(B). FIG. 14 shows exemplary frequency spectra of respective signals in the second embodiment and the first exemplary configuration of the optical receiver 120(B).

As shown in FIG. 11, an optical receiver 120(B1) is composed of an optical coupler 121, a photodetector 122, an electrical demodulator 123, and a low-pass filter (LPF) 124.

The optical coupler 121 couples the modulated optical signal 2g transmitted from the base station 300 with the optical signal 2a that is output from the optical transmitter 110(B1). A coupled optical signal 2h (Formula (10)) is converted into an electrical signal by the photodetector 122.

In the optical transmitter 110(B1), the center frequencies $f_{C1}$, $f_{C2}$, and $f_{C3}$ of the single-mode optical signals 2a, 2b, and 2c are controlled so as to satisfy the following formulae:

$$|f_{C1} - f_{C2}| = f_{RF} \pm f_{IF1}$$

$$|f_{C1} - f_{C3}| = f_{RF} \pm f_{IF2}$$

where $f_{RF}$ is the frequency of the RF signal 2f and $f_{IF1}$ and $f_{IF2}$ are prescribed intermediate frequencies. With this measure, in the optical receiver 120(B1), an electrical signal 2i (Formula (11)) including two stable waves having the intermediate frequencies $f_{IF1}$ and $f_{IF2}$ can be obtained directly as an output of the photodetector 122 without using millimeter-wave band components or an automatic intermediate frequency controller. Further, a gain of optical heterodyne detection can be obtained by inputting the optical signal 2a having a sufficiently high optical power from the optical transmitter 110(B1) to the optical receiver 120(B1). The electrical signal 2i that is output from the photodetector 122 is demodulated by the electrical demodulator 123, and the transmit-data 2k (Formula (12)) can be obtained by causing a demodulated signal 2j to pass through the low-pass filter 124.

Since the components of the optical carrier signal (polarization-coupled optical signal 2d) that is output from the optical transmitter 110(B1) have the orthogonal polarization directions and the same optical power, the data signal 2k that is output from the low-pass filter 124 has a constant value independently of the polarization direction of the modulated optical signal 2g that is transmitted from the base station 300.

FIG. 12 shows a second exemplary configuration of the optical receiver 120(B). FIG. 15 shows exemplary frequency spectra of respective signals in the second embodiment and the second exemplary configuration of the optical receiver 120(B).

As shown in FIG. 12, an optical receiver 120(B2) is composed of an optical coupler 121, a photodetector 122, a filter 125, electrical demodulators 123-1 and 123-2, and a combiner 126. The optical coupler 121 couples the modulated optical signal 2g transmitted from the base station 300 with the optical signal 2a that is output from the optical transmitter 110(B1). A coupled optical signal 2h (Formula (10)) is converted into an electrical signal by the photodetector 122. Because of the above-described frequency relationships, an electrical signal 2i (Formula (11)) including two stable waves having the intermediate frequencies $f_{IF1}$ and $f_{IF2}$ can be obtained directly as an output of the photodetector 122.

The filter 125 receives the electrical signal 2i (Formula (11)) having the intermediate frequencies $f_{IF1}$ and $f_{IF2}$ and separates it into an electrical signal $2i_1$ (Formula (13)) having the intermediate frequency $f_{IF1}$ and an electrical signal $2i_2$ (Formula (14)) having the intermediate frequency $f_{IF2}$. The electrical signals $2i_1$ and $2i_2$ are demodulated by the respective electrical demodulators 123-1 and 123-2. The transmit-data 2k (Formula (15)) can be obtained by combining demodulated signals with the combiner 126.

Since the components of the optical carrier signal (polarization-coupled optical signal 2d) transmitted from the optical transmitter 110(B1) have the orthogonal polarization directions and the same optical power, the data signal 2k that is output from the combiner 126 has a constant value independently of the polarization direction of the modulated optical signal 2g that is transmitted from the base station 300.

FIG. 13 shows a third exemplary configuration of the optical receiver 120(B). FIG. 15 shows exemplary frequency spectra of respective signals in the second embodiment and the third exemplary configuration of the optical receiver 120 (B), and FIG. 16 is an exemplary time chart of individual signals in the second embodiment and the third exemplary configuration of the optical receiver 120(B).

As shown in FIG. 13, an optical receiver 120(B3) is composed of an optical coupler 121, a photodetector 122, a filter 125, electrical demodulators 123-1 and 123-2, and a delay-controllable combiner 127. The optical receiver 120(B3) is the same in configuration as the optical receiver 120(B2) in that the electrical signal $2i_1$ (Formula (13)) having the intermediate frequency $f_{IF1}$ and the electrical signal $2i_2$ (Formula (14)) having the intermediate frequency $f_{IF2}$ are produced by the optical coupler 121, the photodetector 122, and the filter 125 and demodulated by the respective electrical demodulators 123-1 and 123-2.

This configuration assumes a case that, as shown in FIG. 16, a time difference ΔT occurs between an output signal $2j_1$ of a first electrical demodulator and an output signal $2j_2$ of a second electrical demodulator due to dispersion in the optical transmission lines 201 and 202. In this case, the time difference ΔT is compensated for by combining the output signals $2j_1$ and $2j_2$ with each other after equalizing their phases with the delay-controllable combiner 127, whereby the transmit-data 2k is obtained without being influenced by the dispersion in the optical transmission lines.

Third Embodiment

FIG. 17 shows an optical-wireless hybrid transmission system according to a third embodiment of the invention. In this embodiment, a description will be made of an exemplary configuration in which plural base stations 300-1 to 300-3 are connected to a central office 100 and wireless terminals (omitted in the figure) are connected to the respective base stations 300.

As shown in the figure, the central office 100 is equipped with an optical transmitter 110(A2) and plural optical receivers 120(A)-1 to 120(A)-3. The optical transmitter 110(A2) is equipped with single-mode optical sources 111, 112, and 113 which output respective single-mode optical signals 1a, 1b, and 1c (center frequencies: $f_{C1}$, $f_{C2}$, and $f_{C3}$), a polarization coupling part 114 which receives the single-mode optical signals 1b and 1c and outputs a polarization-coupled optical signal 1d obtained by orthogonal-polarization-coupling the optical signals 1b and 1c so as to give them orthogonal polarization directions and the same optical power, an optical splitter 115 which splits the single-mode optical signal 1a into plural parts, and an optical splitter 116 which splits the polarization-coupled optical signal 1d into plural parts. The plural split single-mode optical signals 1a are transmitted as optical carrier signals to the plural base stations 300-1 to 300-3 via optical transmission lines 201 and input to optical modulators 301 of the base stations 300, respectively.

On the other hand, in the base stations 300-1 to 300-3, RF signals which are modulated according to transmit-data 1e are received by antennas 302 and input to the optical modulators 301. The optical modulators 301 optical-intensity-modulate the optical signals 1a transmitted from the optical transmitter 110(A2) according to the received RF signals and transmit modulated optical signal 1g1 to 1g3 to the optical receivers 120(A)-1 to 120(A)-3 of the central office 100 via optical transmission lines 202.

The optical receivers 120(A)-1 to 120(A)-3 receive the modulated optical signal 1g1 to 1g3 transmitted from the optical modulators 301-1 to 301-3 of the base stations 300-1 to 300-3 and the split polarization-coupled optical signal 1d that are output from the optical splitter 116 of the optical transmitter 110(A2) of the central office 100 and reproduce transmit-data 1k1 to 1k3, respectively.

This embodiment is characterized (i.e., it is different in configuration from the first embodiment shown in FIG. 1) in that the optical transmitter 110(A2) is equipped with the optical splitter 115 which splits the single-mode optical signal 1a and the optical splitter 116 which splits the polarization-coupled optical signal 1d. As such, this embodiment is an extended version which is directed to the relationships between the plural base stations 300-1 to 300-3 and the plural optical receivers 120(A)-1 to 120(A)-3. The relationship between the base station 300 and the optical receiver 120(A) of each set, in particular, the configuration of each optical receiver 120(A) and the function of reproducing the transmit-data 1k from the modulated optical signal 1g transmitted from the base station 300 are the same as in the first embodiment.

Fourth Embodiment

FIG. 18 shows an optical-wireless hybrid transmission system according to a fourth embodiment of the invention. In this embodiment, a description will be made of an exemplary configuration in which plural base stations 300-1 to 300-3 are connected to a central office 100 and wireless terminals (omitted in the figure) are connected to the respective base stations 300.

As shown in the figure, the central office 100 is equipped with an optical transmitter 110(B2) and plural optical receivers 120(B)-1 to 120(B)-3. The optical transmitter 110(B2) is equipped with single-mode optical sources 111, 112, and 113 which output respective single-mode optical signals 2a, 2b, and 2c (center frequencies: $f_{C1}$, $f_{C2}$, and $f_{C3}$), a polarization coupling part 114 which receives the single-mode optical signals 2b and 2c and outputs a polarization-coupled optical signal 2d obtained by orthogonal-polarization-coupling the optical signals 2b and 2c so as to give them orthogonal polarization directions and the same optical power, an optical splitter 115 which splits the single-mode optical signal 2a into plural parts, and an optical splitter 116 which splits the polarization-coupled optical signal 2d into plural parts. The plural split polarization-coupled optical signals 2d are transmitted as optical carrier signals to the plural base stations 300-1 to 300-3 via optical transmission lines 201 and input to optical modulators 301 of the base stations 300, respectively.

On the other hand, in the base stations 300-1 to 300-3, RF signals which are modulated according to transmit-data are received by antennas 302 and input to the optical modulators 301. The optical modulators 301 optical-intensity-modulate the polarization-coupled optical signals 2d transmitted from the optical transmitter 110(B2) according to the received RF signals and transmit modulated optical signal 2g1 to 2g3 to the optical receivers 120(B)-1 to 120(B)-3 of the central office 100 via optical transmission lines 202.

The optical receivers 120(B)-1 to 120(B)-3 receive the modulated optical signal 2g1 to 2g3 transmitted from the optical modulators 301-01 to 301-3 of the base stations 300-1 to 300-3 and the split optical signal 2a that are output from the optical splitter 115 of the optical transmitter 110(B2) of the central office 100 and reproduce transmit-data 2k1 to 2k3, respectively.

This embodiment is characterized (i.e., it is different in configuration from the second embodiment shown in FIG. 9) in that the optical transmitter 110(B2) is equipped with the optical splitter 115 which splits the single-mode optical signal 2a and the optical splitter 116 which splits the polarization-coupled optical signal 2d. As such, this embodiment is an extended version which is directed to the relationships between the plural base stations 300-1 to 300-3 and the plural optical receivers 120(B)-1 to 120(B)-3. The relationship between the base station 300 and the optical receiver 120(B) of each set, in particular, the configuration of each optical receiver 120(B) and the function of reproducing the transmit-data 2k from the modulated optical signal 2g transmitted from the base station 300 are the same as in the second embodiment.

Fifth Embodiment

FIG. 19 shows an optical-wireless hybrid transmission system according to a fifth embodiment of the invention. This embodiment is characterized (i.e., it is different in configuration from the third embodiment shown in FIG. 17) in that an output-power-controllable optical splitter 117 capable of setting optical powers of the split optical signals 1a individually is used in place of the optical splitter 115 which splits the single-mode optical signal 1a and transmits the split optical signals 1a to the plural base stations 300-1 to 300-3 as the optical carrier signals. The other part of the configuration of an optical transmitter 110(A3) according to this embodiment is the same as that of the optical transmitter 110(A2) according to the third embodiment.

This embodiment assumes a case that optical power differences occur between the modulated optical signals 1g1 to 1g3 received by the respective optical receivers 120(A)-1 to 120 (A)-3 due to optical losses that depend on the optical fiber transmission lengths between the central office 100 and the base stations 300-1 and 300-3 and the differences between RF signal powers that depend on the wireless transmission lengths between the base stations 300-1 to 300-3 and the wireless terminals. The optical powers of the optical carrier signals (optical signals 1a) to be transmitted to the respective base stations 300-1 to 300-3 are adjusted by the output-power-controllable optical splitter 117 according to the above situation. With this measure, the optical power ($f_{C1}$ and $f_{C1} \pm f_{RF}$ components) of the modulated optical signal 1g transmitted from each base station 300 and the optical power ($f_{C1}$ and $f_{C1} \pm f_{RF}$ components) of the coupled optical signal 1h that is output from the optical coupler 121 of each optical receiver 120(A) are adjusted as shown in FIG. 22. As a result, the signal power of the electrical signal 1i having the intermediate frequencies $f_{IF1}$ and $f_{IF2}$ in each optical receiver 120(A) is adjusted and a good receiving operation (described later) can thereby be realized.

Sixth Embodiment

FIG. 20 shows an optical-wireless hybrid transmission system according to a sixth embodiment of the invention. This embodiment is characterized (i.e., it is different in configuration from the third embodiment shown in FIG. 17) in that an output-power-controllable optical splitter 118 capable of setting optical powers of the split polarization-coupled optical signals 1d individually is used in place of the optical splitter 116 which outputs the split polarization-coupled optical signals 1d to the plural optical receivers 120(A)-1 to 120(A)-3. The other part of the configuration of an optical transmitter 110(A4) according to this embodiment is the same as that of the optical transmitter 110(A2) according to the third embodiment.

This embodiment assumes a case that optical power differences occur between the modulated optical signals 1g1 to 1g3 received by the respective optical receivers 120(A)-1 to 120(A)-3 due to optical losses that depend on the optical fiber transmission lengths between the central office 100 and the base stations 300-1 and 300-3 and the differences between RF signal powers that depend on the wireless transmission lengths between the base stations 300-1 to 300-3 and the wireless terminals. The optical powers of the polarization-coupled optical signals 1d to be output to the respective optical receivers 120(A)-1 to 120(A)-3 are adjusted by the output-power-controllable optical splitter 118 according to the above situation. With this measure, the optical power ($f_{C2}$ and $f_{C3}$ components) of the coupled optical signal 1h that is output from the optical coupler 121 of each optical receiver 120(A) is adjusted as shown in FIG. 22. As a result, the signal power of the electrical signal 1i having the intermediate frequencies $f_{IF1}$ and $f_{IF2}$ in each optical receiver 120(A) is adjusted and a good receiving operation (described later) can thereby be realized.

Seventh Embodiment

FIG. 21 shows an optical-wireless hybrid transmission system according to a seventh embodiment of the invention. This embodiment is characterized (i.e., it is different in configuration from the third embodiment shown in FIG. 17) in being equipped with the output-power-controllable optical splitter 117 according to the fifth embodiment and the output-power-controllable optical splitter 118 according to the sixth embodiment. The other part of the configuration of an optical transmitter 110(A5) according to this embodiment is the same as that of the optical transmitter 110(A2) according to the third embodiment.

This embodiment assumes a case that optical power differences occur between the modulated optical signals 1g1 to 1g3 received by the respective optical receivers 120(A)-1 to 120(A)-3 due to optical losses that depend on the optical fiber transmission lengths between the central office 100 and the base stations 300-1 and 300-3 and the differences between RF signal powers that depend on the wireless transmission lengths between the base stations 300-1 to 300-3 and the wireless terminals. The optical powers of the optical carrier signals (optical signals 1a) to be transmitted to the respective base stations 300-1 to 300-3 are adjusted by the output-power-controllable optical splitter 117 according to the above situation. With this measure, the optical power ($f_{C1}$ and $f_{C1} \pm f_{RF}$ components) of the modulated optical signal 1g transmitted from each base station 300 and the optical power ($f_{C1}$ and $f_{C1} \pm f_{RF}$ components) of the coupled optical signal 1h that is output from the optical coupler 121 of each optical receiver 120(A) are adjusted as shown in FIG. 22. Further, the optical powers of the polarization-coupled optical signals 1d to be output to the respective optical receivers 120(A)-1 to 120(A)-3 are adjusted by the output-power-controllable optical splitter 118. With this measure, the optical power ($f_{C2}$ and $f_{C3}$ components) of the coupled optical signal 1h that is output from the optical coupler 121 of each optical receiver 120(A) is adjusted as shown in FIG. 22. As a result, the signal power of the electrical signal having the intermediate frequencies $f_{IF1}$ and $f_{IF2}$ in each optical receiver 120(A) is adjusted and a good receiving operation (described later) can thereby be realized.

Eighth Embodiment

FIG. 23 shows an optical-wireless hybrid transmission system according to an eighth embodiment of the invention. This embodiment is characterized (i.e., it is different in configuration from the fourth embodiment shown in FIG. 18) in that an output-power-controllable optical splitter 118 capable of setting optical powers of the split polarization-coupled optical signals 2d individually is used in place of the optical splitter 116 which splits the polarization-coupled optical signal 2d and transmits the split polarization-coupled optical signals 2d to the plural base stations 300-1 to 300-3 as the optical carrier signals. The other part of the configuration of an optical transmitter 110(B3) according to this embodiment is the same as that of the optical transmitter 110(B2) according to the fourth embodiment.

This embodiment assumes a case that optical power differences occur between the modulated optical signals 2g1 to 2g3 received by the respective optical receivers 120(B)-1 to 120(B)-3 due to optical losses that depend on the optical fiber transmission lengths between the central office 100 and the base stations 300-1 and 300-3 and the differences between RF signal powers that depend on the wireless transmission lengths between the base stations 300-1 to 300-3 and the wireless terminals. The optical powers of the optical carrier signals (polarization-coupled optical signals 2d) to be transmitted to the respective base stations 300-1 to 300-3 are adjusted by the output-power-controllable optical splitter 118 according to the above situation. With this measure, the optical power ($f_{C2}$, $f_{C2} \pm f_{RF}$, $f_{C3}$, and $f_{C3} \pm f_{RF}$ components) of the modulated optical signal 2g transmitted from each base station 300 and the optical power ($f_{C2}$, $f_{C2} \pm f_{RF}$, $f_{C3}$, and $f_{C3} \pm f_{RF}$ components) of the coupled optical signal 2h that is output from the optical coupler 121 of each optical receiver 120(B) are adjusted as shown in FIG. 26. As a result, the signal power of the electrical signal 2i having the intermediate frequencies $f_{IF1}$ and $f_{IF2}$ in each optical receiver 120(B) is adjusted and a good receiving operation (described later) can thereby be realized.

Ninth Embodiment

FIG. 24 shows an optical-wireless hybrid transmission system according to a ninth embodiment of the invention. This embodiment is characterized (i.e., it is different in configuration from the fourth embodiment shown in FIG. 18) in that an output-power-controllable optical splitter 117 capable of setting optical powers of the split optical signals 2a individually is used in place of the optical splitter 115 which outputs the split single-mode optical signals 2a to the plural optical receivers 120(B)-1 to 120(B)-3. The other part of the configuration of an optical transmitter 110(B4) according to this embodiment is the same as that of the optical transmitter 110(B2) according to the fourth embodiment.

This embodiment assumes a case that optical power differences occur between the modulated optical signals 2g1 to 2g3 received by the respective optical receivers 120(B)-1 to 120(B)-3 due to optical losses that depend on the optical fiber transmission lengths between the central office 100 and the base stations 300-1 and 300-3 and the differences between RF signal powers that depend on the wireless transmission lengths between the base stations 300-1 to 300-3 and the wireless terminals. The optical powers of the optical signals 2a to be output to the respective optical receivers 120(B)-1 to 120(B)-3 are adjusted by the output-power-controllable optical splitter 117 according to the above situation. With this measure, the optical power ($f_{C1}$ component) of the coupled optical signal 2h that is output from the optical coupler 121 of each optical receiver 120(B) is adjusted as shown in FIG. 26. As a result, the signal power of the electrical signal 2i having the intermediate frequencies $f_{IF1}$ and $f_{IF2}$ in each optical receiver 120(B) is adjusted and a good receiving operation (described later) can thereby be realized.

10th Embodiment

FIG. 25 shows an optical-wireless hybrid transmission system according to a 10th embodiment of the invention. This embodiment is characterized (i.e., it is different in configuration from the fourth embodiment shown in FIG. 18) in being equipped with the output-power-controllable optical splitter 118 according to the eighth embodiment and the output-power-controllable optical splitter 117 according to the ninth embodiment. The other part of the configuration of an optical transmitter 110(B5) according to this embodiment is the same as that of the optical transmitter 110(B2) according to the fourth embodiment.

This embodiment assumes a case that optical power differences occur between the modulated optical signals 2g1 to 2g3 received by the respective optical receivers 120(B)-1 to 120(B)-3 due to optical losses that depend on the optical fiber transmission lengths between the central office 100 and the base stations 300-1 and 300-3 and the differences between RF signal powers that depend on the wireless transmission lengths between the base stations 300-1 to 300-3 and the wireless terminals. The optical powers of the optical carrier signals (polarization-coupled optical signals 2d) to be transmitted to the respective base stations 300-1 to 300-3 are adjusted by the output-power-controllable optical splitter 118 according to the above situation. With this measure, the optical power ($f_{C2}$, $f_{C2} \pm f_{RF}$, $f_{C3}$, and $f_{C3} \pm f_{RF}$ components) of the modulated optical signal 2g transmitted from each base station 300 and the optical power ($f_{C2}$, $f_{C2} \pm f_{RF}$, $f_{C3}$, and $f_{C3} \pm f_{RF}$ components) of the coupled optical signal 2h that is output from the optical coupler 121 of each optical receiver 120(B) are adjusted as shown in FIG. 26. Further, the optical powers of the optical signals 2a to be output to the respective optical receivers 120(B)-1 to 120(B)-3 are adjusted by the output-power-controllable optical splitter 117. With this measure, the optical power ($f_{C1}$ component) of the coupled optical signal 2h that is output from the optical coupler 121 of each optical receiver 120(B) is adjusted as shown in FIG. 26. As a result, the signal power of the electrical signal having the intermediate frequencies $f_{IF1}$ and $f_{IF2}$ in each optical receiver 120(B) is adjusted and a good receiving operation (described later) can thereby be realized.

Control forms in the fifth to 10th embodiments will now be described.

In a first control form, the optical powers of optical carrier signals to be transmitted to the respective base stations and/or optical signals to be output to the respective optical receivers are controlled so that the signal power of an electrical signal having the intermediate frequencies $f_{IF1}$ and $f_{IF2}$ that is output from the photodetector of each optical receiver is made constant.

In a second control form, the optical powers of optical carrier signals to be transmitted to the respective base stations and/or optical signals to be output to the respective optical receivers are controlled so that the signal powers of electrical signals having the intermediate frequencies $f_{IF1}$ and $f_{IF2}$ that are output from the photodetectors of the optical receivers are made uniform for all the optical receivers.

In a third control form, the optical powers of optical carrier signals to be transmitted to the respective base stations and/or optical signals to be output to the respective optical receivers are controlled so that the signal-to-noise ratios of electrical signals having the intermediate frequencies $f_{IF1}$ and $f_{IF2}$ that are output from the photodetectors of the optical receivers are made uniform for all the optical receivers.

The invention is not limited to the above embodiments and various modifications may be made without departing from the spirit and scope of the invention. Any improvement may be made in part or all of the components.

INDUSTRIAL APPLICABILITY

The invention is applied to an optical-wireless hybrid transmission system in which a high-frequency RF signal such as a millimeter-wave signal is transmitted between a base station and a wireless terminal via a wireless channel and an optical signal is transmitted from the base station having received the RF signal to a central office via an optical transmission line, and the invention is also applied to the central office.

The invention claimed is:

1. An optical-wireless hybrid transmission system in which a central office has an optical transmitter and an optical receiver, said optical transmitter transmits an optical carrier signal to a base station via an optical transmission line, said base station receives an RF signal (frequency: $f_{RF}$) that is modulated according to transmit-data, optically modulates said optical carrier signal according to the received RF signal, and transmits a resulting modulated optical signal to said central office via an optical transmission line, and said optical receiver receives and demodulates the modulated optical signal and reproduces said transmit-data, the system characterized in:

that said optical transmitter comprises:
a first single-mode optical source which outputs a first single-mode optical signal (center frequency: $f_{C1}$);
a second single-mode optical source which outputs a second single-mode optical signal (center frequency: $f_{C2}$);
a third single-mode optical source which outputs a third single-mode optical signal (center frequency: $f_{C3}$); and
a polarization-coupling part which orthogonal-polarization-couples said second single-mode optical signal with said third single-mode optical signal while adjusting polarization directions and optical powers of two waves so as to make the polarization directions orthogonal and the optical powers identical, and outputs a resulting polarization-coupled optical signal, in which
the center frequencies $f_{C1}$, $f_{C2}$, and $f_{C3}$ of said first, second, and third single-mode optical signals are controlled so as to satisfy $$|f_{C1} - f_{C2}| = f_{RF} \pm f_{IF1}$$

$$|f_{C1} - f_{C3}| = f_{RF} \pm f_{IF2}$$

where $f_{RF}$ is a frequency of said RF signal and $f_{IF1}$ and $f_{IF2}$ are prescribed intermediate frequencies; and
said first single-mode optical signal is transmitted to said base station as said optical carrier signal and said polarization-coupled optical signal is output to said optical receiver; and
that said optical receiver comprises:
an optical coupler which couples the modulated optical signal transmitted from said base station with said polarization-coupled optical signal output from said optical transmitter;
a photodetector which photodetects a coupled optical signal output from said optical coupler, and thereby outputs an electrical signal having the intermediate frequencies $f_{IF1}$ and $f_{IF2}$;

an electrical demodulator which demodulates the electrical signal having the intermediate frequencies $f_{IF1}$ and $f_{IF2}$ and output from said photodetector; and a low-pass filter which filters an output signal of said electrical demodulator and thereby outputs said transmit-data.

2. An optical-wireless hybrid transmission system in which a central office has an optical transmitter and an optical receiver, said optical transmitter transmits an optical carrier signal to a base station via an optical transmission line, said base station receives an RF signal (frequency: $f_{RF}$) that is modulated according to transmit-data, optically modulates said optical carrier signal according to the received RF signal, and transmits a resulting modulated optical signal to said central office via an optical transmission line, and said optical receiver receives and demodulates the modulated optical signal and reproduces said transmit-data, the system characterized in:

that said optical transmitter comprises:

a first single-mode optical source which outputs a first single-mode optical signal (center frequency: $f_{C1}$);

a second single-mode optical source which outputs a second single-mode optical signal (center frequency: $f_{C2}$);

a third single-mode optical source which outputs a third single-mode optical signal (center frequency: $f_{C3}$); and a polarization-coupling part which orthogonal-polarization-couples said second single-mode optical signal with said third single-mode optical signal while adjusting polarization directions and optical powers of two waves so as to make the polarization directions orthogonal and the optical powers identical, and outputs a resulting polarization-coupled optical signal, in which:

the center frequencies $f_{C1}$, $f_{C2}$, and $f_{C3}$ of said first, second, and third single-mode optical signals are controlled so as to satisfy $|f_{C1}-f_{C2}|=f_{RF}\pm f_{IF1}$ $|f_{C1}-f_{C3}|=f_{RF}\pm f_{IF2}$ where $f_{RF}$ is a frequency of said RF signal and $f_{IF1}$ and $f_{IF2}$ are prescribed intermediate frequencies; and said polarization-coupled optical signal is transmitted to said base station as said optical carrier signal and said first single-mode optical signal is output to said optical receiver; and that said optical receiver comprises:

an optical coupler which couples the modulated optical signal transmitted from said base station with said first single-mode optical signal output from said optical transmitter;

a photodetector which photodetects a coupled optical signal that is output from said optical coupler, and thereby outputs an electrical signal having the intermediate frequencies $f_{IF1}$ and $f_{IF2}$;

an electrical demodulator which demodulates the electrical signal having the intermediate frequencies $f_{IF1}$ and $f_{IF2}$ and output from said photodetector; and a low-pass filter which filters an output signal of said electrical demodulator and thereby outputs said transmit-data.

3. The optical-wireless hybrid transmission system according to claim 1 or 2, characterized in that said optical receiver comprises a filter, a first electrical demodulator and a second electrical demodulator, and a combiner in place of said electrical demodulator and said low-pass filter, the filter separating from each other an electrical signal having the intermediate frequency $f_{IF1}$ and an electrical signal having the intermediate frequency $f_{IF2}$ output from said photodetector, the first and second electrical demodulator demodulating the electrical signal having the intermediate frequency $f_{IF1}$ and the electrical signal having the intermediate frequency $f_{IF2}$, respectively, that are output from said filter, the combiner combining an output signal of said first electrical demodulator with an output signal of said second electrical demodulator and thereby outputs said transmit-data.

4. The optical-wireless hybrid transmission system according to claim 1 or 2, characterized in that said optical receiver comprises a filter, a first electrical demodulator and a second electrical demodulator, and a delay-controllable combiner in place of said electrical demodulator and said low-pass filter, the filter separating from each other an electrical signal having the intermediate frequency $f_{IF1}$ and an electrical signal having the intermediate frequency $f_{IF2}$ output from said photodetector, the first and second electrical demodulator demodulating the electrical signal having the intermediate frequency $f_{IF1}$ and the electrical signal having the intermediate frequency $f_{IF2}$, respectively, that are output from said filter, the delay-controllable combiner combining an output signal of said first electrical demodulator with an output signal of said second electrical demodulator while equalizing their phases, and thereby outputs said transmit-data.

5. The optical-wireless hybrid transmission system according to claim 1, characterized by further comprising a plurality of base stations, and a plurality of optical receivers in said central office, the optical receivers receiving modulated optical signals transmitted from the plurality of base stations, respectively, wherein said optical transmitter further comprises:

a first optical splitter which splits said first single-mode optical signal into a plurality of optical signals and transmits the split optical signals to said plurality of base stations as optical carrier signals, respectively; and a second optical splitter which splits said polarization-coupled optical signal into a plurality of optical signals and outputs the split optical signals to said plurality of optical receivers, respectively.

6. The optical-wireless hybrid transmission system according to claim 2, characterized by further comprising a plurality of base stations, and a plurality of optical receivers in said central office, the plurality of optical receivers receiving modulated optical signals transmitted from said plurality of base stations, respectively, wherein said optical transmitter further comprises:

a first optical splitter which splits said polarization-coupled optical signal into a plurality of optical signals and transmits the split optical signals to said plurality of base stations as optical carrier signals, respectively; and a second optical splitter which splits said first single-mode optical signal into a plurality of optical signals and outputs the split optical signals to said plurality of optical receivers, respectively.

7. The optical-wireless hybrid transmission system according to claim 5, characterized by further comprising an output-power-controllable optical splitter in place of said first optical splitter, being capable of individually setting optical powers of said optical carrier signals to be transmitted respectively to said plurality of base stations.

8. The optical-wireless hybrid transmission system according to claim 5, characterized by further comprising an output-power-controllable optical splitter in place of said second optical splitter, being capable of individually setting optical powers of said polarization-coupled optical signals to be output respectively to said plurality of optical receivers.

9. The optical-wireless hybrid transmission system according to claim 5, characterized by further comprising:
   an output-power-controllable optical splitter in place of said first optical splitter, being capable of individually setting optical powers of said optical carrier signals to be transmitted respectively to said plurality of base stations; and
   an output-power-controllable optical splitter in place of said second optical splitter, being capable of individually setting optical powers of said polarization-coupled optical signals to be output to said plurality of optical receivers, respectively.

10. The optical-wireless hybrid transmission system according to claim 6, characterized by comprising
   an output-power-controllable optical splitter in place of said first optical splitter, being capable of individually setting optical powers of said optical carrier signals to be transmitted to said plurality of base stations, respectively.

11. The optical-wireless hybrid transmission system according to claim 6, characterized by comprising
   an output-power-controllable optical splitter in place of said second optical splitter, being capable of individually setting optical powers of said first single-mode optical signals to be output to said plurality of optical receivers, respectively.

12. The optical-wireless hybrid transmission system according to claim 6, characterized by comprising:
   an output-power-controllable optical splitter in place of said first optical splitter, being capable of individually setting optical powers of said optical carrier signals to be transmitted to said plurality of base stations, respectively; and
   an output-power-controllable optical splitter in place of said second optical splitter, being capable of individually setting optical powers of said first single-mode optical signals to be output to said plurality of optical receivers, respectively.

13. The optical-wireless hybrid transmission system according to any one of claims 7 to 12, characterized in that said output-power-controllable optical splitter/splitters of said optical transmitter sets/set said optical powers of the split optical signals so that an signal power of said electrical signal having the intermediate frequencies $f_{IF1}$ and $f_{IF2}$ and output from the photodetector of said optical receiver is made constant irrespective of an optical power of said optical signal received from said base station.

14. The optical-wireless hybrid transmission system according to any one of claims 7 to 12, characterized in that said output-power-controllable optical splitter/splitters of said optical transmitter sets/set said optical powers of the split optical signals so that signal powers of the electrical signals having the intermediate frequencies $f_{IF1}$ and $f_{IF2}$ and output from the photodetectors of said optical receivers are made uniform for all of said optical receivers.

15. The optical-wireless hybrid transmission system according to any one of claims 7 to 12, characterized in that said output-power-controllable optical splitter/splitters of said optical transmitter set said optical powers of the split optical signals so that signal-to-noise ratios of the electrical signals having the intermediate frequencies $f_{IF1}$ and $f_{IF2}$ and output from the photodetectors of said optical receivers are made uniform for all of said optical receivers.

16. An optical-wireless hybrid transmission method in which a central office has an optical transmitter and an optical receiver, said optical transmitter transmits an optical carrier signal to a base station via an optical transmission line, said base station receives an RF signal (frequency: $f_{RF}$) that is modulated according to transmit-data, optically modulates said optical carrier signal according to the received RF signal, and transmits a resulting modulated optical signal to said central office via an optical transmission line, and said optical receiver receives and demodulates the modulated optical signal and reproduces said transmit-data, characterized by comprising the steps of:
   transmitting, by said optical transmitter, a first single-mode optical signal (center frequency: $f_{C1}$) to said base station as said optical carrier signal;
   outputting, by said optical transmitter, a polarization-coupled optical signal from said optical transmitter to said optical receiver, the polarization coupled optical signal being obtained by orthogonal-polarization-coupling a second single-mode optical signal (center frequency: $f_{C2}$) with a third single-mode optical signal (center frequency: $f_{C3}$) so as to give two waves orthogonal polarization directions and a same optical power;
   controlling, by said optical transmitter, the center frequencies $f_{C1}$, $f_{C2}$, and $f_{C3}$ of said first, second, and third single-mode optical signals so that they satisfy $$|f_{C1}-f_{C2}|=f_{RF}\pm f_{IF1}$$

$$|f_{C1}-f_{C3}|=f_{RF}\pm f_{IF2}$$

where $f_{RF}$ is a frequency of said RF signal and $f_{IF1}$ and $f_{IF2}$ are prescribed intermediate frequencies;
   coupling, by said optical receiver, the modulated optical signal transmitted from said base station with said polarization-coupled optical signal output from said optical transmitter;
   demodulating, by said optical receiver, an electrical signal having the intermediate frequencies $f_{IF1}$ and $f_{IF2}$ that is obtained by photodetecting a resulting coupled optical signal; and
   generating, by said optical receiver, said transmit-data by filtering a resulting output signal.

17. An optical-wireless hybrid transmission method in which a central office has an optical transmitter and an optical receiver, said optical transmitter transmits an optical carrier signal to a base station via an optical transmission line, said base station receives an RF signal (frequency: $f_{RF}$) that is modulated according to transmit-data, optically modulates said optical carrier signal according to the received RF signal, and transmits a resulting modulated optical signal to said central office via an optical transmission line, and said optical receiver receives and demodulates the modulated optical signal and reproduces said transmit-data, characterized by comprising the steps of:
   outputting, by said optical transmitter, a first single-mode optical signal (center frequency: $f_{C1}$) to said optical receiver;
   generating, by said optical transmitter, a polarization-coupled optical signal by orthogonal-polarization-coupling a second single-mode optical signal (center frequency: $f_{C2}$) with a third single-mode optical signal (center frequency: $f_{C3}$) so as to give two waves orthogonal polarization directions and a same optical power;

transmitting, by said optical transmitter, the generated polarization-coupled optical signal to said base station as said optical carrier signal; and controlling, by said optical transmitter, the center frequencies $f_{C1}$, $f_{C2}$, and $f_{C3}$ of said first, second, and third single-mode optical signals so that they satisfy $$|f_{C1} - f_{C2}| = f_{RF} \pm f_{IF1}$$

$$|f_{C1} - f_{C3}| = f_{RF} \pm f_{IF2}$$

where $f_{RF}$ is a frequency of said RF signal and $f_{IF1}$ and $f_{IF2}$ are prescribed intermediate frequencies;

coupling, by said optical receiver, the modulated optical signal transmitted from said base station with said optical signal output from said optical transmitter;

demodulating, by said optical receiver, an electrical signal having the intermediate frequencies $f_{IF1}$ and $f_{IF2}$ that is obtained by photodetecting a resulting coupled optical signal; and generating, by said optical receiver, said transmit-data by filtering a resulting output signal.

18. The optical-wireless hybrid transmission method according to claim 16 or 17, characterized by comprising the steps of:

separating, by said optical receiver, electrical signals having the intermediate frequencies $f_{IF1}$ and $f_{IF2}$ from each other;

individually demodulating, by said optical receiver, the electrical signal having the intermediate frequency $f_{IF1}$ and the electrical signal having the intermediate frequency $f_{IF2}$; and generating, by said optical receiver, said transmit-data by combining resulting output signals with each other.

19. The optical-wireless hybrid transmission method according to claim 16 or 17, characterized by further comprising the steps of:

separating, by said optical receiver, electrical signals having the intermediate frequencies $f_{IF1}$ and $f_{IF2}$ from each other;

individually demodulating, by said optical receiver, the electrical signal having the intermediate frequency $f_{IF1}$ and the electrical signal having the intermediate frequency $f_{IF2}$; and generating, by said optical receiver, said transmit-data by combining resulting output signals with each other after equalizing their phases.

* * * * *